(12) United States Patent
Lehman et al.

(10) Patent No.: US 11,030,702 B1
(45) Date of Patent: *Jun. 8, 2021

(54) MOBILE INSURANCE PLATFORM SYSTEM

(71) Applicant: Progessive Casualty Insurance Company, Mayfield Village, OH (US)

(72) Inventors: Matthew Daniel Lehman, Shaker Heights, OH (US); Bradley Thomas Philips, Akron, OH (US); Pawan Kumar Divakarla, Shaker Heights, OH (US); Toby Kramer Alfred, Orange, OH (US); William Curtis Everett, Chagrin Falls, OH (US); Brian Joseph Surtz, Mentor, OH (US); Raymond Scott Ling, Westlake, OH (US)

(73) Assignee: PROGRESSIVE CASUALTY INSURANCE COMPANY, Mayfield Village, OH (US)

( * ) Notice: Subject to any disclaimer, the term of this patent is extended or adjusted under 35 U.S.C. 154(b) by 95 days.

This patent is subject to a terminal disclaimer.

(21) Appl. No.: 16/537,980

(22) Filed: Aug. 12, 2019

Related U.S. Application Data

(63) Continuation of application No. 15/916,722, filed on Mar. 9, 2018, now Pat. No. 10,497,063, which is a
(Continued)

(51) Int. Cl.
*G06Q 40/00* (2012.01)
*G06Q 40/08* (2012.01)
*G06Q 20/32* (2012.01)

(52) U.S. Cl.
CPC .......... *G06Q 40/08* (2013.01); *G06Q 20/322* (2013.01)

(58) Field of Classification Search
CPC ............... G06Q 30/02; G06Q 30/0248; G06Q 30/0255; G06Q 30/0267
See application file for complete search history.

(56) References Cited

U.S. PATENT DOCUMENTS 3,388,404 A 6/1968 Bush
3,504,337 A 3/1970 Ekman
(Continued)

FOREIGN PATENT DOCUMENTS

CA 0 383 593 A2 8/1990
CA 0 444 738 A2 9/1991
(Continued)

OTHER PUBLICATIONS

EHealthInsurance Launches Mobile Application to Help Consumers Compare and Apply for Health Insurance Coverage _ eHealth Insurance, , eHealthInsurance, p. 1-2, Sep. 19, 2011 (Year: 2011).*
(Continued)

*Primary Examiner* — Mike Anderson
(74) *Attorney, Agent, or Firm* — Lempia Summerfield Katz LLC

(57) ABSTRACT

A mobile insurance architecture includes a wireless communication interface that connects mobile client devices to wireless networks. An insurance server cluster that includes a group of independent network servers operates and appears to mobile client devices as if the group of independent network servers were a single computer server. An adaptive transmission controller communicates with the insurance server cluster and processes content in multiple mobile formats that may be optimized to the screen sizes of the mobile client devices. The insurance server cluster responds to native application clients resident to the mobile client devices. The native application clients contain code stored on a non-transitory media that render insurance quoting services, insurance claims services, on-line insur-
(Continued)

ance policy services, usage based insurance services, mobile monitoring services, or insurance agency management services.

46 Claims, 17 Drawing Sheets

Related U.S. Application Data continuation of application No. 13/364,953, filed on Feb. 2, 2012, now Pat. No. 9,916,625.

(56) References Cited

U.S. PATENT DOCUMENTS

| | | |
|---|---|---|
| 3,716,679 A | 2/1973 | Graesslin et al. |
| 3,781,824 A | 12/1973 | Caiati et al. |
| 3,792,445 A | 2/1974 | Bucks et al. |
| 3,870,894 A | 3/1975 | Brede et al. |
| 3,878,915 A | 4/1975 | Purland et al. |
| 3,938,092 A | 2/1976 | Callahan |
| 4,013,875 A | 3/1977 | McGlynn |
| 4,058,796 A | 11/1977 | Oishi et al. |
| 4,065,961 A | 1/1978 | Crew |
| 4,067,061 A | 1/1978 | Juhasz |
| 4,072,850 A | 2/1978 | McGlynn |
| 4,212,195 A | 7/1980 | Young |
| 4,234,926 A | 11/1980 | Wallace et al. |
| 4,241,403 A | 12/1980 | Schultz |
| 4,250,487 A | 2/1981 | Arnold |
| 4,258,421 A | 3/1981 | Juhasz et al. |
| 4,258,430 A | 3/1981 | Tyburski |
| 4,271,402 A | 6/1981 | Kastura et al. |
| 4,387,587 A | 6/1983 | Faulconer |
| 4,395,624 A | 7/1983 | Wartski |
| 4,500,868 A | 2/1985 | Tokitsu et al. |
| 4,533,962 A | 8/1985 | Decker et al. |
| 4,581,708 A | 4/1986 | Van Ostrand et al. |
| 4,593,357 A | 6/1986 | Van Ostrand et al. |
| 4,608,638 A | 8/1986 | Tsikos |
| 4,638,289 A | 1/1987 | Zottnik |
| 4,638,295 A | 1/1987 | Middlebrook et al. |
| 4,644,368 A | 2/1987 | Mutz |
| 4,651,157 A | 3/1987 | Gray |
| 4,656,585 A | 4/1987 | Stephenson |
| 4,667,336 A | 5/1987 | Best |
| 4,671,111 A | 6/1987 | Lemelson |
| 4,673,937 A | 6/1987 | Davis |
| 4,685,061 A | 8/1987 | Whitaker |
| 4,706,083 A | 9/1987 | Skovgaard et al. |
| 4,710,694 A | 12/1987 | Sutphin et al. |
| 4,716,458 A | 12/1987 | Heitzman et al. |
| 4,728,922 A | 3/1988 | Christen et al. |
| 4,742,290 A | 5/1988 | Sutphin et al. |
| 4,745,564 A | 5/1988 | Tennes et al. |
| 4,763,745 A | 8/1988 | Eto et al. |
| 4,804,937 A | 2/1989 | Barbiaux et al. |
| 4,807,179 A | 2/1989 | Clere et al. |
| 4,817,040 A | 3/1989 | Bodley-Scott |
| 4,829,434 A | 5/1989 | Karmel et al. |
| 4,831,526 A | 5/1989 | Luchs et al. |
| 4,835,546 A | 5/1989 | Keller |
| 4,836,024 A | 6/1989 | Woehrl et al. |
| 4,843,463 A | 6/1989 | Michetti |
| 4,843,578 A | 6/1989 | Wade |
| 4,845,630 A | 7/1989 | Stephens |
| 4,853,720 A | 8/1989 | Onari et al. |
| 4,853,859 A | 8/1989 | Morita et al. |
| 4,875,167 A | 10/1989 | Price et al. |
| 4,916,450 A | 4/1990 | Davis |
| 4,926,331 A | 5/1990 | Windle et al. |
| 4,939,652 A | 7/1990 | Steiner |
| 4,944,401 A | 7/1990 | Groenewegen |
| 4,945,759 A | 8/1990 | Krofchalk et al. |
| 4,970,496 A | 11/1990 | Kirkpatrick |
| 4,975,840 A | 12/1990 | DeTore |
| 4,987,541 A | 1/1991 | Levente et al. |
| 4,992,943 A | 2/1991 | McCracken |
| 5,017,916 A | 5/1991 | Londt et al. |
| 5,020,105 A | 5/1991 | Rosen et al. |
| 5,046,007 A | 9/1991 | McCrery et al. |
| 5,055,851 A | 10/1991 | Sheffer |
| 5,057,834 A | 10/1991 | Nordstrom |
| 5,074,144 A | 12/1991 | Krofchalk et al. |
| 5,111,289 A | 5/1992 | Lucas et al. |
| 5,115,426 A | 5/1992 | Spanke |
| 5,115,427 A | 5/1992 | Johnson, Jr. et al. |
| 5,162,997 A | 11/1992 | Takahashi |
| 5,189,619 A | 2/1993 | Adachi et al. |
| 5,189,621 A | 2/1993 | Onari et al. |
| 5,207,095 A | 5/1993 | Teare et al. |
| 5,210,854 A | 5/1993 | Beaverton |
| 5,214,582 A | 5/1993 | Gray |
| 5,223,844 A | 6/1993 | Mansell et al. |
| 5,243,530 A | 9/1993 | Stanifer |
| 5,249,127 A | 9/1993 | Komatsu |
| 5,270,708 A | 12/1993 | Kamishima |
| 5,287,348 A | 2/1994 | Schmidt et al. |
| 5,302,956 A | 4/1994 | Asbury et al. |
| 5,303,163 A | 4/1994 | Ebaugh et al. |
| 5,305,219 A | 4/1994 | Ishibashi et al. |
| 5,309,139 A | 5/1994 | Austin |
| 5,319,374 A | 6/1994 | Desai et al. |
| 5,321,407 A | 6/1994 | Kikuchi et al. |
| 5,325,082 A | 6/1994 | Rodriguez |
| 5,329,572 A | 7/1994 | Martens |
| 5,355,855 A | 10/1994 | Saikalis |
| 5,359,528 A | 10/1994 | Haendel et al. |
| 5,365,451 A | 11/1994 | Wang et al. |
| 5,373,346 A | 12/1994 | Hocker |
| 5,375,118 A | 12/1994 | Rao et al. |
| 5,379,219 A | 1/1995 | Ishibashi |
| 5,394,136 A | 2/1995 | Lammers et al. |
| 5,400,018 A | 3/1995 | Scholl et al. |
| 5,410,304 A | 4/1995 | Hahn et al. |
| 5,412,570 A | 5/1995 | Gruler et al. |
| 5,428,542 A | 6/1995 | Liesveld |
| 5,430,432 A | 7/1995 | Camhi et al. |
| 5,432,841 A | 7/1995 | Rimer |
| 5,433,296 A | 7/1995 | Webberley |
| 5,438,312 A | 8/1995 | Lewis |
| 5,442,553 A | 8/1995 | Parrillo |
| 5,444,742 A | 8/1995 | Grabow et al. |
| 5,445,347 A | 8/1995 | Ng |
| 5,446,659 A | 8/1995 | Yamawaki |
| 5,446,757 A | 8/1995 | Chang |
| 5,459,304 A | 10/1995 | Eisenmann |
| 5,459,660 A | 10/1995 | Berra |
| 5,463,567 A | 10/1995 | Boen et al. |
| 5,465,079 A | 11/1995 | Bouchard et al. |
| 5,467,645 A | 11/1995 | Skorupski et al. |
| 5,471,193 A | 11/1995 | Peterson et al. |
| 5,475,597 A | 12/1995 | Buck |
| 5,477,141 A | 12/1995 | Nather et al. |
| 5,485,161 A | 1/1996 | Vaughn |
| 5,497,329 A | 3/1996 | Tang |
| 5,499,182 A | 3/1996 | Ousborne |
| 5,500,806 A | 3/1996 | Bellin et al. |
| 5,513,244 A | 4/1996 | Joao et al. |
| 5,521,815 A | 5/1996 | Rose, Jr. |
| 5,524,489 A | 6/1996 | Twigg |
| 5,546,305 A | 8/1996 | Kondo |
| 5,548,273 A | 8/1996 | Nicol et al. |
| 5,548,536 A | 8/1996 | Ammon |
| 5,550,551 A | 8/1996 | Alesio |
| 5,550,738 A | 8/1996 | Bailey et al. |
| 5,570,087 A | 10/1996 | Lemelson |
| 5,581,464 A | 12/1996 | Woll et al. |
| 5,588,005 A | 12/1996 | Ali et al. |
| 5,608,629 A | 3/1997 | Cuddihy et al. |
| 5,612,875 A | 3/1997 | Haendel et al. |
| 5,618,179 A | 4/1997 | Copperman et al. |
| 5,623,491 A | 4/1997 | Skoog |
| 5,633,875 A | 5/1997 | Hershey et al. |

(56) References Cited

U.S. PATENT DOCUMENTS

| | | |
|---|---|---|
| 5,638,273 A | 6/1997 | Coiner et al. |
| 5,639,967 A | 6/1997 | Alexis |
| 5,642,093 A | 6/1997 | Kinoshita et al. |
| 5,646,349 A | 7/1997 | Twigg et al. |
| 5,646,994 A | 7/1997 | Hill |
| 5,653,386 A | 8/1997 | Hennessee et al. |
| 5,654,501 A | 8/1997 | Grizzle et al. |
| 5,680,140 A | 10/1997 | Loomis |
| 5,693,876 A | 12/1997 | Ghitea, Jr. et al. |
| 5,694,116 A | 12/1997 | Kojima |
| 5,694,322 A | 12/1997 | Westerlage et al. |
| 5,717,606 A | 2/1998 | Hara et al. |
| 5,719,771 A | 2/1998 | Buck et al. |
| 5,726,893 A | 3/1998 | Schuchman et al. |
| 5,729,619 A | 3/1998 | Puma |
| 5,732,074 A | 3/1998 | Spaur et al. |
| 5,737,711 A | 4/1998 | Abe |
| 5,754,964 A | 5/1998 | Rettig et al. |
| 5,758,299 A | 5/1998 | Sandborg et al. |
| 5,758,300 A | 5/1998 | Abe |
| 5,764,923 A | 6/1998 | Tallman et al. |
| 5,781,871 A | 7/1998 | Mezger et al. |
| 5,790,427 A | 8/1998 | Greer et al. |
| 5,797,134 A | 8/1998 | McMillan et al. |
| 5,798,695 A | 8/1998 | Metalis et al. |
| 5,799,249 A | 8/1998 | Kennedy, III et al. |
| 5,805,079 A | 9/1998 | Lemelson |
| 5,809,478 A | 9/1998 | Greco et al. |
| 5,811,884 A | 9/1998 | Matuoka et al. |
| 5,815,070 A | 9/1998 | Yoshikawa |
| 5,815,071 A | 9/1998 | Doyle |
| 5,815,093 A | 9/1998 | Kikinis |
| 5,819,198 A | 10/1998 | Peretz |
| 5,825,283 A | 10/1998 | Camhi et al. |
| 5,832,394 A | 11/1998 | Wortham |
| 5,835,008 A | 11/1998 | Colemere, Jr. |
| 5,844,473 A | 12/1998 | Kaman |
| 5,845,256 A | 12/1998 | Pescitelli et al. |
| 5,862,500 A | 1/1999 | Goodwin |
| 5,877,707 A | 3/1999 | Kowalick |
| 5,884,202 A | 3/1999 | Arjomand |
| 5,916,287 A | 6/1999 | Arjomand et al. |
| 5,919,239 A | 7/1999 | Fraker et al. |
| 5,928,291 A | 7/1999 | Jenkins et al. |
| 5,956,691 A | 9/1999 | Powers |
| 5,974,356 A | 10/1999 | Doyle et al. |
| 6,009,363 A | 12/1999 | Beckert et al. |
| 6,031,890 A | 2/2000 | Bermbach et al. |
| 6,064,299 A | 5/2000 | Lesesky et al. |
| 6,064,970 A | 5/2000 | McMillan et al. |
| 6,067,488 A | 5/2000 | Tano |
| 6,073,063 A | 6/2000 | Leong Ong et al. |
| 6,076,026 A | 6/2000 | Jambhekar et al. |
| 6,088,636 A | 7/2000 | Chigumira et al. |
| 6,098,048 A | 8/2000 | Dashefsky et al. |
| 6,141,610 A | 10/2000 | Rothert et al. |
| 6,141,611 A | 10/2000 | Mackey et al. |
| 6,154,658 A | 11/2000 | Caci |
| 6,163,277 A | 12/2000 | Gehlot |
| 6,167,333 A | 12/2000 | Gehlot |
| 6,169,943 B1 | 1/2001 | Simon et al. |
| 6,181,994 B1 | 1/2001 | Colson et al. |
| 6,182,048 B1 | 1/2001 | Osborn et al. |
| 6,185,490 B1 | 2/2001 | Ferguson |
| 6,189,057 B1 | 2/2001 | Schwanz et al. |
| 6,204,757 B1 | 3/2001 | Evans et al. |
| 6,219,380 B1 | 4/2001 | Wang et al. |
| 6,225,898 B1 | 5/2001 | Kamiya et al. |
| 6,236,933 B1 | 5/2001 | Lang |
| 6,240,773 B1 | 6/2001 | Rita et al. |
| 6,246,933 B1 | 6/2001 | Bague |
| 6,246,934 B1 | 6/2001 | Otake et al. |
| 6,253,129 B1 | 6/2001 | Jenkins et al. |
| 6,263,268 B1 | 7/2001 | Nathanson |
| 6,278,362 B1 | 8/2001 | Yoshikawa et al. |
| 6,278,936 B1 | 8/2001 | Jones |
| 6,295,492 B1 | 9/2001 | Lang et al. |
| 6,298,290 B1 | 10/2001 | Abe et al. |
| 6,317,668 B1 | 11/2001 | Thibault |
| 6,330,499 B1 | 12/2001 | Chou et al. |
| 6,339,745 B1 | 1/2002 | Novik |
| 6,356,823 B1 | 3/2002 | Iannotti et al. |
| 6,360,145 B1 | 3/2002 | Robinson |
| 6,366,199 B1 | 4/2002 | Osborn et al. |
| 6,366,207 B1 | 4/2002 | Murphy |
| 6,366,843 B1 | 4/2002 | Gustavsson |
| 6,370,449 B1 | 4/2002 | Razavi et al. |
| 6,392,664 B1 | 5/2002 | Mackey et al. |
| 6,393,346 B1 | 5/2002 | Keith et al. |
| 6,405,112 B1 | 6/2002 | Rayner |
| 6,408,232 B1 | 6/2002 | Cannon et al. |
| 6,411,203 B1 | 6/2002 | Lesesky et al. |
| 6,421,791 B1 | 7/2002 | Cocco et al. |
| 6,430,488 B1 | 8/2002 | Goldman et al. |
| 6,438,472 B1 | 8/2002 | Tano et al. |
| 6,449,572 B1 | 9/2002 | Kurz et al. |
| 6,459,367 B1 | 10/2002 | Green et al. |
| 6,459,969 B1 | 10/2002 | Bates et al. |
| 6,470,240 B1 | 10/2002 | Haynes et al. |
| 6,499,114 B1 | 12/2002 | Almstead et al. |
| 6,502,020 B2 | 12/2002 | Lang |
| 6,502,035 B2 | 12/2002 | Levine |
| 6,505,106 B1 | 1/2003 | Lawrence et al. |
| 6,526,341 B1 | 2/2003 | Bird et al. |
| 6,529,723 B1 | 3/2003 | Bentley |
| 6,556,135 B2 | 4/2003 | Attring et al. |
| 6,556,899 B1 | 4/2003 | Harvey et al. |
| 6,556,905 B1 | 4/2003 | Mittelsteadt et al. |
| 6,604,033 B1 | 8/2003 | Banet et al. |
| 6,606,562 B1 | 8/2003 | Gifford |
| 6,608,554 B2 | 8/2003 | Lesesky et al. |
| 6,611,740 B2 | 8/2003 | Lowrey et al. |
| 6,618,668 B1 | 9/2003 | Laird |
| 6,622,070 B1 | 9/2003 | Wacker et al. |
| 6,622,083 B1 | 9/2003 | Knockeart et al. |
| 6,629,029 B1 | 9/2003 | Giles |
| 6,636,149 B2 | 10/2003 | Moon |
| 6,636,790 B1 | 10/2003 | Lightner et al. |
| 6,640,188 B1 | 10/2003 | Hashida |
| 6,663,191 B2 | 12/2003 | Sakata et al. |
| 6,694,245 B2 | 2/2004 | Minami et al. |
| 6,701,234 B1 | 3/2004 | Vogelsang |
| 6,714,859 B2 | 3/2004 | Jones |
| 6,714,894 B1 | 3/2004 | Tobey et al. |
| 6,732,031 B1 | 5/2004 | Lightner et al. |
| 6,741,927 B2 | 5/2004 | Jones |
| 6,744,352 B2 | 6/2004 | Lesesky et al. |
| 6,745,151 B2 | 6/2004 | Marko et al. |
| 6,771,176 B2 | 8/2004 | Wilkerson |
| 6,788,207 B2 | 9/2004 | Wilkerson |
| 6,804,606 B2 | 10/2004 | Jones |
| 6,807,469 B2 | 10/2004 | Funkhosuer et al. |
| 6,810,362 B2 | 10/2004 | Adachi et al. |
| 6,819,986 B2 | 11/2004 | Hong et al. |
| 6,823,258 B2 | 11/2004 | Ukai et al. |
| 6,832,141 B2 | 12/2004 | Skeen et al. |
| 6,839,614 B1 | 1/2005 | Timko et al. |
| 6,850,823 B2 | 2/2005 | Eun et al. |
| 6,860,823 B2 | 2/2005 | Eun et al. |
| 6,865,457 B1 | 3/2005 | Mittelsteadt et al. |
| 6,868,386 B1 | 3/2005 | Henderson et al. |
| 6,879,962 B1 | 4/2005 | Smith et al. |
| 6,904,359 B2 | 6/2005 | Jones |
| 6,931,309 B2 | 8/2005 | Phelan et al. |
| 6,952,645 B1 | 10/2005 | Jones |
| 6,957,133 B1 | 10/2005 | Hunt et al. |
| 6,957,142 B2 | 10/2005 | Entenmann |
| 7,015,800 B2 | 3/2006 | Lesesky et al. |
| 7,030,781 B2 | 4/2006 | Jones |
| 7,069,118 B2 | 6/2006 | Coletrane et al. |
| 7,155,322 B2 | 12/2006 | Nakahara et al. |
| 7,191,058 B2 | 3/2007 | Laird et al. |
| 7,215,255 B2 | 5/2007 | Grush |
| 7,228,211 B1 | 6/2007 | Lowrey et al. |

(56) References Cited

U.S. PATENT DOCUMENTS

| | | | |
|---|---|---|---|
| 7,339,483 B1 | 3/2008 | Farmer |
| 7,356,392 B2 | 4/2008 | Hubbard et al. |
| 7,398,218 B1 | 7/2008 | Bernaski et al. |
| 7,449,993 B2 | 11/2008 | Lesesky et al. |
| 7,480,907 B1 | 1/2009 | Marolia et al. |
| 7,536,457 B2 | 5/2009 | Miller |
| 7,542,915 B2 | 6/2009 | Kendrick |
| 7,610,210 B2 | 10/2009 | Helitzer et al. |
| 7,695,282 B2 | 4/2010 | Lanktree |
| 7,707,049 B2 | 4/2010 | Van Cleave et al. |
| RE41,395 E | 6/2010 | Jambhekar et al. |
| 7,774,217 B1 | 8/2010 | Yager et al. |
| 7,783,426 B2 | 8/2010 | Kato et al. |
| 7,821,421 B2 | 10/2010 | Tamir et al. |
| 7,853,499 B2 | 12/2010 | Czupek et al. |
| 8,018,390 B2 | 9/2011 | Davidson et al. |
| 8,085,166 B2 | 12/2011 | Tamir et al. |
| 8,090,598 B2 | 1/2012 | Bauer et al. |
| 8,140,358 B1 | 3/2012 | Ling et al. |
| 8,373,567 B2 | 2/2013 | Denson |
| 2001/0044733 A1 | 11/2001 | Lee et al. |
| 2002/0027499 A1 | 3/2002 | Chainer et al. |
| 2002/0059156 A1 | 5/2002 | Hwang et al. |
| 2002/0070851 A1 | 6/2002 | Raichle et al. |
| 2002/0095249 A1 | 7/2002 | Lang |
| 2002/0105438 A1 | 8/2002 | Forbes et al. |
| 2002/0111725 A1 | 8/2002 | Burge |
| 2002/0121981 A1 | 9/2002 | Munch |
| 2002/0128882 A1 | 9/2002 | Nakagawa |
| 2002/0133273 A1 | 9/2002 | Lowrey et al. |
| 2002/0133275 A1 | 9/2002 | Thibault |
| 2002/0143447 A1 | 10/2002 | Miller |
| 2002/0150050 A1 | 10/2002 | Nathanson |
| 2002/0152115 A1 | 10/2002 | Morita et al. |
| 2002/0169529 A1 | 11/2002 | Kim |
| 2002/0173881 A1 | 11/2002 | Lash et al. |
| 2002/0173885 A1 | 11/2002 | Lowrey et al. |
| 2002/0178033 A1 | 11/2002 | Yoshioka et al. |
| 2003/0009270 A1 | 1/2003 | Breed |
| 2003/0009347 A1 | 1/2003 | Iwai et al. |
| 2003/0023568 A1 | 1/2003 | Perotti et al. |
| 2003/0033425 A1 | 2/2003 | Deshpande |
| 2003/0050747 A1 | 3/2003 | Kamiya |
| 2003/0052796 A1 | 3/2003 | Schmidt et al. |
| 2003/0065432 A1 | 4/2003 | Shuman et al. |
| 2003/0071730 A1 | 4/2003 | Valbh |
| 2003/0084005 A1 | 5/2003 | Wong et al. |
| 2003/0097335 A1 | 5/2003 | Moskowitz et al. |
| 2003/0112133 A1 | 6/2003 | Webb et al. |
| 2003/0163664 A1 | 8/2003 | Kanda |
| 2003/0167345 A1 | 9/2003 | Knight et al. |
| 2003/0182033 A1 | 9/2003 | Underdahl et al. |
| 2003/0187704 A1 | 10/2003 | Hashiguchi et al. |
| 2003/0191581 A1 | 10/2003 | Ukai et al. |
| 2003/0195694 A1 | 10/2003 | Kozak et al. |
| 2003/0204290 A1 | 10/2003 | Sadler et al. |
| 2003/0233261 A1 | 12/2003 | Kawahara et al. |
| 2004/0039610 A1* | 2/2004 | Weitermann ........... G06Q 40/08 705/4 |
| 2004/0039611 A1 | 2/2004 | Hong et al. |
| 2004/0083041 A1 | 4/2004 | Skeen et al. |
| 2004/0138790 A1 | 7/2004 | Kapolka et al. |
| 2004/0139034 A1 | 7/2004 | Farmer |
| 2004/0153362 A1 | 8/2004 | Bauer et al. |
| 2004/0167689 A1 | 8/2004 | Bromley et al. |
| 2004/0210353 A1 | 10/2004 | Rice |
| 2004/0217852 A1 | 11/2004 | Kolls |
| 2004/0236474 A1 | 11/2004 | Chowdhary et al. |
| 2004/0236596 A1 | 11/2004 | Chowdhary et al. |
| 2004/0260579 A1 | 12/2004 | Tremiti |
| 2005/0096809 A1 | 5/2005 | Skeen et al. |
| 2005/0131597 A1 | 6/2005 | Raz et al. |
| 2005/0137757 A1 | 6/2005 | Phelan et al. |
| 2005/1013159 | 6/2005 | Raz et al. |
| 2005/0174217 A1 | 8/2005 | Basir et al. |
| 2005/0182538 A1 | 8/2005 | Phelan et al. |
| 2006/0053038 A1 | 3/2006 | Warren et al. |
| 2006/0095301 A1 | 5/2006 | Gay |
| 2006/0106515 A1 | 5/2006 | Phelan et al. |
| 2006/0111817 A1 | 5/2006 | Phelan et al. |
| 2006/0122749 A1 | 6/2006 | Phelan et al. |
| 2006/0253307 A1 | 11/2006 | Warren et al. |
| 2007/0002878 A1 | 1/2007 | Moorti et al. |
| 2007/0027583 A1 | 2/2007 | Tamir et al. |
| 2007/0027726 A1 | 2/2007 | Warren et al. |
| 2007/0223408 A1 | 9/2007 | Thielke et al. |
| 2008/0065427 A1* | 3/2008 | Helitzer ................ G06F 19/00 705/4 |
| 2009/0152343 A1* | 6/2009 | Carter ................ G06Q 10/0637 235/379 |
| 2010/0150424 A1* | 6/2010 | Nepomniachtchi ........................ H04N 1/00204 382/140 |
| 2010/0174564 A1* | 7/2010 | Stender ................ G06Q 40/08 705/4 |
| 2010/0223080 A1 | 9/2010 | Basir et al. |
| 2010/0280675 A1* | 11/2010 | Tate, Jr. ................ H01M 10/44 700/295 |
| 2011/0091092 A1* | 4/2011 | Nepomniachtchi ........................ G06K 9/00463 382/139 |
| 2011/0161118 A1* | 6/2011 | Borden ................ G16H 10/60 705/4 |
| 2012/0230548 A1* | 9/2012 | Calman ................ G06K 9/00671 382/104 |
| 2012/0232935 A1* | 9/2012 | Voccola ................ G06Q 40/08 705/4 |
| 2012/0284058 A1* | 11/2012 | Varanasi ................ G06Q 40/08 705/4 |
| 2013/0046562 A1* | 2/2013 | Taylor ................ G06Q 40/00 705/4 |
| 2013/0290036 A1* | 10/2013 | Strange ................ G06Q 20/3276 705/4 |

FOREIGN PATENT DOCUMENTS

| | | |
|---|---|---|
| CA | 2151458 | 6/1994 |
| CA | 2164608 | 12/1994 |
| CA | 2 235 566 A1 | 8/1999 |
| CA | 2229238 | 8/1999 |
| CA | 2 531 662 A1 | 1/2005 |
| CN | 2196054 Y | 5/1995 |
| DE | 40 22 312 A1 | 1/1992 |
| DE | 195 22 940 A1 | 1/1997 |
| DE | 195 09 711 A1 | 10/1997 |
| DE | 195 09 711 C2 | 10/1997 |
| DE | 197 28 872 A | 1/1999 |
| DE | 101 10 579 A1 | 10/2001 |
| EP | 0 087 398 A2 | 8/1983 |
| EP | 0 129 949 A2 | 1/1985 |
| EP | 0 177 020 B1 | 4/1986 |
| EP | 0 517 331 A1 | 12/1992 |
| EP | 0 629 978 A1 | 12/1994 |
| EP | 0 633 552 A2 | 1/1995 |
| EP | 0 700 009 A2 | 3/1996 |
| EP | 0 700 009 A3 | 3/1996 |
| EP | 0 895 173 A3 | 2/1999 |
| EP | 0 935 208 A2 | 11/1999 |
| EP | 0 700 009 B1 | 3/2001 |
| EP | 1 096 430 A2 | 5/2001 |
| EP | 1 128 265 A9 | 8/2001 |
| EP | 1 176 054 | 9/2001 |
| EP | 1 158 273 A1 | 11/2001 |
| EP | 1 160 707 A1 | 12/2001 |
| EP | 1 164 551 A2 | 12/2001 |
| EP | 1 207 499 A1 | 5/2002 |
| EP | 1 241 599 A1 | 9/2002 |
| EP | 1 746 537 A3 | 1/2007 |
| ES | 2 108 613 A1 | 12/1997 |
| ES | 2 108 613 B1 | 8/1998 |
| FR | 2 533 049 A1 | 3/1984 |
| FR | 2 645 993 A1 | 10/1990 |
| FR | 2 667 962 A1 | 4/1992 |

(56) References Cited

FOREIGN PATENT DOCUMENTS

| | | |
|---|---|---|
| FR | 2 703 171 A1 | 9/1994 |
| FR | 2 712 106 A1 | 5/1995 |
| FR | 2 747 810 A1 | 10/1997 |
| FR | 2 822 566 A1 | 9/2002 |
| GB | 2 143 978 A | 2/1985 |
| GB | 2 225 461 A | 5/1990 |
| GB | 2 268 608 A | 1/1994 |
| GB | 2 286 369 | 11/1994 |
| GB | 2 286 369 A | 8/1995 |
| GB | 2 288 892 A | 11/1995 |
| GB | 2 308 527 A | 6/1997 |
| JP | 62-203064 | 9/1987 |
| JP | 1-175345 | 12/1989 |
| JP | 3-4660 A | 1/1991 |
| JP | 4-54666 | 2/1992 |
| JP | 4-182868 | 6/1992 |
| JP | 5-52608 | 3/1993 |
| JP | 05104985 A | 4/1993 |
| JP | 6-4733 | 1/1994 |
| JP | 6-64565 | 3/1994 |
| JP | 6-107068 | 4/1994 |
| JP | 6-202994 | 7/1994 |
| JP | 6-259632 | 9/1994 |
| JP | 6-331391 | 12/1994 |
| JP | 7-037134 | 2/1995 |
| JP | 7-159192 | 6/1995 |
| JP | 7-239885 | 9/1995 |
| JP | 8-96042 | 4/1996 |
| JP | 11-511581 | 10/1999 |
| JP | 2000 335450 A | 12/2000 |
| JP | 2001-76035 | 3/2001 |
| JP | 2001-283003 | 10/2001 |
| JP | 2002-117237 | 4/2002 |
| JP | 2002-149984 | 5/2002 |
| JP | 2002-183456 | 6/2002 |
| JP | 2002-203108 | 7/2002 |
| JP | 2002-230303 | 8/2002 |
| JP | 2002-230696 | 8/2002 |
| JP | 2002-259703 | 9/2002 |
| JP | 2002-259708 | 9/2002 |
| JP | 2002-260146 | 9/2002 |
| JP | 2002-297910 | 10/2002 |
| JP | 2002-319087 | 10/2002 |
| JP | 2002-358425 | 12/2002 |
| JP | 2002-373258 | 12/2002 |
| JP | 2003-006439 | 1/2003 |
| JP | 2003-76859 | 3/2003 |
| JP | 2003-150787 | 5/2003 |
| JP | 2003-178191 | 6/2003 |
| JP | 2004-30190 | 1/2004 |
| JP | 2004-102801 | 4/2004 |
| JP | 2004-295421 | 10/2004 |
| KR | 2003-0043196 | 6/2003 |
| NL | 1016618 | 11/2000 |
| WO | WO 84/03359 | 8/1984 |
| WO | WO 97/27561 A1 | 7/1987 |
| WO | WO 88/09023 | 11/1988 |
| WO | WO 89/12835 | 2/1989 |
| WO | WO 89/12865 A1 | 12/1989 |
| WO | WO 90/02388 A1 | 3/1990 |
| WO | WO 90/09645 A1 | 8/1990 |
| WO | WO 90/12366 A1 | 10/1990 |
| WO | WO 93/05492 A1 | 3/1993 |
| WO | WO 93/10510 | 5/1993 |
| WO | WO 93/21583 | 10/1993 |
| WO | WO 94/03004 | 2/1994 |
| WO | Wo 94/04975 | 3/1994 |
| WO | Wo 94/18645 | 8/1994 |
| WO | WO 94/25936 A1 | 11/1994 |
| WO | WO 94/28434 A1 | 12/1994 |
| WO | WO 95/13594 A1 | 5/1995 |
| WO | WO 96/15636 A1 | 5/1996 |
| WO | WO 97/13208 | 4/1997 |
| WO | WO 97/33382 A1 | 9/1997 |
| WO | WO 98/47109 | 10/1998 |
| WO | WO 99/21112 A1 | 4/1999 |
| WO | WO 00/17721 | 3/2000 |
| WO | WO 00/17800 A1 | 3/2000 |
| WO | WO 00/52616 | 9/2000 |
| WO | WO 00/79727 A2 | 12/2000 |
| WO | WO 01/18491 A1 | 3/2001 |
| WO | WO 01/26338 A2 | 4/2001 |
| WO | WO 01/52136 A1 | 7/2001 |
| WO | WO 01/55690 A1 | 8/2001 |
| WO | WO 01/73693 A2 | 10/2001 |
| WO | WO 01/86576 | 11/2001 |
| WO | WO 02/41119 A2 | 5/2002 |
| WO | WO 02/086422 A1 | 10/2002 |
| WO | WO 03/073339 A1 | 9/2003 |
| WO | WO 03/079151 A2 | 9/2003 |
| WO | WO 03/096128 A2 | 11/2003 |
| WO | WO 2004/038627 A1 | 5/2004 |
| WO | WO 2004/040405 A2 | 5/2004 |
| WO | WO 2004/040405 A3 | 5/2004 |
| WO | WO 2005/073926 A1 | 8/2005 |
| WO | WO 2005/083605 A1 | 9/2005 |
| WO | WO 2006/028484 A1 | 3/2006 |

OTHER PUBLICATIONS

Appeal No. 2014-1637 of CBM2012-00003, Reply Brief of Cross-Appellant Liberty Mutual Insurance Co., *Progressive Casualty Insurance Co. V. Liberty Mutual Insurance Co.*, United States Court of Appeals for the Federal Circuit May 11, 2015, 44 pages.

Appeal No. 14-1466 of CBM2012-00002, Appeal No. 14-1538 of CBM 2012-00010, Appeal No. 14-1549 of CBM2013-00002, Appeal No. 14-1586 of CBM2013-00009, Appeal No. 2014-1656 of CMB 2012-00004, Notice of Entry of Judgment Accompanied by Opinion, *Progressive Casualty Insurance Co. V. Liberty Mutual Insurance Co.*, United States Court of Appeals for the Federal Circuit, Aug. 24, 2015, 19 pages.

Asset Management, Webarchive from Asset Management website re AirIQ OnBoard device, printed from the Internet at <http://airiq.com/print_friendly.cfm?chapterID=11&PageID=67&SegmentID=99&printi . . . > 2003. 1 page.

Bell, M. P., "An In-Vehicle Data Logger," Proceedings of the International Symposium on Automotive Technology & Automation with particular reference to Computer Aided Engineering and Manufacturing, vol. 2, Wolfsburg Sep. 13-17, 1982, pp. 61-82.

Birch, G., "Compact Device Automates Business Mileage Recording," Autoledger, Rough Notes, Mar. 1995, pp. 76-79.

Bloomberg Businessweek, "A Flight Data Recorder for Your Car," Business Week, posted on Nov. 6, 2003, at <http://www.businessweek.com/stories/2003-11-06/a-flight-data-recorder-for-your-car>, 3 pages.

Boyce, Thomas E., "Identifying Functional Relationships in Driver Risk Taking: An Intelligent Transportation Assessment of Problem Behavior and Driving Style," Dissertation submitted to the Faculty of the Virginia Polytechnic Institute and State University, Feb. 16, 1999, 91 pages.

Brewer, Darren, "Analyzing Safety Ratings and SafeStat Scores." Carrier411 Services, Inc., copyright 2012. printed from the internet at http://www.carrier411.com/safety-ratings-safestat-scores.cfm>, on Jan. 19, 2012, 6 pages.

Butler, Patrick, "An Alternative to the High-Risk-Driver Theory: Adverse Selection Induced by Per-Car Premiums," National Organization for Women, Paper presented Aug. 9 at the 2004 Annual Meeting, of the American Risk & Insurance Association in Chicago, 2004, 24 pages.

Cambourakis. G, et al., "Black Box for Surface Vehicles A.R.G.O.S. Analysis and Software Development," Communication & Media Laboratory, National Technical University of Athens, Electrical and Computer Engineering Dept., Computer Science Division, IEEE Catalog No. 95TH8081, 1995, pp. 564-568.

Cardoso, Ruy A., Discussion of Patrick Butlers "Cost-Based Pricing of individual Automobile Risk Transfer: Car-Mile Exposure Unit Analysis," Journal of Actuarial Practice, vol. 1, No. 1, 1993, pp. 69-84.

Chordas, Lori, "Pay As You Go," Best's Review, vol. 104, No. 5, Sep. 2003, pp. 126-129.

(56) References Cited

OTHER PUBLICATIONS

Chowdry, M, "Automotive Driver Safety Profile System" Provisional Patent Application, filed Feb. 27, 2003, in the United States Patent and Trademark Office, 17 pages.
Consumers' Association of Canada Auto Insurance Rates Study, Review of Automobile Insurance Rates, Sep. 2003, pp. 1-28 pages.
Coonley, Phillip S. et al., "Assessment of Insurance Incentives for Safety Belt Use," U.S. Department of Transportation, National Highway Safety Administration, Final Report No. DOT HS-806 747, May 12, 1983, pp. 159 pages.
Cummins, J. David et al., "Capital and Risk in Property-Liability Insurance Markets," Journal of Banking & Finance, vol. 20, 1996, pp. 1069-1092.
Cummins, J. David et al., "Controlling Automobile Insurance Costs," The Journal of Economic Perspectives, vol. 6, No. 2, Spring 1992, pp. 95-115.
Davis DriveRight, Vehicle Management Software, Davis Instruments, Feb. 10, 1999, 12 pages.
DavisInstruments, CarChip® Pro, ODII—Based Vehicle Data Logger and Software 8226, DS8226, Rev. A. Jun. 18, 2007, 3 pages.
Duri, Sastry et al., "Data Protection and Data Sharing Telematics," Mobile Networks and Applications, vol. 9, 2004. pp. 693-701.
Edlin, Aaron S., "Per-Mile Premiums for Auto Insurance," Department of Economics, UC Berkeley, Jan. 27, 1999, pp. 1-53.
European Telecommunications Standards Institute, "General Packet Radio Service, GPRS," web page, ETSI, 2012, printed from the internet at <http://www.etsi.org/index/php/technologies-clusters/technologies/mobile/gprs> on Jan. 17, 2013, 2 pages.
Ferguson, Glover T. et al, "Reality online: The Business Impact of a Virtual World," Outlook, Special Edition, Accenture, Sep. 2002, pp. 1-25.
Fincham, Bill, "Watching How You Drive: Installing a 'Black Box' to Record Vehicle Accident information Could Reduce Risks for Drivers, says Bill Fincham (M); but would such a device be considered an unacceptable intrusion?," IEE Review, May 1996, pp. 97-100.
Funderburg, Keri et al., "Changing Insurance One Mile at a Time," Contingencies, Nov./Dec. 2003, pp. 34-38.
Geostar Corporation Annual Report 1987, Geostar Corporation, Aug. 18, 1988, 48 pages.
Geostar, "Understanding Radio Determination Satellite Service," Geostar Corporation, May 1989, 60 pages.
Geostar, Annual Report on Form 10-K for the fiscal year ended Dec. 31, 1989, Commission File No. 0-16868, Geostar Corporation, received by Securities and Exchange Commission Apr. 16, 1990, 252 pages.
Geostar, NASM Archives, Geostar Corporation Records, 2006-0049, 2006, 416 pages.
Geostar, United States of America Securities and Exchange Commission Attestation, Annual Report on Form 10-K for the fiscal year ended Dec. 31, 1989, Commission File No. 0-16868, Geostar Corporation, received by Securities and Exchange Commission Apr. 16, 1990, 255 pages.
Global Engineering Document, "World's First Vehicle 'Black Box' Standard Underway at IEEE," Automotive, vol. 4, No. 2, 2002, 2 pages.
Goller, Manfred, "Application of GSM in High Speed Trains: Measurements and Simulations," The Institution of Electrical Engineers, copyright 1995, 7 pages.
Greene, Nathanael et al., "Getting the Sticker Price Right: incentives for Cleaner, More Efficient Vehicles," Pace Environmental Law Review, vol. 12, No. 1, Fall 1994. pp. 91-102.
Griffiths, John, "Now It's Much Easier to Track the Trucks: This Satellite-Based System Can Boost Efficiency for Companies and Benefit Drivers, says John Griffiths: [Surveys Edition]," Financial Times, Feb. 23, 1998, 1 page.
Guensler, Randall et al., "Current State Regulatory Support for Pay-As-You-Drive Automobile Insurance Options," Journal of Insurance Regulation, National Association of Insurance Commissioners Volume, 2003. 16 pages.

Hamilton, Tyler, "Information on the Highway—Trucking, Insurance, and More will be Revolutionized by Ways Computers, Global Positioning, Wireless, and the Internet Can Keep Track of Vehicles," The Toronto Star, Jan. 22, 2001, 4 pages.
Harper, J.G., "Traffic Violation Detection and Deterrence: Implications for Automatic Policing," Applied Ergonomics, vol. 22, No. 3, 1991, pp. 189-197.
Harrington, Lisa, "Fleets Catch Up with Technology: It's Not Star Wars, But Here's a Look at the Latest in Truck Equipment and Technology," T&D, Apr. 1995. pp. 30-35.
Harrington, Scott E. et al., Abstract of "The Economics and Politics of Automobile Insurance Rate Classification," The Journal of Risk and Insurance, vol. 60, No. 1, Mar. 1993, pp. 59-84.
Hubbard, Jonathan et al., "Method and System for Evaluating Performance of a Vehicle and/or Operator," Provisional Patent Application, filed May 15, 2003 in the United States Patent and Trademark Office, 22 pages.
Hubbard, Jonathan et al., "System and Method for Determining and Sending Recommended Departure Times Based on Predicted Traffic Conditions to Road Travelers," Provisional Patent Application, filed Jul. 25, 2003 in the United States Patent and Trademark Office, 21 pages.
Hudson, Laurel A. et al., "Potential Consumer Research Contributions to Combating Drinking and Driving Problems," Advances in Consumer Research, vol. 11, 1984, pp. 676-681, printed from the Internet at http://www.acrwebsite.org/search/search/view-conference-proceedings.aspx?ID-6330> on Sep. 7, 2012, 7 pages.
Imrick, Suzanne, "Speed: A Limited Future?," 59th RoSPA National Road Safety Congress, Proceedings Mar. 14-16, 1994, Sparton Corporation, 6 pages.
Insurance Services Office, Personal Auto Manual North Carolina, Insurance Services Office, 1980, 76 pages.
Ippisch, Tobias, "Telematics Data in Motor Insurance: Creating Value by Understanding the Impact of Accidents on Vehicle Use," Dissertation No. 3829, University of St. Gallen Graduate School of Business Administration, Economics, Law, and Social Sciences (HSG), Lulu Enterprises, Inc., 2010. 187 pages.
Jacobson, M., "Controlling the Accident Repair Cost Spiral," Automotive Engineer, Jun./Jul. 1995, pp. 50-51.
Juliussen, Dr. Egil, "The Future of Automotive Telematics." Business Briefing, Global Automotive Manufacturing & Technology. 2003, pp. 1-4.
Jurgen, Ronald K. ed., Excerpt from Automotive Microcontrollers, Automotive Electronics Handbook, McGraw-Hill, Inc., 1995, pp. 11.24-11.29.
Jurgen, Ronald K. ed., Smart Cars and Highways Go Global, Special Report / Transportation, IEEE Spectrum, May 1991, pp. 26-36.
Khazzoom, J. Daniel. "What We Know About Uninsured Motorists and How Well We Know What We Know," Discussion Paper 98-09-REV, Dec. 1997, Revised Apr. 2000, Resources for the Future, copyright 2000, 31 pages.
Knipling, Ronald et al., "Changing Driver Behavior with On-Board Safety Monitoring," ITS Quarterly, vol. 8, No. 2, Spring 2000, pp. 27-37.
Ligas, Joseph F., "World's Largest Test of Dynamic route Guidance: Advance Opening," Intelligent Highway Systems, Supplement to ENR, Nov. 28, 1994, pp. 12-14.
Litman, Todd A, "Implementing Pay-As-You-Drive Vehicle Insurance," Policy Options, The Institute for Public Policy Research, London, Jul. 2002, 14 pages.
Murray, Dr. Will, "Company Vehicle Incident Reporting and Recording (CoVIR)," Road Safety Research Report No. 31, Centre for Automotive Industries Management (CAIM), Nottingham Business School, Department for Transport: London, Apr. 2003, 179 pages.
Nakajima, M. et al., "Development of a Driving Data Recorder for Commercial Vehicles and Its Applications," Hino Motors Ltd., Sawafuji Electric Co. Ltd., Japan, ISATA 84031, 18 pages.
Neuhardt, J. B. et al., "Correlates of Test Driver Measurements and User Accidents," Final Report, A Cooperative Research Project between the Ohio Department of Transportation, U.S. Department of Transportation, Federal Highway Administration, and Systems Research Group, Jan. 1974, 98 pages.

(56) References Cited

OTHER PUBLICATIONS

Norwich Union: Pay As You Drive, web page, printed from the internet at <http://web.archive.org/web/20030218102646/http://www.norwichunion.c . . . > on Oct. 2, 2012, 2 pages.
NY State Dept. of Public Service, Comments of the New York State Department of Public Service in the Matter of the Review of the Commission's Rules Regarding the Pricing of Unbundled Network Elements and the Resale of Service by Incumbent Local Exchange Carriers, WC Docket No. 03-173, FCC 03-224, Dec. 15, 2003, 570 pages.
O'Donnell, A., "Norwich Pilots Telematics: UK Insurer is betting the time is right for usage-based auto insurance,"Insurance & Technology, May 2003, pp. 8.
Ogle, Jennifer et al., "Accuracy of Global Positioning System for Determining Driver Performance Parameters," Transportation Research Record 1818, Paper No. 02-1063, 2002, pp. 12-24.
Onken, Reiner, "DAISY, an Adaptive, Knowledge-based Driver Monitoring and Warning System," IEEE, 1994 Vehicle Navigation & Information Systems Conference Proceedings, 1994, pp. 3-10.
OnStar.com, "What is OnStar: Emergency Services," web page, OnStar Corp., copyright 2002, printed from the internet at <web archive.org/.../ao_emergency.htm>, 1 page.
OnStar.com. "What is OnStar: Remote Door Unlock," web page, OnStar Corp., copyright 2002, printed from the internet at <web.archive.org/.../ao_remot_door.htm, 1 page.
Paine, Michael, Speed Control Devices for Cars, Research Report RR 5/96, Roads and Traffic Authority, Road Safety & Traffic Management, Jul. 1996, 63 pages.
Praeger Publishers, "Transportation Infostructures, The Development of Intelligent Transportation Systems," The Diebold Institute for Public Policy Studies, Inc., Praeger Publishers, 1995, 30 pages.
Sadler, J., "'Revolution' In Motor," Insurance Brokers' Monthly and Insurance Advisor, vol. 52, No. 3, Mar. 2002, 1 page.
Sage, Andrew P., "Methodologies for Risk and Hazard Assessment: A Survey and Status Report," IEEE Transactions on Systems, Man, and Cybernetics, vol. SMC-10, No. 8, Aug. 1980, pp. 425-446.
SAS Institute White Paper, A SAS Institute White Paper: Data Mining in the Insurance Industry, SAS Institute Inc., 2000, 17 pages.
Shigematsu, A., "Online Database System for Auto Insurance," vol. 13, No. 3, 1976, pp. 59-63.
Sloan, Frank A. et al., "Drinking, Driving, and the Price of Automobile Insurance," Journal of Risk and Insurance, vol. 61, No. 1, 1994, printed from the internet at <http://www.freepatentsonline.com/article/Journal-Risk-Insurance/154260 . . . >, on Jul. 1, 2012, 9 pages.
Sloan, Frank. A., et al. "Effects of Tort Liability and Insurance on Heavy Drinking and Drinking and Driving," Journal of Law and Economics, vol. 38, No. 1, Apr. 1995, pp. 49-77.
Smith, Cheryl. "Big Brother Knows You're Speeding—Rental-Car Companies Install Devices that Can Monitor a Customer's Whereabouts," The Wall Street Journal, Aug. 28, 2001, 2 pages.
Stroinski, Krzystof J. et al., "Selection of Variables for Automobile Insurance Rating." Insurance: Mathematics and Economics, vol. 8, 1989, pp. 35-46.
SWOV, "Black Box Study Shows a Reduction in the Number of Accidents," located at <http://www.swov.nl/en/actueel/swovschrift/Black_box_study_shows_a_reduction_in_the_number_of_accidents.html>, SWOV Research Activities, Oct. 1997, 2 pages.
Tamir, Asaf et al., "Traffic Information System," Provisional Patent Application, filed Jul. 7, 2003 in the United States Patent and Trademark Office, 28 pages.
U.S. Department of Justice, "Vehicle Tracking Devices," National Institute of Justice Standard-0223.00, U.S. Department of Justice, May 1986, 28 pages.
U.S. Department of Transportation, Research on Vehicle-Based Driver Status/Performance Monitoring: Seventh Semi-Annual Research Report, Report No. DOT HS 808 299, U.S. Department of Transportation, National Highway Traffic Safety Administration, Jun. 15, 1995, 136 pages.

Ueyama, Masaru et al., "Relationship Between Driving Behavior and Traffic Accidents—Accident Data Recorder and Driving Monitor Recorder," Paper No. 98-S2-O-06, 1998 pp. 402-409.
Vickrey, William, "Automobile Accidents, Tort Law, Externalities, and Insurance: An Economist's Critique," Law and Contemporary Problems, vol. 33, 1968, pp. 464-487.
Viegas, Jose M., "Making Urban Road Pricing Acceptable and Effective: Searching for Quality and Equity in Urban Mobility," Transport Policy, vol. 8, 2001, pp. 289-294.
Vincent, John W., II, "Measuring the Driver Safety Frequency Rate," Risk Management, vol. 41, No. 8, 1994, 2 pages.
Weaver, C. Alex. "Pay-As-You-Drive Insurance: How to Save Money (and Help Out Society)," Juris Doctor Candidate 2011. Florida State University College of Law, 28 pages.
Wenzel, Tom, "Analysis of National Pay-As-You-Drive Insurance Systems and Other Variable Driving Charges," Energy & Environment Division, Lawrence Berkeley Laboratory, University of California, Jul. 1995, 74 pages.
Whitfield, Kermit, "Making Telematics Pay," Automotive Design & Production, vol. 115, No. 5, May 2003. pp. 48-49.
Woodroof, Jon et al., "Continuous Audit Implications of Internet Technology: Triggering Agents Over the Web in the Domain of Debt Covenant Compliance," Proceedings of the 34th Hawaii International Conference on System Sciences, IEEE, 2001, 8 pages.
Wouters, Peter I.J. et al., "Traffic Accident Reduction by Monitoring Driver Behavior with In-Car Data Recorders," Accident Analysis Prevention, vol. 32, 2000, pp. 643-650.
Wright, David J., "Strategic Impact of Broadband Telecommunications in Insurance, Publishing, and Health Care," IEEE Journal on Selected Areas in Communications, vol. 10, No. 9. Dec. 1992, pp. 1369-1381.
Wright, Tom, "Eyes on the Road: Intelligent Transportation Systems and Your Privacy," Information and Privacy Commissioner/Ontario, Mar. 1995, 22 pages.
Young, Virginia R., Abstract of "Insurance Rate Changing: A Fuzzy Logic Approach," The Journal of Risk and Insurance, vol. 63, No. 3, 1996, pp. 461-484, printed from the internet at <http://www.jstor.org/discover/10.2307/253621?uid=3739656&uid=2129 . . . >, 3 pages.
Defendants' Local Patent Rule 3.5 and 3.6 Initial Invalidity and Unenforceability Contentions and Document Production—U.S. Pat. Nos. 6,064,970; 8,090,598; and 8,140,358, Case Nos. 1:10-cv-01370-BYP, 1:11-CV-00082-BYP, 1:12-cv-01068-BYP, 1:12-cv-01070-BYP, filed Jan. 18, 2013, 72 pages.
Exhibits A1-A5 of Defendants' Local Patent Rule 3.5 and 3.6 Initial Invalidity and Unenforceability Contentions and Document Production—U.S. Pat. Nos. 6,064,970; 8,090,598; and 8,140,358, Case Nos. 1:10-cv-01370-BYP, 1:11-CV-00082-BYP, 1:12-cv-01068-BYR 1:12-cv-01070-BYP, filed Jan. 18, 2013, 48 pages.
Exhibits B1-B5 of Defendants' Local Patent Rule 3.5 and 3.6 Initial Invalidity and Unenforceability Contentions and Document Production—U.S. Pat. Nos. 6,064,970; 8,090,598; and 8,140,358, Case Nos. 1.10-cv-01370-BYP, 1:11-CV-00082-BYP, 1:12-cv-01068-BYP, 1:12-cv-01070-BYP, filed Jan. 18, 2013, 78 pages.
Exhibits C1-C12 of Defendants' Local Patent Rule 3.5 and 3.6 Initial Invalidity and Unenforceability Contentions and Document Production—U.S. Pat. Nos. 6,064,970; 8,090,598; and 8,140,358, Case Nos. 1:10-cv-01370-BYP, 1:11-CV-00082-BYP, 1:12-cv-01068-BYP, 1:12-cv-01070-BYP, filed Jan. 18, 2013, 567 pages.
Exhibits D1-D10 of Defendants' Local Patent Rule 3.5 and 3.6 Initial Invalidity and Unenforceability Contentions and Document Production—U.S. Pat. Nos. 6,064,970; 8,090,598; and 8,140,358, Case Nos. 1:10-cv-01370-BYP, 1:11-CV-00082-BYP, 1:12-cv-01068-BYP, 1:12-cv-01070-BYP, filed Jan. 18, 2013, 847 pages.
Exhibits E1-E19 of Defendants' Local Patent Rule 3.5 and 3.6 Initial Invalidity and Unenforceability Contentions and Document Production—U.S. Pat. Nos. 6,064,970: 8,090,598; and 8,140,358, Case Nos. 1:10-cv-01370-BYP, 1:11-CV-00082-BYP, 1:12-cv-01068-BYP, 1:12-cv-01070-BYP, filed Jan. 18, 2013, 199 pages.
Exhibits F1-F17 of Defendants' Local Patent Rule 3.5 and 3.6 Initial Invalidity and Unenforceability Contentions and Document Production—U.S. Pat. Nos. 6,064,970; 8,090,598; and 8,140,358, Case

(56) References Cited

OTHER PUBLICATIONS

Nos. 1:10-cv-01370-BYP, 1:11-CV-00082-BYP, 1:12-01068-BYP, 1:12-cv-01070-BYP, filed Jan. 18, 2013, 282 pages.
Exhibits M1-M3 of Defendants' Local Patent Rule 3.5 and 3.6 Initial Invalidity and Unenforceability Contentions and Document Production—U.S. Pat. Nos. 6,064,970; 8,090,598; and 8,140,358, Case Nos. 1:10-cv-01370-BYP, 1:11-CV-00082-BYP, 1:12-cv-01068-BYP, 1:12-cv-01070-BYP, filed Jan. 18, 2013, 1313 pages.
Case No. 1:10-cv-01370-BYP, Plaintiff Progressive Casualty Insurance Company's Notice of Conclusion of Reexamination, *Progressive Casualty Insurance Company* versus *Safeco Insurance Company et al.*, U.S. District Court, Northern District of Ohio (Cleveland), filed Feb. 3, 2012, 7 pages.
Case No. 1:10-cv-01370-BYP, Joint Motion to Refer Case to Mediation, *Progressive Casualty Insurance Company* versus *Safeco Insurance Company et al.*, U.S. District Court, Northern District of Ohio (Cleveland), filed Apr. 2, 2012, 4 pages.
Case No. 1:10-cv-01370-BYP, Order Setting Mediation Conference, *Progressive Casualty Insurance Company* versus *Safeco Insurance Company et al.*, U.S. District Court, Northern District of Ohio (Cleveland), dated Apr. 6, 2012, 4 pages.
Case No. 1:10-cv-01370-BYP, Joint Status Report Concerning Mediation, *Progressive Casualty Insurance Company* versus *Safeco Insurance Company et al.*, U.S. District Court, Northern District of Ohio (Cleveland), filed Jun. 1, 2012, 2 pages.
Case No. 1:10-cv-01370-BYP, Motion for Leave to File First Amended Complaint, *Progressive Casualty Insurance Company* versus *Safeco Insurance Company et al.*, U.S. District Court, Northern District of Ohio (Cleveland), filed Aug. 21, 2012, 326 pages.
Case No. 1:10-cv-01370-BYP, First Amended Complaint, *Progressive Casualty Insurance Company* versus *Safeco Insurance Company et al.*, U.S. District Court, Northern District of Ohio (Cleveland), filed Sep. 21, 2012, 317 pages.
Case No. 1:10-cv-01370-BYP, Joint Notice, *Progressive Casualty Insurance Company* versus *Safeco Insurance Company et al.*, U.S. District Court, Northern District of Ohio (Cleveland), filed Oct. 9, 2012, 7 pages.
Case No. 1:10-cv-01370-BYP, Combined Supplemental Notice of Plaintiff Progressive Casualty Insurance Company, *Progressive Casualty Insurance Company* versus *Safeco Insurance Company et al.*, U.S. District Court, Northern District of Ohio (Cleveland), filed Oct. 10, 2012, 5 pages.
Case No. 1:10-cv-01370-BYP, Liberty Mutual's Answer and Counterclaims to Plaintiff's First Amended Complaint, *Progressive Casualty Insurance Company* versus *Safeco Insurance Company et al.*, U.S. District Court, Northern District of Ohio (Cleveland), filed Oct. 16, 2012, 130 pages.
Case No. 1:10-cv-01370-BYP, Motion to Lift Moratorium on Formal Discovery, *Progressive Casualty Insurance Company* versus *Safeco Insurance Company et al.*, U.S. District Court, Northern District of Ohio (Cleveland), filed Oct. 19, 2012, 5 pages.
Case No. 1:10-cv-01370-BYP, Defendants' Motion to Stay Litigation Pending Covered Business Method Patent Review of the Patents-in-Suit by the United States Patent and Trademark Office, *Progressive Casualty Insurance Company* versus *Safeco Insurance Company et al.*, U.S. District Court, Northern District of Ohio (Cleveland), filed Oct. 25. 2012, 292 pages.
Case No. 1:10-cv-01370-BYP, Liberty Mutual Defendants' Opposition to Plaintiff's Motion to Lift Moratorium on Formal Discovery, *Progressive Casualty Insurance Company* versus *Safeco Insurance Company et al.*, U.S. District Court, Northern District of Ohio (Cleveland), filed Oct. 26, 2012, 13 pages.
Case No. 1:10-cv-01370-BYP, Order regarding Plaintiff's Motion to Lift Moratorium on Formal Discovery, *Progressive Casualty Insurance Company* versus *Safeco Insurance Company et al.*, U.S. District Court, Northern District of Ohio (Cleveland), dated Nov. 1, 2012, 1 page.
Case No. 1:10-cv-01370-BYP, Progressive Casualty Insurance Company's Answer to Defendants' Counterclaims, *Progressive Casualty Insurance Company* versus *Safeco Insurance Company et al.*, U.S. District Court, Northern District of Ohio (Cleveland), filed Nov. 6. 2012, 17 pages.
Case No. 1:10-cv-01370-BYP, Plaintiff's Memorandum in Opposition to Defendants' Motion to Stay Litigation Pending Covered Business Method Patent Review of the Patents-in-Suit by the United States Patent and Trademark Office, *Progressive Casualty Insurance Company* versus *Safeco Insurance Company et al.*, U.S. District Court, Northern District of Ohio (Cleveland), filed Nov. 8, 2012, 9 pages.
Case No. 1:10-cv-01370-BYP, Defendants' Reply Memorandum in Support of Their Motion to Stay Litigation Pending Covered Business Method Patent Review of the Patents-in-Suit by the United States Patent and Trademark Office, *Progressive Casualty Insurance Company* versus *Safeco Insurance Company et al.*, U.S. District Court, Northern District of Ohio (Cleveland), filed Nov. 15, 2012, 13 pages.
Case No. 1:10-cv-01370-BYP, Order regarding Motions to Stay, *Progressive Casualty Insurance Company* versus *Safeco Insurance Company et al.*, U.S. District Court, Northern District of Ohio (Cleveland), dated Dec. 18, 2012, 2 pages.
Case No. 1:10-cv-01370-BYP, Liberty Mutual's Notice Regarding Status of Covered Business Method Patent Petitions, *Progressive Casualty Insurance Company* versus *Safeco Insurance Company et al.*, U.S. District Court, Northern District of Ohio (Cleveland), filed Feb. 6, 2013, 90 pages.
Case No. 1:10-cv-01370-BYP, Liberty Mutual Defendants' Motion for Expedited Briefing, *Progressive Casualty Insurance Company* versus *Safeco Insurance Company et al.*, U.S. District Court, Northern District of Ohio (Cleveland), filed Feb. 8, 2013, 8 pages.
Case No. 1:10-cv-01370-BYP, Liberty Mutual Defendants' Motion to Require Plaintiff to Select Representative Claims for the Asserted Patents, *Progressive Casualty Insurance Company* versus *Safeco Insurance Company et al.*, U.S. District Court, Northern District of Ohio (Cleveland), filed Feb. 8, 2013, 38 pages.
Case No. 1:10-cv-01370-BYP, Plaintiff's Opposition to Liberty Mutual Defendants' Motion for Expedited Briefing, *Progressive Casualty Insurance Company* versus *Safeco Insurance Company et al.*, U.S. District Court, Northern District of Ohio (Cleveland), filed Feb. 12, 2013, 6 pages.
Case No. 1:10-cv-01370-BYP, Liberty Mutual Defendants' Reply in Support of Their Motion for Expedited Briefing, *Progressive Casualty Insurance Company* versus *Safeco Insurance Company et al.*, U.S. District Court, Northern District of Ohio (Cleveland), filed Feb. 12, 2013, 6 pages.
Case No. 1:10-cv-01370-BYP, Plaintiff's Opposition to Liberty Mutual's Motion to Require Plaintiff to Select Representative Claims for the Asserted Patents, *Progressive Casualty Insurance Company* versus *Safeco Insurance Company et al.*, U.S. District Court, Northern District of Ohio (Cleveland), filed Feb. 22, 2013, 65 pages.
Case No. 1:10-cv-01370-BYP, Liberty Mutual Defendants' Reply in Support of Their Motion to Require Plaintiff to Select Representative Claims for the Asserted Patents, *Progressive Casualty Insurance Company* versus *Safeco Insurance Company et al.*, U.S. District Court, Northern District of Ohio (Cleveland), filed Mar. 1, 2013, 42 pages.
Case No. 1:10-cv-01370-BYP, Liberty Mutual Defendants' Renewed Motion to Stay Litigation Pending Covered Business Method Patent Review of the Patents-in-Suit by the United States Patent and Trademark Office, *Progressive Casualty Insurance Company* versus *Safeco Insurance Company et al.*, U.S. District Court, Northern District of Ohio (Cleveland), filed Mar. 4, 2013, 212 pages.
Case No. 1:10-cv-01370-BYP, Plaintiff's Opposition to the Liberty Mutual Defendants' Renewed Motion to Stay Litigation Pending Covered Business Method Review of the Patents-in-Suit by the United States Patent and Trademark Office, *Progressive Casualty Insurance Company* versus *Safeco Insurance Company et al.*, U.S. District Court, Northern District of Ohio (Cleveland), filed Mar. 18, 2013, 18 pages.
Case No. 1:10-cv-01370-BYP, Reply Memorandum in Support of Liberty Mutual Defendants' Renewed Motion to Stay Litigation Pending Covered Business Method Patent Review of the Patents-

(56) References Cited

OTHER PUBLICATIONS in-Suit by the United States Patent and Trademark Office, *Progressive Casualty Insurance Company* versus *Safeco Insurance Company et al.*, U.S. District Court, Northern District of Ohio (Cleveland), filed Mar. 25, 2013, 97 pages.
Case No. 1:10-cv-01370-BYP, Liberty Mutual's Third Notice Regarding Status of Covered Business Method Patent Petitions, *Progressive Casualty Insurance Company* versus *Safeco Insurance Company et al.*, U.S. District Court, Northern District of Ohio (Cleveland), filed Apr. 1, 2013, 41 pages.
Case No. 1:10-cv-01370-BYP, Order Staying Case, *Progressive Casualty Insurance Company* versus *Safeco Insurance Company et al.*, U.S. District Court, Northern District of Ohio (Cleveland), dated Apr. 17, 2013, 23 pages.
Case No. 1:10-cv-01370-BYP, Civil Docket, *Progressive Casualty Insurance Company* versus *Safeco Insurance Company of Illinois et al.*, U.S. District Court, Northern District of Ohio (Cleveland), dated Apr. 17, 2013, 17 pages.
Case No. 1:11-cv-00082-BYP, Original Summons and Magistrate Consent Form Issued for Service Upon Allstate Insurance Company et al., *Progressive Casualty Insurance Company* versus *Allstate Insurance Company et al.*, U.S. District Court, Northern District of Ohio (Cleveland), filed Jan. 13, 2011 14 pages.
Case No. 1:11-cv-00082-BYP, Safeco and Liberty Mutual Defendant's Motion to Extend Time to File Responsive Pleadings with Consent of Plaintiff, *Progressive Casualty Insurance Company* versus *Allstate Insurance Company et al.*, U.S. District Court, Northern District of Ohio (Cleveland), filed Jan. 25, 2011, 5 pages.
Case No. 1:11-cv-00082-BYP, Allstate Insurance Company et al. Answer, Affirmative Defenses, and Counterclaims to Amended Complaint, *Progressive Casualty Insurance Company* versus *Allstate Insurance Company et al.*, U.S. District Court, Northern District of Ohio (Cleveland), filed Jan. 28, 2011, 37 pages.
Case No. 1:11-cv-00082-BYP, Progressive Casualty Insurance Company's Answer to the Allstate Defendants' Counterclaims, *Progressive Casualty Insurance Company* versus *Allstate Insurance Company et al.*, U.S. District Court, Northern District of Ohio (Cleveland), filed Feb. 18, 2011, 9 pages.
Case No. 1:11-cv-00082-BYP, Order Granting Allstate Defendants' Motion to Appear Pro Hac Vice, *Progressive Casualty Insurance Company* versus *Allstate Insurance Company et al.*, U.S. District Court, Northern District of Ohio (Cleveland), dated Mar. 3, 2011, 1 page.
Case No. 1:11-cv-00082-BYP, Liberty Mutual Defendants' Answer and Counterclaims to Plaintiff's Amended Complaint, *Progressive Casualty Insurance Company* versus *Allstate Insurance Company et al.*, U.S. District Court, Northern District of Ohio (Cleveland), filed Mar. 14, 2011, 30 pages.
Case No. 1:11-cv-00082-BYP, Drive Trademark Holdings, LP's Answer to Counterclaim, *Progressive Casualty Insurance Company* versus *Allstate Insurance Company et al.*, U.S. District Court, Northern District of Ohio (Cleveland), filed Mar. 17, 2011, 6 pages.
Case No. 1:11-cv-00082-BYP, Defendants Allstate Insurance Company et al. Notice of Service of Initial Disclosures, *Progressive Casualty Insurance Company* versus *Allstate Insurance Company et al.*, U.S. District Court, Northern District of Ohio (Cleveland), filed Mar. 25, 2011, 3 pages.
Case No. 1:11-cv-000B2-BVP, Progressive Casualty Insurance Company's Answer to Liberty Mutual's Counterclaims, *Progressive Casualty Insurance Company* versus *Allstate Insurance Company et al.*, U.S. District Court, Northern District of Ohio (Cleveland), filed Apr. 4, 2011, 5 pages.
Case No. 1:11-cv-00082-BYP, Notice of New Legal Authority Relevant to Liberty Mutual Defendants' Motion to Sever, *Progressive Casualty Insurance Company* versus *Allstate Insurance Company et al.*, U.S. District Court, Northern District of Ohio (Cleveland), filed Apr. 13, 2011, 6 pages.
Case No. 1:11-cv-00082-BYP, Liberty Mutual Defendants' Motion for Extension of Time in Which to Serve Responses to Progressive's First Sets of Interrogatories and Requests for Production, *Progressive Casualty Insurance Company* versus *Allstate Insurance Company et al.*, U.S. District Court, Northern District of Ohio (Cleveland), filed Apr. 14, 2011, 57 pages.
Case No. 1:11-cv-00082-BYP, Joint Motion for Entry of Stipulated Protective Order, *Progressive Casualty Insurance Company* versus *Allstate Insurance Company et al.*, U.S. District Court, Northern District of Ohio (Cleveland), filed Apr. 15, 2011; 19 pages.
Case No. 1:11-cv-00082-BYP, Memorandum of Opinion and Order (1) Granting, In Part, Allstate's Motion to Sever, Consolidate and Stay All Claims, Defenses and Counterclaims Relating to U.S. Pat. No. 6,064,970, *Progressive Casualty Insurance Company* versus *Allstate Insurance Company et al.*, U.S. District Court, Northern District of Ohio (Cleveland), dated Apr. 28, 2011, 7 pages.
Case No. 1:11-cv-00082-BYP, Liberty Mutual Defendants' Renewed Motion to Stay the Patent Infringement Claims Against Them Pending Ex Parte Reexamination of the Patents-In-Suit by the United States Patent and Trademark Office, *Progressive Casualty Insurance Company* versus *Allstate Insurance Company et al.*, U.S. District Court, Northern District of Ohio (Cleveland), filed Jun. 14, 2011; 189 pages.
Case No. 1:11-cv-00082-BYP, Progressive Casualty Insurance Company's Opposition to Liberty Mutual Defendants' Renewed Motion to Stay the Patent Infringement Claims Against Them Pending Ex Parte Reexamination of the Patents-In-Suit by the United States Patent and Trademark Office, *Progressive Casualty Insurance Company* versus *Allstate Insurance Company et al.*, U.S. District Court, Northern District of Ohio (Cleveland), filed Jun. 28, 2011, 36 pages.
Case No. 1:11-cv-00052-BYP, Allstate's Response to Liberty Mutual Defendants' Renewed Motion to Stay the Patent Infringement Claims Against Them Pending Ex Parte Reexamination of the ['269 and '088 Patents] by the United States Patent and Trademark Office, *Progressive Casualty Insurance Company* versus *Allstate Insurance Company et al.*, U.S. District Court, Northern District of Ohio (Cleveland), filed Jun. 29, 2011, 4 pages.
Case No. 1:11-cv-00082-BYP, Liberty Mutual Defendants' Reply Memorandum In Support of Their Renewed Motion to Stay the Patent Infringement Claims Against Them Pending Ex Parte Reexamination of the Patents-In-Suit by the United States Patent and Trademark Office, *Progressive Casualty Insurance Company* versus *Allstate Insurance Company et al.*, U.S. District Court, Northern District of Ohio (Cleveland), filed Jul. 5, 2011, 55 pages.
Case No. 1:11-cv-00082-BYP, Mediation Conference Minute Sheet, *Progressive Casualty Insurance Company* versus *Allstate Insurance Company et al.*, U.S. District Court, Northern District of Ohio (Cleveland), dated Jul. 22, 2011, 2 pages.
Case No. 1:11-cv-00082-BYP, Memorandum of Opinion and Order Granting Liberty Mutual 's Renewed Motion to Stay the Patent Infringement Claims Against Them Pending Ex Parte Reexamination of the Patents in Suit, *Progressive Casualty Insurance Company* versus *Allstate Insurance Company et al.*, U.S. District Court, Northern District of Ohio (Cleveland), dated Aug. 2, 2011, 5 pages.
Case No. 1:11-cv-00082-BYP, Notice and Order Reopening Case with Liberty Mutual, *Progressive Casualty Insurance Company* versus *Allstate Insurance Company et al.*, U.S. District Court, Northern District of Ohio (Cleveland), dated Jul. 24, 2012, 1 page.
Case No. 1:11-cv-00082-BYP, Progressive's Motion to Lift Moratorium on Formal Discovery, *Progressive Casualty Insurance Company* versus *Allstate Insurance Company et al.*, U.S. District Court, Northern District of Ohio (Cleveland), filed Oct. 19, 2012, 5 pages.
Case No. 1:11-cv-00052-BYP, Defendants' Motion to Stay Litigation Pending Covered Business Method Patent Review of the Patents-In-Suit by the United States Patent and Trademark office, *Progressive Casualty Insurance Company* versus *Allstate Insurance Company et al.*, U.S. District Court, Northern District of Ohio (Cleveland), filed Oct. 25, 2012, 292 pages.
Case No. 1:11-cv-00082-BYP, Liberty Mutual Defendants' Opposition to Plaintiff's Motion to Lift Moratorium on Formal Discovery, *Progressive Casualty Insurance Company* versus *Allstate Insurance Company et al.*, U.S. District Court, Northern District of Ohio (Cleveland), filed Oct. 26, 2012, 10 pages.
Case No. 1:11-cv-00082-BYP, Order Granting Progressive's Motion to Lift Moratorium, *Progressive Casualty Insurance Company*

(56) References Cited

OTHER PUBLICATIONS versus *Allstate Insurance Company et al.*, U.S. District Court, Northern District of Ohio (Cleveland), dated Nov. 1, 2012, 1 page.
Case No. 1:11-cv-00052-BYP, Plaintiff's Memorandum in Opposition to Defendants' Motion to Stay Litigation Pending Covered Business Method Patent Review of the Patens-In-Suit by the United States Patent and Trademark Office, *Progressive Casualty Insurance Company* versus *Allstate Insurance Company et al.*, U.S. District Court, Northern District of Ohio (Cleveland), filed Nov. 8, 2012, 9 pages.
Case No. 1:11-cv-00082-BYP, Defendant's Reply Memorandum In Support of Their Motion to Stay Litigation Pending Covered Business Method Patent Review of the Patents-In-Suit by the United States Patent and Trademark Office, *Progressive Casualty Insurance Company* versus *Allstate Insurance Company et al.*, U.S. District Court, Northern District of Ohio (Cleveland), filed Nov. 15, 2012, 2012, 13 pages.
Case No. 1:11-cv-00082-BYP, Order Denying Defendants' Motion to Stay, *Progressive Casualty Insurance Company* versus *Allstate Insurance Company et al.*, U.S. District Court, Northern District of Ohio (Cleveland), dated Dec. 18, 2012, 2 pages.
Case No. 1:11-cv-00082-BYP, Liberty Mutual's Notice Regarding Status of Covered Business Method Patent Petitions, *Progressive Casualty Insurance Company* versus *Allstate Insurance Company et al.*, U.S. District Court, Northern District of Ohio (Cleveland), filed Feb. 6, 2013, 90 pages.
Case No. 1:11-cv-00082-BYP, Liberty Mutual Defendants' Motion for Expedited Briefing, *Progressive Casualty Insurance Company* versus *Allstate Insurance Company et al.*, U.S. District Court, Northern District of Ohio (Cleveland), filed Feb. 8. 2013 8 pages.
Case No. 1:11-cv-00082-BYP, Liberty Mutual Defendants' Motion to Require Plaintiff to Select Representative Claims for the Asserted Patents, *Progressive Casualty Insurance Company* versus *Allstate Insurance Company et al.*, U.S. District Court, Northern District of Ohio (Cleveland), filed Feb. 8, 2013, 38 pages.
Case No. 1:11-cv-00082-BYP, Liberty Mutual's Second Notice Regarding Status of Covered Business Method Patent Petitions, *Progressive Casualty Insurance Company* versus *Allstate Insurance Company et al.*, U.S. District Court, Northern District of Ohio (Cleveland), filed Feb. 13, 2013, 2013, 54 pages.
Case No. 1:11-cv.-00082-BYP, Liberty Mutual Defendants' Renewed Motion to Stay Litigation Pending Covered Business Method Patent Review of the Patents-In-Suit by the United States Patent and Trademark Office, *Progressive Casualty Insurance Company* versus *Allstate Insurance Company et al.*, U.S. District Court, Northern District of Ohio (Cleveland). filed Mar. 4, 2013, 212 pages.
Case No. 1:11-cv-00082-BYP, Plaintiff's Opposition to the Liberty Mutual Defendant's Renewed Motion to Stay Litigation Pending Covered Business Method Review of the Patents-In-Suit by the United States Patent and Trademark Office, *Progressive Casualty Insurance Company* versus *Allstate Insurance Company et al.*, U.S. District Court, Northern District of Ohio (Cleveland), filed Mar. 18, 2013, 18 pages.
Case No. 1:11-cv-00082-BYP, Reply Memorandum In Support of Liberty Mutual Defendants' Renewed Motion to Stay Litigation Pending Covered Business Method Patent Review of the Patents-In-Suit by the United States Patent and Trademark Office, *Progressive Casualty Insurance Company* versus *Allstate Insurance Company et al.*, U.S. District Court, Northern District of Ohio (Cleveland), filed Mar. 25, 2013, 97 pages.
Case No. 1:11-cv-00082-BYP, Plaintiff's Opposition to the Liberty Mutual Defendants' Motion to Extend Certain Claim Construction Deadlines, *Progressive Casualty Insurance Company* versus *Allstate Insurance Company et al.*, U.S. District Court, Northern District of Ohio (Cleveland), filed Mar. 25, 2013, 4 pages.
Case No. 1:11-cv-00082-BYP, Order Staying Case, *Progressive Casualty Insurance Company* versus *Allstate Insurance Company et al.*, U.S. District Court, Northern District of Ohio (Cleveland), dated Apr. 17, 2013, 2013, 23 pages.
Case No. 1:11-cv-00082-BYP, Civil Docket, *Progressive Casualty Insurance Company* versus *Allstate Insurance Company et al.*, U.S. District Court, Northern District of Ohio (Cleveland), dated Apr. 17, 2013, 20 pages.
Case No. 1:12-cv-01068-BYP, Complaint for Patent Infringement, *Progressive Casualty Insurance Company* versus *State Farm Mutual Automobile Insurance Company*, U.S. District Court; Northern District of Ohio (Cleveland), filed Apr. 30, 2012, 141 pages.
Case No. 1:12-cv-01066-BYP, First Amended Complaint for Patent Infringement, *Progressive Casualty Insurance Company* versus *State Farm Mutual Automobile Insurance Company*, U.S. District Court, Northern District of Ohio (Cleveland), filed Aug. 16, 2012, 167 pages.
Case No. 1:12-cv-01068-BYP, Combined Supplemental Notice of Plaintiff Progressive Casualty Insurance Company, *Progressive Casualty Insurance Company* versus *State Farm Mutual Automobile Insurance Company*, U.S. District Court, Northern District of Ohio (Cleveland), filed Oct. 10, 2012, 5 pages.
Case No. 1:12-cv-01068-BYP, Joint Response to State Farm, Hartford, and Liberty Mutual Defendants to Plaintiff Progressive Casualty Insurance Company's Combined Supplemental Notice, *Progressive Casualty Insurance Company* versus *State Farm Mutual Automobile Insurance Company*, U.S. District Court, Northern District of Ohio (Cleveland), filed Oct. 11, 2012, 6 pages.
Case No. 1:12-cv-01068-BYP, Progressive's Motion to Lift Moratorium on Formal Discovery, *Progressive Casualty Insurance Company* versus *State Farm Mutual Automobile Insurance Company*, U.S. District Court, Northern District of Ohio (Cleveland), filed Oct. 19, 2012, 5 pages.
Case No. 1:12-cv-01068-BYP, Progressive Casualty Insurance Company's Answer to Defendant's Counterclaims, *Progressive Casualty Insurance Company* versus *State Farm Mutual Automobile Insurance Company*, U.S. District Court, Northern District of Ohio (Cleveland), filed Oct. 25, 2012, 6 pages.
Case No. 1:12-cv-01068-BYP, State Farm's Opposition to Plaintiff's Motion to Lift Moratorium on Formal Discovery, *Progressive Casualty Insurance Company* versus *State Farm Mutual Automobile Insurance Company*, U.S. District Court, Northern District of Ohio (Cleveland), filed Oct. 26, 2012, 6 pages.
Case No. 1:12-cv-01068-BYP, Order Granting Plaintiff's Motion to Lift Moratorium on Formal Discovery, *Progressive Casualty Insurance Company* versus *State Farm Mutual Automobile Insurance Company*, U.S. District Court, Northern District of Ohio (Cleveland), dated Nov. 1, 2012, 1 page.
Case No. 1:12-cv-01068-BYP, Motion to Admit Jonathan Redgrave Pro Hac Vice, *Progressive Casualty Insurance Company* versus *State Farm Mutual Automobile Insurance Company*, U.S. District Court, Northern District of Ohio (Cleveland), filed Mar. 8, 2013, 5 pages.
Case No. 1:12-cv-01068-BYP, State Farm's Motion to Stay and to Join the Motions of Liberty and Hartford Requesting a Stay, *Progressive Casualty Insurance Company* versus *State Farm Mutual Automobile Insurance Company*, U.S. District Court, Northern District of Ohio (Cleveland), filed Mar. 25, 2013, 245 pages.
Case No. 1:12-cv-01068-BYP, Order Granting Plaintiff's Motion for Oral Arguments, *Progressive Casualty Insurance Company* versus *State Farm Mutual Automobile Insurance Company*, U.S. District Court Northern District of Ohio (Cleveland), filed Apr. 2, 2013, 2 pages.
Case No. 1:12-cv-01068-BYP, Plaintiff's Opposition to State Farm's Motion to Stay and Join the Motions of Liberty and Hartford Requesting Stay, *Progressive Casualty Insurance Company* versus *State Farm Mutual Automobile Insurance Company*, U.S. District Court, Northern District of Ohio (Cleveland), filed Apr. 8, 2013, 9 pages.
Case No. 1:12-cv-01068-BYP, State Farm's Reply In Support of Its Motion to Stay and to Join the Motions of Liberty and Hartford Requesting a Stay, *Progressive Casualty Insurance Company* versus *State Farm Mutual Automobile Insurance Company*, U.S. District Court, Northern District of Ohio (Cleveland), filed Apr. 10, 2013, 37 pages.
Case No. 1:12-cv-01068-BYP, Order Staying Case, *Progressive Casualty Insurance Company* versus *State Farm Mutual Automo-*

(56) References Cited

OTHER PUBLICATIONS

*bile Insurance Company*, U.S. District Court, Northern District of Ohio (Cleveland), filed Apr. 17, 2013, 23 pages.
Case No. 1:12-cv-01068-BYP, Civil Docket, *Progressive Casualty Insurance Company* versus *State Farm Mutual Automobile Insurance Company*, U.S. District Court, Northern District of Ohio (Cleveland), dated Apr. 17, 2013, 6 pages.
Case No. 1:12-cv-01070-BYP, Complaint for Patent Infringement, *Progressive Casualty Insurance Company* versus *Hartford Fire Insurance Company et al.*, U.S. District Court, Northern District of Ohio (Cleveland), filed Apr. 30, 2012, 145 pages.
Case No. 1:12-cv-01070-BYP, Defendants' Answer to Plaintiff Progressive Casualty Insurance Company's Complaint for Patent Infringement, *Progressive Casualty Insurance Company* versus *Hartford Fire Insurance Company et al.*, U.S. District Court, Northern District of Ohio (Cleveland), filed Oct. 1, 2012, 22 pages.
Case No. 1:12-cv-01070-BYP, Combined Supplemental Notice of Plaintiff Progressive Casualty Insurance Company, *Progressive Casualty Insurance Company* versus *Hartford Fire Insurance Company et al.*, U.S. District Court, Northern District of Ohio (Cleveland), filed Oct. 10, 2012, 5 pages.
Case No. 1:12-cv-01070-BYP, Motion to Lift Moratorium on Formal Discovery, *Progressive Casualty Insurance Company* versus *Hartford Fire Insurance Company et al.*, U.S. District Court, Northern District of Ohio (Cleveland), filed Oct. 19, 2012, 5 pages.
Case No. 1:12-cv-01070-BYP, Progressive Casualty Insurance Company's Answer to Defendants' Counterclaims, *Progressive Casualty Insurance Company* versus *Hartford Fire Insurance Company et al.*, U.S. District Court, Northern District of Ohio (Cleveland), filed Oct. 25, 2012, 7 pages.
Case No. 1:12-cv-01070-BYP, The Hartford's Opposition to Plaintiff's Motion to Lift Moratorium on Formal Discovery, *Progressive Casualty Insurance Company* versus *Hartford Fire Insurance Company et al.*, U.S. District Court, Northern District of Ohio (Cleveland), filed Oct. 26, 2012, 7 pages.
Case No. 1:12-cv-01070-BYP, Order regarding Plaintiff's Motion to Lift Moratorium on Formal Discovery, *Progressive Casualty Insurance Company* versus *Hartford Fire Insurance Company et al.*, U.S. District Court, Northern District of Ohio (Cleveland), dated Nov. 1, 2012. 1 page.
Case No. 1:12-cv-01070-BYP, Defendants' Motion to Stay Litigation Pending Covered Business Method Patent Review of teh Patents-in-Suit by the United States Patent and Trademark Office, *Progressive Casualty Insurance Company* versus *Hartford Fire Insurance Company et al.*, U.S. District Court, Northern District of Ohio (Cleveland), filed Nov. 8, 2012, 5 pages.
Case No. 1:12-cv-01070-BYP, Plaintiff's Opposition to Defendants' Motion to Stay Litigation Pending Covered Business Method Patent Review of the Patents-in-Suit by the United States Patent and Trademark Office, *Progressive Casualty Insurance Company* versus *Hartford Fire Insurance Company et al.*, U.S. District Court, Northern District of Ohio (Cleveland), filed Nov. 26, 2012, 8 pages.
Case No. 1:12-cv-01070-BYP, Defendants' Reply Memorandum in Support of Their Motion to Stay Litigation Pending Covered Business Method Patent Review of the Patents-in-Suit by the United States Patent and Trademark Office, *Progressive Casualty Insurance Company* versus *Hartford Fire Insurance Company et al.*, U.S. District Court, Northern District of Ohio (Cleveland), filed Dec. 6, 2012, 7 pages.
Case No. 1:12-cv-01070-BYP, Report of Parties Planning Meeting Under Fed, R. Civ. P. 26(f), Local Rule 16.3(b)(3) and Local Patent Rule 2.1, *Progressive Casualty Insurance Company* versus *Hartford Fire Insurance Company et al.*, U.S. District Court, Northern District of Ohio (Cleveland), filed Dec. 7, 2012, 50 pages.
Case No. 1112-cv-01070-BYP, Order regarding Motions to Stay, *Progressive Insurance Company* versus *Hartford Fire Insurance Company et al.*, U.S. District Court, Northern District of Ohio (Cleveland), dated Dec. 18, 2012, 2 pages.
Case No. 1:12-cv-01070-BYP, Hartford Fire Insurance Company letter to Magistrate Judge Limbert, *Progressive Casualty Insurance Company* versus *Hartford Fire Insurance Company et al.*, U.S. District Court, Northern District of Ohio (Cleveland), dated Feb. 27, 2013, 37 pages.
Case No. 1:12-cv-01070-BYP, Progressive Casualty Insurance Company Letter to Magistrate Judge Limbert, *Progressive Casualty Insurance Company* versus *Hartford Fire Insurance Company et al.*, U.S. District Court, Northern District of Ohio (Cleveland), dated Feb. 27, 2013, 3 pages.
Case No. 1:12-cv-01070-BYP, Order regarding Discovery Dispute, *Progressive Casualty Insurance Company* versus *Hartford Fire Insurance Company et al.*, U.S. District Court, Northern District of Ohio (Cleveland), dated Mar. 1, 2013, 3 pages.
Case No. 1:12-cv-01070-BYP, Hartford Defendant's Renewed Motion to Stay Litigation Pending Covered Business Method Patent Review of the Patents-in-Suit by the United States Patent and Trademark Office, *Progressive Casualty Insurance Company* versus *Hartford Fire Insurance Company et al.*, U.S. District Court, Northern District of Ohio (Cleveland), filed Mar. 11, 2013, 7 pages.
Case No. 1:12-cv-01070-BYP, Plaintiff's Opposition to Hartford Defendants' Renewed Motion to Stay Litigation Pending Covered Business Method Patent Review of the Patents-in-Suit by the United States Patent and Trademark Office, *Progressive Casualty Insurance Company* versus *Hartford Fire Insurance Company et al.*, U.S. District Court, Northern District of Ohio (Cleveland), filed Mar. 25, 2013, 84 pages.
Case No. 1:12-cv-01070-BYP, Reply Memorandum in Support of Hartford Defendants' Renewed Motion to Stay Litigation Pending Covered Business Method Patent Review of the Patents-in-Suit by the United States Patent and Trademark Office, *Progressive Casualty Insurance Company* versus *Hartford Fire Insurance Company et al.*, U.S. District Court, Northern District of Ohio (Cleveland), filed Apr. 1, 2013, 19 pages.
Case No. 1:12-cv-01070-BYP, Order Staying Case, *Progressive Casualty Insurance Company* versus *Hartford Fire Insurance Company et al.*, U.S. District Court, Northern District of Ohio (Cleveland), dated Apr. 17, 2013, 23 pages.
Case No. 1:12-cv-01070-BYP, Civil Docket, *Progressive Casualty Insurance Company* versus *Hartford Fire Insurance Company et al.*, U.S. District Court, Northern District of Ohio (Cleveland), dated Apr. 17, 2013, 8 pages.
CBM2012-00002, U.S. Pat. No. 6,064,970, Patent Owner's Preliminary Response Pursuant to 37 C.F.R. § 42.207, *Liberty Mutual Insurance Co.* versus *Progressive Casualty Insurance Co.*, United States Patent and Trademark Office before the Patent Trial and Appeal Board, Dec. 21, 2012, 75 pages.
CBM2012-00002, U.S. Pat. No. 6.064,970, Decision, *Liberty Mutual Insurance Co.* versus *Progressive Casualty Insurance Co.*, United States Patent and Trademark Office before the Patent Trial and Appeal Board, Jan. 25, 2013, 35 pages.
CBM2012-00003, U.S. Pat. No. 8,140,358, Patent Owner's Preliminary Response Pursuant to 37 C.F.R. § 42.207, *Liberty Mutual Insurance Co.* versus *Progressive Casualty Insurance Co.*, United States Patent and Trademark Office before the Patent Trial and Appeal Board, Dec. 24. 2012, 52 pages.
CBM2012-00003, U.S. Pat. No. 8,140.358, Decision, *Liberty Mutual Insurance Co.* versus *Progressive Casualty Insurance Co.*, United States Patent and Trademark Office before the Patent Trial and Appeal Board, Feb. 12, 2013, 27 pages.
CBM2012-00004, U.S. Pat. No. 6,064,970, Patent Owner's Preliminary Response Pursuant to 37 C.F.R. § 42.207, *Liberty Mutual Insurance Co.* versus *Progressive Casualty Insurance Co.*, United States Patent and Trademark Office before the Patent Trial and Appeal Board, Dec. 21. 2012, 65 pages.
CBM2012-00004, U.S. Pat. No. 6,064,970, Decision, *Liberty Mutual Insurance Co.* versus *Progressive Casualty Insurance Co.*, United States Patent and Trademark Office before the Patent Trial and Appeal Board, Jan. 25, 2013, 32 pages.
CBM2013-00003, U.S. Pat. No. 8,090,598, Petition for Covered Business Method Patent Review, *Liberty Mutual Insurance Co.* versus *Progressive Casualty Insurance Co.*, United States Patent and Trademark Office before the Patent Trial and Appeal Board, Oct. 15, 2012, 85 pages.

(56) References Cited

OTHER PUBLICATIONS

CBM2013-00003, U.S. Pat. No. 8,090,598, Declaration of Mary L. O'Neil, *Liberty Mutual Insurance Co.* versus *Progressive Casualty Insurance Co.*, United States Patent and Trademark Office before the Patent Trial and Appeal Board, Oct. 12, 2012, 15 pages.
CBM2013-00003, U.S. Pat. No. 8,090,598, Declaration of Scott Andrews, *Liberty Mutual Insurance Co.* versus *Progressive Casualty Insurance Co.*, United States Patent and Trademark Office before the Patent Trial and Appeal Board, Oct. 15, 2012, 20 pages.
CBM2013-00003, U.S. Pat. No. 8,090,598, Patent Owner's Preliminary Response Pursuant to 37 C.F.R. § 42.207, *Liberty Mutual Insurance Co.* versus *Progressive Casualty Insurance Co.*, United States Patent and Trademark Office before the Patent Trial and Appeal Board, Jan. 22, 2013, 49 pages.
CBM2013-00003, U.S. Pat. No. 8.090.598, Decision, *Liberty Mutual Insurance Co.* versus *Progressive Casualty Insurance Co.*, United States Patent and Trademark Office before the Patent Trial and Appeal Board, Mar. 15, 2013, 26 pages.
CBM2013-00004, U.S. Pat. No. 8,090,598, Petition for Covered Business Method Patent Review, *Liberty Mutual Insurance Co.* versus *Progressive Casualty Insurance Co.*, United States Patent and Trademark Office before the Patent Trial and Appeal Board, Oct. 15, 2012, 90 pages.
CBM2013-00004, U.S. Pat. No. 8,090,598, Declaration of Mary L. O'Neil, *Liberty Mutual Insurance Co.* versus *Progressive Casualty Insurance Co.*, United States Patent and Trademark Office before the Patent Trial and Appeal Board, Oct. 12, 2012, 16 pages.
CBM2013-00004, U.S. Pat. No. 8,090,598, Declaration of Scott Andrews, *Liberty Mutual Insurance Co.* versus *Progressive Casualty Insurance Co.*, United States Patent and Trademark Office before the Patent Trial and Appeal Board, Oct. 15, 2012, 19 pages.
CBM2013-00004, U.S. Pat. No. 8,090,598, Patent Owner's Preliminary Response Pursuant to 37 C.F.R. § 42.207, *Liberty Mutual Insurance Co.* versus *Progressive Casualty Insurance Co.*, United States Patent and Trademark Office before the Patent Trial and Appeal Board, Jan. 22, 2013, 84 pages.
CBM2013-00004, U.S. Pat. No. 8,090,598, Decision, *Liberty Mutual Insurance Co.* versus *Progressive Casualty Insurance Co.*, United States Patent and Trademark Office before the Patent Trial and Appeal Board, Mar. 15, 2013, 33 pages.
CBM2O13-00009, U.S. Pat. No. 8,140,358, Patent Owner's Preliminary Response Pursuant to 37 C.F.R.§ 42.207, *Liberty Mutual Insurance Co.* versus *Progressive Casualty Insurance Co.*, United States Patent and Trademark Office before the Patent Trial and Appeal Board, Feb. 21, 2013, 37 pages.
CBM2013-00009, U.S. Pat. No. 8,140,358, Decision *Liberty Mutual Insurance Co.* versus *Progressive Casualty Insurance Co.*, United States Patent and Trademark Office before the Patent Trial and Appeal Board, Mar. 28, 2013, 30 pages.
Case No. CBM2012-00002, U.S. Pat. No. 6,064,970, Petitioner Liberty Mutual Insurance Co.'s Reply to Patent Owner Progressive Casualty Insurance Co.'s Response, *Liberty Mutual Insurance Co.* versus *Progressive Casualty Insurance Co.*, United States Patent and Trademark Office before the Patent Trial and Appeal Board, Aug. 6, 2013, 21 pages.
Case No. CBM2012-00002, U.S. Pat. No. 6,064,970, Rebuttal Declaration of Scott Andrews on behalf of Petitioner Liberty Mutual Insurance Co. regarding U.S. Pat. No. 6,064,970, *Liberty Mutual Insurance Co.* versus *Progressive Casualty Insurance Co.*, United States Patent and Trademark Office before the Patent Trial and Appeal Board, Aug. 6, 2013, 8 pages.
Case No. CBM2012-00002, U.S. Pat. No. 6,064,970, Rebuttal Declaration of Mary L. O'Neil on behalf of Petitioner Liberty Mutual Insurance Co. regarding U.S. Pat. No. 6,064,970, *Liberty Mutual Insurance Co.* versus *Progressive Casualty Insurance Co.*, United States Patent and Trademark Office before the Patent Trial and Appeal Board, Aug. 6, 2013, 31 pages.
Case No. CBM2012-00002, U.S. Pat. No. 6,064,970, Declaration of Darrell W. Stark, *Liberty Mutual Insurance Co.* versus *Progressive Casualty Insurance Co.*, United States Patent and Trademark Office before the Patent Trial and Appeal Board, Aug. 6, 2013, 5 pages.
Case No. CBM2012-00002, U.S. Pat. No. 6,064,970, Rule 42.64(b)(2) Declaration of Scott Andrews on behalf of Petitioner Liberty Mutual Insurance Co. regarding U.S. Pat. No. 6,064,970, *Liberty Mutual Insurance Co.* versus *Progressive Casualty Insurance Co.*, United States Patent and Trademark Office before the Patent Trial and Appeal Board, Aug. 26, 2013, 3 pages.
Case No. CBM2012-00002, U.S. Pat. No. 6,064,970, Rule 42.62(b)(2)Declaration of Mary Lou O'Neil on behalf of Petitioner Liberty Mutual Insurance Co. regarding U.S. Pat. No. 6,064,970, *Liberty Mutual Insurance Co.* versus *Progressive Casualty Insurance Co.*, United States Patent and Trademark Office before the Patent Trial and Appeal Board, Aug. 27, 2013, 3 pages.
Case No. CBM2012-00002, U.S. Pat. No. 6,064,970, Rule 42.64(b)(2)Declaration of Jordan M. Rossen, *Liberty Mutual Insurance Co.* versus *Progressive Casualty Insurance Co.*, United States Patent and Trademark Office before the Patent Trial and Appeal Board, Aug. 27, 2013, 4 pages.
Case No. CBM2012-00002, U.S. Pat. No. 6,064,970, Second Rule 42.64(b)(2)Declaration of Mary Lou O'Neil on behalf of Petitioner Liberty Mutual Insurance Co. regarding U.S. Pat. No. 6,064,970, *Liberty Mutual Insurance Co.* versus *Progressive Casualty Insurance Co.*, United States Patent and Trademark Office before the Patent Trial and Appeal Board, Sep. 18, 2013, 2 pages.
Case No. CBM2012-00003, U.S. Pat. No. 8,140,358, Petitioner Liberty Mutual Insurance Co.'s Reply to Patent Owner Progressive Casualty Insurance Co.'s Response, *Liberty Mutual Insurance Co.* versus *Progressive Casualty Insurance Co.*, United States Patent and Trademark Office before the Patent Trial and Appeal Board, Aug. 15, 2013, 22 pages.
Case No. CBM2012-00003, U.S. Pat. No. 8,140,358, Rebuttal Declaration of Mary L. O'Neil on behalf of Petitioner Liberty Mutual Insurance Co. regarding U.S. Pat. No. 8,140,3558, *Liberty Mutual Insurance Co.* versus *Progressive Casualty Insurance Co.*, United States Patent and Trademark Office before the Patent Trial and Appeal Board, Aug. 15, 2013, 13 pages.
Case No. CBM2012-00003, U.S. Pat. No. 8,140,358, Rebuttal Declaration of Scott Andrews on behalf of Petitioner Liberty Mutual Insurance Co. regarding U.S. Pat. No. 8,140,358, *Liberty Mutual Insurance Co.* versus *Progressive Casualty Insurance Co.*, United States Patent and Trademark Office before the Patent Trial and Appeal Board, Aug. 15, 2013, 29 pages.
Case No. CBM2012-00003, U.S. Pat. No. 8,140,358, Declaration of Jordan M. Rossen, *Liberty Mutual Insurance Co.* versus *Progressive Casualty Insurance Co.*, United States Patent and Trademark Office before the Patent Trial and Appeal Board, Aug. 15, 2013, 2 pages.
Case No. CBM2012-00003, U.S. Pat. No. 8,140,358, Rule 42.64(b)(2)Declaration of Mary Lou O'Neil on behalf of Petitioner Liberty Mutual Insurance Co. regarding U.S. Pat. No. 8,140,358, *Liberty Mutual Insurance Co.* versus *Progressive Casualty Insurance Co.*, United States Patent and Trademark Office before the Patent Trial and Appeal Board, Sep. 5, 2013, 2 pages.
Case No. CBM2012-00003, U.S. Pat. No. 8,140,358, Rule 42.64(b)(2)Declaration of Scott Andrews on behalf of Petitioner Liberty Mutual Insurance Co. regarding U.S. Pat. No. 8,140,358, *Liberty Mutual Insurance Co.* versus *Progressive Casualty Insurance Co.*, United States Patent and Trademark Office before the Patent Trial and Appeal Board, Sep. 5, 2013, 3 pages.
Case No. CBM2012-00003, U.S. Pat. No. 8,140,358, Rule 42.64(b)(2)Declaration of Jordan M. Rossen, *Liberty Mutual Insurance Co.* versus *Progressive Casualty Insurance Co.*, United States Patent and Trademark Office before the Patent Trial and Appeal Board, Sep. 5, 2013, 2 pages.
Case No. CBM2012-00004, U.S. Pat. No. 6,064,970, Petitioner Liberty Mutual Insurance Co.'s Reply to Patent Owner Progressive Casualty Insurance Co.'s Response, *Liberty Mutual Insurance Co.* versus *Progressive Casualty Insurance Co.*, United States Patent and Trademark Office before the Patent Trial and Appeal Board, Aug. 6, 2013, 21 pages.
Case No. CBM2012-00004, U.S. Pat. No. 6,064,970, Rebuttal Declaration of Mary L. O'Neil on behalf of Petitioner Liberty Mutual Insurance Co. regarding U.S. Pat. No. 6,064,970, *Liberty*

(56) References Cited

OTHER PUBLICATIONS

*Mutual Insurance Co.* versus *Progressive Casualty Insurance Co.*, United States Patent and Trademark Office before the Patent Trial and Appeal Board, Aug. 6, 2013, 22 pages.
Case No. CBM2012-00004, U.S. Pat. No. 6,064,970, Declaration of Darrell W. Stark, *Liberty Mutual Insurance Co.* versus *Progressive Casualty Insurance Co.*, United States Patent and Trademark Office before the Patent Trial and Appeal Board, Aug. 6, 2013, 2 pages.
Case No. CBM2012-00004, U.S. Pat. No. 6,064,970, Rule 42.64(b)(2) Declaration of Mary Lou O'Neil on behalf of Petitioner Liberty Mutual Insurance Co. regarding U.S. Pat. No. 6,064,970, *Liberty Mutual Insurance Co.* versus *Progressive Casualty Insurance Co.*, United States Patent and Trademark Office before the Patent Trial and Appeal Board, Aug. 27, 2013, 3 pages.
Case No. CBM2012-00004, U.S. Pat. No. 6,064,970, Rule 42.64(b)(2), Declaration of Jordan M. Rossen, *Liberty Mutual Insurance Co.* versus *Progressive Casualty Insurance Co.*, United States Patent and Trademark Office before the Patent Trial and Appeal Board, Aug. 27 2013, 2 pages.
Case No. CBM2012-00004, U.S. Pat. No. 6,064,970, Second Rule 42.64(b)(2) Declaration of Mary Lou O'Neil on behalf of Petitioner Liberty Mutual Insurance Co. regarding U.S. Pat. No. 6,064,970, *Liberty Mutual Insurance Co.* versus *Progressive Casualty Insurance Co.*, United Stated Patent and Trademark Office before the Patent Trial and Appeal Board, Sep. 18, 2013, 2 pages.
Case No. CBM2013-00004, U.S. Pat. No. 8,090,598, Petitioner Liberty Mutual Insurance Co.'s Reply to Patent Owner Progressive Casualty Insurance Co.'s Response, *Liberty Mutual Insurance Co.* versus *Progressive Casualty Insurance Co.*, United States Patent and Trademark Office before the Patent Trial and Appeal Board, Aug. 27, 2013, 21 pages.
Case No. CBM2013-00004, U.S. Pat. No. 8,090,598, Rebuttal Declaration of Scott Andrews on behalf of Petitioner Liberty Mutual Insurance Co. regarding U.S. Pat. No. 8,090,598, *Liberty Mutual Insurance Co.* versus *Progressive Casualty Insurance Co.*, United States Patent and Trademark Office before the Patent Trial and Appeal Board, Aug. 27, 2013, 25 pages.
Case No. CBM2013-00004, U.S. Pat. No. 8,090,598, Rebuttal Declaration of Mary L. O'Neil on behalf of Petitioner Liberty Mutual Insurance Co. regarding U.S. Pat. No. 8,090,598, *Liberty Mutual Insurance Co.* versus *Progressive Casualty Insurance Co.*, United States Patent and Trademark Office before the Patent Trial and Appeal Board, Aug. 27, 2013, 26 pages.
Case No. CBM2013-00004, U.S. Pat. No. 8,090,598, Declaration of Jordan M. Rossen, *Liberty Mutual Insurance Co.* versus *Progressive Casualty Insurance Co.*, United States Patent and Trademark Office before the Patent Trial and Appeal Board, Aug. 27, 2013, 3 pages.
Case No. CBM2013-00004, U.S. Pat. No. 8,090,598, Rule 42.64(b)(2)Declaration of Mary Lou O'Neil on behalf of Petitioner Liberty Mutual Insurance Co. regarding U.S. Pat No. 8,090,598, *Liberty Mutual Insurance Co.* versus *Progressive Casualty Insurance Co.*, United States Patent and Trademark Office before the Patent Trial and Appeal Board, Sep. 18, 2013, 3 pages.
Case No. CBM2013-00004, U.S. Pat. No. 8,090,598, Rule 42.64(b)(2)Declaration of Scott Andrews on behalf of Petitioner Liberty Mutual Insurance Co. regarding U.S. Pat. No. 8,090,598, *Liberty Mutaul Insurance Co.* versus *Progressive Casualty Insurance Co.*, United States Patent and Trademark Office before the Patent Trial and Appeal Board, Sep. 18, 2013, 3 pages.
Case No. CBM2013-00004, U.S. Pat. No. 8,090,598, Rule 42.64(b)(2)Declaration of Jordan M. Rossen, *Liberty Mutual Insurance Co.* versus *Progressive Casualty Insurance Co.*, United States Patent and Trademark Office before the Patent Trial and Appeal Board, Sep. 18, 2013, 2 pages.
Case No. CBM2013-00009, U.S. Pat. No. 8,140,358, Petitioner Liberty Mutual Insurance Co.'s Reply to Patent Owner Progressive Casualty Insurance Co.'s Response, *Liberty Mutual Insurance Co.* versus *Progressive Casualty Insurance Co.*, United States Patent and Trademark Office before the Patent Trial and Appeal Board, Aug. 6, 2013, 21 pages.
Case No. CBM2013-00009, U.S. Pat. No. 8,140,358, Rebuttal Declaration of Scott Andrews on behalf of Petitioner Liberty Mutual Insurance Co. regarding U.S. Pat. No. 8,140,358, *Liberty Mutual Insurance Co.* versus *Progressive Casualty Insurance Co.*, United States Patent and Trademark Office before the Patent Trial and Appeal Board, Aug. 16, 2013, 19 pages.
Case No. CBM2013-00009, U.S. Pat. No. 8,140,358, Rebuttal Declaration of Mary L. O'Neil on behalf of Petitioner Liberty Mutual Insurance Co. regarding U.S. Pat. No. 8,140,358, *Liberty Mutual Insurance Co.* versus *Progressive Casualty Insurance Co.*, United States Patent and Trademark Office before the Patent Trial and Appeal Board, Aug. 16, 2013, 26 pages.
Case No. CBM2013-00009, U.S. Pat. No. 8,140,358, Declaration of Jordan M. Rossen, *Liberty Mutual Insurance Co.* versus *Progressive Casualty Insurance Co.*, United States Patent and Trademark Office before the Patent Trial and Appeal Board, Aug. 16, 2013, 4 pages.
Case No. CBM2013-00009, U.S. Pat. No. 8,140,358, Rule 42.64(b)(2)Declaration of Mary Lou O'Neil on behalf of Petitioner Liberty Mutual Insurance Co. regarding U.S. Pat. No. 8,140,358, *Liberty Mutual Insurance Co.* versus *Progressive Casualty Insurance Co.*, United States Patent and Trademark Office before the Patent Trial and Appeal Board, Sep. 6, 2013, 3 pages.
Case No. CBM2013-00009, U.S. Pat. No. 8,140,358, Rule 42.64(b)(2)Declaration of Scott Andrews on behalf of Petitioner Liberty Mutual Insurance Co. regarding U.S. Pat. No. 8,140,358, *Liberty Mutual Insurance Co.* versus *Progressive Casualty Insurance Co.*, United States Patent and Trademark Office before the Patent Trial and Appeal Board, Sep. 6, 2013, 3 pages.
Case No. CBM2013-00009, U.S. Pat. No. 8,140,358, Rule 42.64(b)(2)Declaration of Jordan M. Rossen, *Liberty Mutual Insurance Co.* versus *Progressive Casualty Insurance Co.*, United States Patent and Trademark Office before the Patent Trial and Appeal Board, Sep. 9, 2013, 2 pages.
"Automatic Vehicle Location for Public Safety Dispatch," Trimble brochure, 1993, 8 pages.
AutoTap OBDII Diagnostic Scanner—AutoTap Product Information;<http://www.autotap.com/products.html>; last visited on Oct. 25, 2004, pp. 2.
"Electric Insurance Joins Inuit's Quicken InsureMarket Offering Online Auto Policies in 6 States," Business Wire, Dec. 28, 1998, 2 pages.
"Jan. 1, 1994 UK: An Interst in Black Magic—Motor Technology," Insurance Age, pp. 25.
"Mechanical Forensics Engineering Services, LLC (MFES). Mechanical Forensics: Vetronix CDR system"—Vetronix Crash Data Retrieval System <http://mfes.com/cdr.html>: last visited on Oct. 25, 2004, pp. 8.
"Newsmine.org—black box in car reports you.txt" Newmine.org. <http://newsmine.org/archive/security/bigbrother/black-box-in-car-reports-you.txt>; last visited on Oct. 25, 2004, p. 4.
"NHTSAR Research and Development, NRD-01. EDR—NHTSA Event Data Recorder Program". NHTSA Event Data Recorder Program <http://www-nrd.nhtsa.dot.gov/departments/nrd-01/summaries/EDR.html>; last visited on Oct. 25, 2004, pp. 2.
"Operation of an Audited-Mile/Year Automobile Insurance System—Under Pennsylvania Law," A Study Prepared for Sponsors of Pennsylvania Senate Bill SB 775 and Pennsylvania House Bill 1881 and other Interested Members of the Pennsylvania General Assembly, NOW Insurance Project for National Organization for Women, Jun. 1992, 18 pages.
"Road Safety Press Releases" Roadsafety.com <http://www.roadsafety.com/pressreleases.php?view=16&id=18>; last visited on Oct. 25, 2004, p. 1.
"Road Safety Press Releases" Roadsafety.com <http://www.roadsafety.com/pressreleases.php?view=16&id=19>: last visited on Oct. 25, 2004, p. 1.
"Road Safety Teen Drivers Frequently Asked Questions" Roadsafety.com <http://64.233.167.104/search?q=cache:bwGvLSZMlr0J:www.roadsafety.com/faqs_teen.php+drivers +teen+. . . >; last visited on Oct. 25, 2004, pp. 7.
"Safemotion". "Welcome to Safemotion" <http://www.safemotion.net/>; last visited on Feb. 9, 2005, pp. 2.

(56) References Cited

OTHER PUBLICATIONS

"Sensors". *Automotive Engineering International* v107, n9, p. 37. Sep. 1999, pp. 14.
"Vehicle Alert and Notification System," IBM Technical Disclosure Bulletin vol. 38, No. 8, Aug. 1995, pp. 209-211.
"Vetronix ETAS Group." Vetronix Corporation—Crash Data Retrieval System Frequently Asked Questions. Crash Data Retrieval System Frequently Asked Questions. http://www.vetronix.com/diagnostics/cdr/faqs.html>: last visited on Oct. 25, 2004, pp. 5.
"1988 Automobile Insurance Shoppers' Guide," Florida Department of Insurance, 1988, 20 pages.
"1992 Ohio Shoppers' Guide to Auto insurance," The Ohio Department of Insurance, 1992, 24 pages.
"1995 Consumers Guide on Automobile Insurance (Downstate)," New York State Insurance Department, 1995, 66 pages.
"Qualcomm's MSM6500 Multimedia Single-Chip Solution Enables High-Performance Muitimode Handsets Supporting CDMA2000 1X, 1XEV-DO and GSM/GPRS," PR Newswire, Nov. 12, 2002, 3 pages.
Allstate's Motion to Sever, Consolidate and Stay All Claims, Defenses and Counterclaims Relating to U.S. Pat. No. 6,064,970 with Exhibits, filed Feb. 9, 2011, Case: 1:11-cv-00082-BYP, *Progressive Casualty Insurance Company* versus *Allstate Insurance Company et al.*, 69 pages.
Allstate's Reply In Support of Its Motion to Sever, Consolidate and Stay All Claims, Defenses and Counterclaims Relating to U.S. Pat. No. 6,064,970, filed Mar. 9, 2011, Case: 1:11-cv-00082-BYP, *Progressive Casualty Insurance Company* versus *Allstate Insurance Company et al.*, 9 pages.
Amended Complaint with Exhibits, filed Jan. 27, 2011, Case No. 1:11-cv-00082-BYP, *Progressive Casualty Insurance Company* versus *Allstate Insurance Company et al.*, 68 pages.
Auto Watch product description, Ease Diagnostic, Copyright 1998, 2 pages.
AutoWatch—It's There When You're Not, "Are you a business or fleet owner who is interested in knowing when and how your vehicle's are being driven?," EASE Diagnostics, 2 pages.
AutoWatch—It's There When You're Not, Features, EASE Simulation, Inc., Revised Jan. 2, 2006, copyright 1997-2005, 2 pages.
AutoWatch—It's There When You're Not: Requirements, EASE Simulation, Inc., copyright 1997-2003, Revised Mar. 3, 2003, printed from the internet at http://www.obd2.com/autowatch/obd2/autowatch_requirements.htm> on Sep. 9, 2004, 2 pages.
AutoWatch™ product description, EASE Diagnostics, copyright Mar. 2000, 2 pages.
Baig, E. C., "The Safest Cars of 91," U.S. News & World Report, vol. 109, No. 22, Dec. 3, 1990, pp, 71 (6).
Barkai, Joseph. "Vehicle Diagnostics—Are you Ready for the Challenge?" Society of Automotive Engineers, Inc, © 2001; pp. 5.
Berk, P., "Riding with Customers: for Automakers, Getting Internet Services into Cars Can Build Closer Client Relationships. (TELEMATICS)." *Internet World*, v7, n20, p. 44(1). Dec. 2002: ISSN: 1097-8291, pp. 4.
Boehner, David S., Excerpt from Automotive Microcontrollers, Automotive Electronics Handbook, Ronald K. Jurgen ed., McGraw-Hill, Inc., 1995, pp. 11.24-11.29.
Brown, Robert L., "Recent Canadian Human Rights Decisions Having an Impact on Gender-Based Risk Classification Systems," Journal of Actuarial Practice, vol. 3, No. 1, 1995, pp. 171-192.
Butler, P. et al., "Driver Record: a Political Red Herring That Reveals the Basic Flaw in Automobile Insurance Pricing," Journal of Insurance Regulation, vol. 8, No. 2, 1989, pp. 200-234.
Butler, P., "Cost-Based Pricing of individuai Automobile Risk Transfer: Car-Mile Exposure Unit Analysis," Journal of Actuarial Practice, vol. 1, No. 1, 1993, pp. 51-84.
Butler, P., "Gas-Tax and Time-Period Insurance Methods Equally Flawed," National Underwriter, Jun. 15, 1998, p. 594.
Butler, T., "Insurance by the Mile," Letter to the Editor, The Washington Post, Jan. 17, 1991, 2 pages.

Capon, R., "Insure by the Mile," Letter to the Editor, The Washington Post, Dec. 27, 1990, 2 pages.
Carley, Larry, "Understanding OBDII: Past, Present & Future"© 2001; http://hostingprod.com/@aa 1car.com/library/us7960bd.htm>; last visited on Oct. 25, 2004, pp. 6.
Chidester, A. et al., "Recording Automotvie Crash Event Data," International Symposium on Transportation Recorders, May 1999, Arlington, Virginia, printed from the internet at http://64.233.179.104/search?q=cache:5Nz6R6g5eMsJ:www.nhtsa.dot.gov/cars/problemns/st . . . > on Sep. 8, 2004, 14 pages.
Civil Docket for Case No. 1:10-cv-01370-PAG, *Progressive Casualty Insurance Company* versus *Safeco Insurance Company of Illinois et al.*, U.S. District Court, Northern District of Ohio (Cleveland) printed from the internet at <http://ecf.ohnd.uscourts.gov/cgi-bin/DktRpt.pl?324688388186026-L_1_0-1> on Dec. 22, 2010, 12 pages.
Civil Docket for Case No. 1:11-cv-00082-BYP, *Progressive Casualty Insurance Company* versus *Allstate Insurance Company et al.*, U.S. District Court, Northern District of Ohio (Cleveland) printed from the internet at <https://ecf.ohnd.uscourts.gov/cgi- bin/DktRpt.pl?109962780451316-L_1_0-1 on Apr. 21, 2011, 19 pages.
Complaint with Exhibits, filed Jan. 12, 2011, Case No. 1:1-cv-00082-BYP: *Progressive Casualty Insurance Company* versus *Allstate Insurance Company et al.*, 63 pages.
Complaint, filed Jun. 18, 2010. Case No. 1:10-cv-01370-PAG: *Progressive Casualty Insurance Company* versus *Safeco Insurance Company of Illinois, Safeco Company of America, Safeco Corporation, Liberty Mutual Insurance Company, Group Inc., The Ohio Casualty Insurance Company, and Open Seas Solutions*, 201 pages.
Creative Innovators Associates, LLC. "Creative Innovators Associates". CIA Intellectual Property Portfolio. <http://www.cia123.com/cia_portfolio.htm>; last visited on Feb. 7, 2005, pp. 3.
Davis DriveRight Need Help Choosing Davisnet.com. <http://web.archive.org/web/20010603073125/www.davisnet.com/drive/help_choosing.asp>; last visited on Nov. 4, 2004, p. 1.
Davis DriveRight Overview Davisnet.com. <http://web.archive.org/web/20010518135302/http://www.davisnet.com/drive./>; last visited on Nov. 4, 2004, p. 1.
Davis DriveRight. "Solutions for Vehicle Safety and Management 2005." <www.driveright.cc>; pp. 16.
Declaration of Mary L. O'Neil, Covered Business Method Review Petition of U.S. Pat. No. 6,064,970, LMIC-018-801, Sep. 14, 2012, 21 pages.
Declaration of Mary L. O'Neil, Covered Business Method Review Petition of U.S. Pat. No. 6,064,970, LMIC-018-802, Sep. 14, 2012, 20 pages.
Declaration of Scott Andrews, Covered Business Method Review Petition of U.S. Pat. No. 6,064,970, LMIC-018-801, Sep. 15, 2012, 22 pages.
Declaration of Scott Andrews, Covered Business Method Review Petition of U.S. Pat. No. 6,064,970, LMIC-018-802, Sep. 15, 2012, 21 pages.
Declaration of Scott Andrews, Covered Business Method Review Petition of U.S. Pat. No. 8,140,358, LMIC-021-801 , Sep. 15, 2012, 26 pages.
Defendants' Motion to Dismiss for Failure to State a Claim Upon Which Relief May Be Granted, filed Sep. 8, 2010, Case No. 1:10-cv-01370-PAG: *Progressive Casualty Insurance Company* versus *Safeco Insurance Company of Illinois, Safeco Insurance Company of America, Safeco Corporation, Liberty Mutual Insurance Company, Liberty Mutual Group Inc., The Ohio Casualty Insurance Company, and Open Seas Solutions, Inc.*, 99 pages.
Defendants' Motion to Stay Litigation Pending Ex Parte Reexamination of the Patent-In-Suit by the United States PTO filed Oct. 14, 2010, Case No. 1:10-cv-01370-PAG: *Progressive Casualty Insurance Company* versus *Safeco Insurance Company of Illinois, Safeco Insurance Company of America, Safeco Corporation, Liberty Mutual Insurance Company, Liberty Mutual Group Inc., The Ohio Casualty Insurance Company, and Open Seas Solutions, Inc.*, 339 pages.
Defendants' Reply Memorandum In Support of Their Motion to Dismiss for Failure to State a Claim Upon which Relief may be Granted filed Oct. 26, 2010, Case No. 1:10-cv-01370-PAG: *Progressive Casualty Insurance Company* versus *Safeco Insurance*

(56) References Cited

OTHER PUBLICATIONS

Company of Illinois, Safeco Insurance Company of America, Safeco Corporation, Liberty Mutual Insurance Company, Liberty Mutual Group Inc., The Ohio Casualty Insurance Company, and Open Seas Solutions, Inc., 13 pages.

Defendants' Reply Memorandum In Support of Their Motion to Stay Litigation Pending Ex Parte Reexamination of the Patent-In-Suit by the United States PTO filed Nov. 4, 2010, Case No. 1:10-cv-01370-PAG: *Progressive Casualty Insurance Company* versus *SafeCo Insurance Company of Illinois, SafeCo Insurance Company of America, SafeCo Corporation, Liberty Mutual Insurance Company, Liberty Mutual Group Inc., The Ohio Casualty Insurance Company, and Open Seas Solutions, Inc.*, 12 pages.

Definition of "premium," Barron's Dictionary of Legal Terms, ed. Steven H. Gifis, 3rd Ed., 1998, 2 pages.

Definition of "rating insurance," Barron's Dictionary of Finance and Investment Terms, ed. John Downs, 5th Ed., 1998, 2 pages.

Definitions of "experience rating," "premium," "pure premium rating method," "rate making," "retrospective rating," and "schedule rating," Barrons' Dictionary of Insurance Terms, ed. Harvey W. Rubin, 4th Ed., 2000, printed from the internet at <http://netlibraryc.om/ntreader/nlreader.dil?book=523258&filename=Page_166.html> on May 31, 2011, 6 pages.

Definitions of "microcontroller" and "program," Microsoft® Computer Dictionary, 5th Ed., 2002, printed from the internet at <http://academic.safaribooksonline.com/book/communications/0735614954/c/ch04?reader=html> on May 19, 2011, 2 pages.

Deierlein, R., "Vendor's Spice Up Services," Beverage World, vol. 109, No. 1467, Jun. 1990, pp. 82(1).

Di Genova, F. et al., "Incorporation of Wireless Communications into Vehicle On-Board Diagnostic (OBD) Systems," Sierra Research Inc., Jan. 18, 2000 132 pages.

Di Genova, F., "Incorporation of Radio Transponders into Vehicle On-Board Diagnostic Systems, vol. 2—Technical Proposal," Sierra Research, Inc., Feb. 26, 1997, 154 pages.

Di Genova, F., " Incorporation of Radio Transponders into Vehicle On-Board Diagnostic Systems, vol. 2—Technical Proposal," Sierra Research, Inc., Feb. 27, 1996, 215 pages.

Dorweiler, P., "Notes on Exposure and Premium Bases," Proceedings of the Casualty Actuarial Society, vol. 16, Nos. 33 & 34, 1929-1930, pp. 319-343.

DriveRight® Spec Sheet, CarChip & CarChipE/X, OBDII-Based Vechicle Data Logger and Software 8210 and 8220, DS8210 Rev B. Nov. 5, 2003, 12 pages.

EASE Diagnostics Catalog, Catalog 2000-B, Copyright 1999-2000 Ease Simulation Inc., 16 pages.

EASE Diagnostics E-mail from Stephen Golenski regarding Auto Watch Fleet photo, Apr. 12, 2006, 1 page.

EASE Diagnostics E-mail regarding Auto Watch photo, Apr. 12, 2006, 2 pages.

EASE Diagnostics News Release titled EASE Diagnostics New Product Announcement: EASE OBD I/OBD II Data Logger, Jun. 22, 1999, 2 pages.

EASE Diagnostics Product Catalog Copyright 1999, Ease Simulation Inc., 20 pages.

EASE Diagnostics, copyright 1999-2003, 37 pages.

Ease Simulation, Inc., Invoice # 9813, Oct. 2, 1998, 1 page.

Ease Simulation, Inc., invoice with copy of Visa receipt payment, Oct. 14, 1998, 2 pages.

Ease Simulation, Inc., website printed from the internet at http://web.archive.org,web/19981205184219/http://www.easesim.com on Apr. 7, 2006, 19 pages.

Eldridge, E., "If your teen puts pedal to the metal, new gadget will tattle," USA Today, Section B, Aug. 24, 1998, 2 pages.

Evangelista, Benny, "Car-crash recorders / 'Black boxes' are moving from airliners to autos" San Francisco Chronicle. Sep. 2, 2002. Sfgate.com<http://www.sfgate.com/cgi-bin/article.cgi?f=/c/a/2002/09/02/BU167062.DTL>; last visited on Oct. 25, 2004, pp. 6.

Event Data Recorder Applications for Highway and Traffic Safety: Patents <http://www-nrd.nhtsa.dot.gov/edr-site/patents.html last visited on Nov. 12, 2004, pp. 11.

Festa, L., "For Insurance Sales, Turn to the 'Web,'" The Insurance Regulator, vol. 5, No. 31, Aug. 7, 1995, pp. 1.

Fox, Terry L., "AX.25 Amateur Packet—Radio Link-Layer Protocol," Version 2.0, Oct. 1984, 64 pages.

Garfinkel, S., "The Road Watches You," The New York Times, Section A, col. 1, May 3, 1995, pp. 23.

Gilman, D., "Re: DERM—Automotive Black Boxes -," The Traffic Accident Reconstruction Origin ARnews, Jun. 8, 1999, printed from the internet at <http://www.tarorigin/ARnews9-98/0612.html> on Sep. 8, 2004, 2 pages.

Göller, Manfred, "Application of GSM in High Speed Trains: Measurements and Simulations," The Institution of Electrical Engineers, copyright 1995, 16 pages.

Gordon, Jacques, "- this Year and Beyond: OBD III is Just Speculation, but OBD II Keeps Evolving in Response to Real-World Experience." *Aftermarket Business* v112, n3, p52. Mar. 2002: ISSN; ISSN: 0892-1121, pp. 5.

Hanneghan et al., "The World-Wide Web As A Platform for Supporting Interactive Concurrent Engineering," Proceedings of Advanced Information Systems Engineering—8th International Conference, CAiSE'96, Heraklion, Crete, Greece, May 20-24, 1996, 17 pages, (available from the internet at URL: http://www.cms.livjm.ac.uk/cmsmhann/publications/papers/CAISE96.pdf).

Hayes, D., "Insurers, Tech Firm Team to Track Teen Drivers," NU Online News Service, Apr. 9, printed from the internet at <http://www.propertyandcasualtyinsurancenews.com/cms/nupc/Templates/website/PrinterFriendly.aspx?( . . . > on Apr. 10, 2007, 1 page.

Kaneko, T. et ai "Multidiy driving patterns and motor carrier accident risk. A disaggregate analysis," Accident Analysis and Prevention, vol. 24, No. 5, Jan. 1, 1992, pp. 437-456.

Klein, J. S. et al., "A Black Box Tells Just the Facts," The Los Angeles Times, Section: View, Jun. 13, 1991, pp. E-8. (2 pages).

Lesser, Victor R. et al., "The Distributed Vehicle Monitoring Testbed: A Tool for Investigating Distributed Problem Solving Networks," AI Magazine, vol. 4, No. 3, 1983, 17 pages.

Liberty Mutual Defendant's Motion to Stay Litigation Pending Ex Parte Reexamination of the Patents-In-Suit by the United States PTO with Exhibits, filed Apr. 4, 2011, Case: 1:11-cv-00082-BYP, *Progressive Casualty Insurance Company* versus *Allstate Insurance Company et al.*, 218 pages.

Liberty Mutual's Memorandum in Partial Opposition to Allstate's Motion to Sever, Consolidate and Stay All Claims, Defenses and Counterclaims Relating to U.S. Pat. No. 6,064,970 with Exhibits, filed Feb. 23, 2011, Case: 1:11-cv-00082-BYP, *Progressive Casualty Insurance Company* versus *Allstate Insurance Company et al.*, 24 pages.

Memorandum of Opinion and Order (regarding Defendants' Motion to Dismiss for Failure to State a Claim Upon Which Relief May Be Granted) dated Nov. 12, 2010, Case No. 1:10-cv-01370-PAG: *Progressive Casualty Insurance Co.* versus *Safeco Insurance Co., et al.*, 10 pages.

Memorandum of Opinion and Order (regarding Defendants' Motion to Stay Litigation Pending Ex Parte Reexamination of the Patent-In-Suit by the United States PTO) dated Nov. 12, 2010, Case No. 1:10-cv-01370-PAG: *Progressive Casualty Insurance Co.* versus *Safeco Insurance Co., et al.*, 9 pages.

Menchu, J., "Choosing the Right Scan Tool," MOTOR, Jul. 2002, pp. 26-27, 30-31, 35-36, and 38.

Miller, Michael J,, "Disparate Impact and Unfairly Discriminatory Insurance Rates," Casualty Actuarial Society, E-Forum, Winter 2009. pp. 276-288.

Mitcham, A., "On-Board Diagnostic Hand-Held Scan Tool Technology: Adherence to the Society of Automotive Engineers Requirements for Scan Tools and an Evaluation of Overall Scan Tool Capability," U.S. Environmental Protection Agency, Oct. 2000, 27 pages.

Mitcham, A., "Evaluation of Currently Available OBD Equipment: Report on OBD Hand-Held Scan Tool Technology," U.S. Environmental Protection Agency 16th Mobile Sources/Clean Air Conference, Sep. 22, 2000, 18 pages.

(56) References Cited

OTHER PUBLICATIONS

Mizutani, Shuji, "Car Electronics," Sankaido Co. Ltd., copyright 1992, p. 250.

Murray, C. J., "PC's next stop: Your dashboard," Design News, May 18, 1998, printed from the internet at <http://www.designnews.com/index.asp?layout=articlePrint&articleID=CA117026> on Sep. 8, 2004, 3 pages.

Narten, T., "File Server," Encyclopedia of Computer Science, Ed. Anthony Ralston and Edwin D. Reilly, 3rd. Ed., New York: Van Nostrand Reinhold, copyright 1993, pp. 554-555.

National General Assurance Company Maryland Rules Manual: Private Passenger Auto, New Business Effective Jun. 16, 2006 Renewals Effective Sep. 29, 2006, 1 page.

News Release Auto Watch™ (New Product Announcement), Jun. 16, 1998, 3 pages.

OBD Vehicle Usage Monitor—AutoWatch, Software for Cars, copyright 1999-2004, printed from the Internet at <http://www.obd-onboarddiagnostics.com/AutoWatch.htm> on Jan. 20, 2004, 1 page.

Ott, Gary D., Vehicle Location in Cellular Mobile Radio Systems, IEEE, vol. VT-26, No. 1, 1977, pp. 43-46.

Pasher, V. S., "Auto Web Site Takes Off," National Underwater, Property & Casualty/Risk & Benefits Management Ed., vol. 102, No. 11, Mar. 16, 1998, pp. 9 and 16.

Pathfinder 2001 Mega Release!, [298-1 (01-75)], SPX Service Solutions, 6 pages.

Petition for Covered Business Method Patent Review of U.S. Pat. No. 6,064,970 Pursuant to 35 U.S.C. §321, 37 C.F.R § 42.304, LMIC-018-801, Sep. 16, 2012, 80 pages.

Petition for Covered Business Method Patent Review of U.S. Pat. No. 6,064,97 Pursuant to 35 U.S.C. §321, 37 C.F.R. § 42.304, LMIC-018-802, Sep. 16, 2012, 89 pages.

Petition for Covered Business Method Patent Review of U.S. Pat. No. 8,140,358 Pursuant to 35 U.S.C. §321, 37 C.F.R. § 42.304, LMIC-021-801, Sep. 16, 2012, 88 pages.

Progressive Casualty Insurance Company's Memorandum in Opposition to the Liberty Mutual Defendant's Motion to Sever, filed Feb. 28, 2011, *Progressive Casualty Insurance Company* versus *Allstate Insurance Company et al.*, 15 pages.

Progressive's Response to Allstate's Motion to Sever, Consolidate arid Stay All Claims, Defenses and Counterclaims Relating to U.S. Pat. No. 6,064,970, filed Feb. 26, 2011, Case: 1:11-cv-00082-BYP, *Progressive Casualty Insurance Company* versus *Allstate Insurance Company et al.*, 5 pages.

Progressive's Memorandum in Opposition to Defendants' Motion to Dismiss for Failure to State a Claim Upon which Relief may be Granted filed Oct. 12, 2010, Case No. 1:10.cv-01370-PAG: *Progressive Casualty Insurance Company* versus *Safeco Insurance Company of Illinois, Safeco Insurance Company of America, Safeco Corporation, Liberty Mutual Insurance Company, Liberty Mutual Group Inc., The Ohio Casualty Insurance Company, and Open Seas Solutions, Inc.*, 59 pages.

Progressive's Memorandum in Opposition to Defendants' Motion to Stay Litigation Pending Ex Parte Reexamination of the Patent-In-Suit by the USPTO filed Oct. 28, 2010 Case No. 1:10-cv-01370-PAG: *Progressive Casualty Insurance Company* versus *Safeco Insurance Company of Illinois, Safeco Insurance Company of America, Safeco Corporation, Liberty Mutual Insurance Company, Liberty Mutual Group Inc., The Ohio Casualty Insurance Company, and Open Seas Solution, Inc.*, 80 pages.

PSC-200TM intelligent Data Controller, product description, Trimble, 1994, 2 pages.

Request tor Ex Parte Reexamination of U.S. Pat. No. 6,064,970 Pursuant to 35 U.S.C. § 302, 37 C.F.R. §1.510, filed Sep. 22, 2010, 178 pages.

Richgels, Jeff. "Free Car Insurance; State Is Test for New Volkswagen Incentive". The Capital Times (Madison, Wisconsin). <http://www6.lexisnexis.com/publisher/EndUser?Action=UserDisplayFullDocument&orgId . . . >; last visited on Jan. 6, 2005, pp. 3.

Road Safety "Safe Driving Starts with a Well Trained Driver," printed from the internet at http://www.roadsafety.com/shop/> on Jan. 20, 2004, Road Safety International, Inc., 1999-2003, 2 pages.

RoadSafety International "Road Safety Dn-Board Computer Systems" <littp://web,archieve. orgiweb/20000309144948Inttpliwwvv. roadsafety,comf; last visited on 12 Nov. 2004, pp. 2.

RoadSafety International. "Road Safety On-Board Computer Systems" <http://web.archieve.org/web/20000309144948/http://www.roadsafety.com/>;last visited on Nov. 12, 2004, pp. 2.

Roberts, G., "Drive less during rush hour, get a lower insurance rate," Seattle Post-Intelligencer, Mar. 28, 2007, printed from the internet at <http://seattlepi.nwsource.com/printer2/index.asp?ploc=t&refer=http://seatllepi.nwsource.com/transporati . . . > on Mar. 30, 2007; 1 page.

Rosenberg, M. et al., "Rate Classification Reform in New Jersey," Best's Reivew (Prop/Casualty), vol. 92, No. 12, Apr. 1992, pp. 30-32.

Safeco Insurance Company of Illinois, Safeco Insurance Company of America, Liberty Mutual Fire Insurance Company and Liberty Mutual Insurance Company's Motion to Sever, filed Feb. 9, 2011, *Progressive Casualty Insurance Company* versus *Allstate Insurance Company et al.*, 20 pages.

Safeco Insurance Company of Illinois, Safeco Insurance Company of America, Liberty Mutual Fire Insurance Company and Liberty Mutual Insurance Company's Reply In Support of Motion to Sever, filed Mar. 10, 2011, Case: 1:11-cv-00082-BYP, *Progressive Casualty Insurance Company* versus *Allstate Insurance Company et al.*, 9 pages.

San Jose International Auto Show Advertisement, San Jose Convention Center, Jan. 6-10, 1999, 2 pages.

Scapinakis, Dimitris A. et al., "Communications and Positioning Systems in the Motor Carrier Industry," Research Reports, California Partners for Advanced Transit and Highways (PATH), Institute of Transportation Studies (UCB), UC Berkeley, Jan. 1, 1992, 84 pages.

SERF—System for Electronic Rate and Form Filing, printed from the internet at <http://statelogin.serff.com/serff/updateFilingView.do> on Feb. 15, 2007, 4 pages.

Sierra Research Proposal, "Incorporation of Radio Transponders into Vehicular On-Board Diagnostic Systems, vol. 1—Administrative Documents," Sierra Research, Inc., Feb. 27, 1996, 28 pages.

Sierra Research Proposal, "Incorporation of Radio Transponders into Vehicular On-Board Diagnostic Systems, vol. 3—Cost Proposal," Sierra Research, Inc., Feb. 27, 1996, 18 pages.

Smart-Driver: What is SmartDriver?, printed from the internet at <http://www.smart-driver.com/index.html on Jan. 20, 2004, 1 page.

Society for Automotive Engineers Report titled "Surface Vehicle Recommended Practice: OBD II Scan Tool—Equivalent to ISO/DIS 15031-4: Dec. 14, 2001," SAE J1978. Issued Mar. 1992, Revised Apr. 2002, Society of Automotive Engineers, Inc., copyright 2002, pp. 1-16.

Society for Automotive Engineers Report titled "Surface Vehicle Recommended Practice: Universal Interface for OBD II Scan," SAE J2201, Issued Jun. 1993, Society of Automotive Engineers, Inc., copyright 1993, pp. 1-45.

Society for Automotive Engineers Report titled "Surface Vehicle Recommended Practice: Universal Interface for OBD II Scan," SAE J2201, Issued Jun. 1993, Superseding J2201 Jun. 1993, Society of Automotive Engineers, Inc., copyright 1999, pp. 1-44.

Society for Automotive Engineers Report titled "Surface Vehicle Standard: (R) E/E Diagnostics Test Modes—Equivalent to ISO/DIS 15031-5:Apr. 30, 2002," SAE J1979, Issued Dec. 1991, Revised Apr. 2002, Society of Automotive Engineers, Inc., copyright 2002,159 pages.

The OBD II Home Page, OBD-II Background Information, B&B Electronics, copyright 2011, printed from the Internet at http://www.obdii.com/background.html> on Sep. 14, 2012, 4 pages.

U.S. Air Force MEEP Project Final Report—Vehcile Data Collection, Jul. 2000, 1 page.

U.S. Appl. No. 60/077,650, which is the unpublished provisional parent application of U.S. Pat. No. 5,835,008 that issued, and thus became publicly available, on Nov. 10, 1998.

(56) References Cited

OTHER PUBLICATIONS

Users Manual for the AutoWatch™ /AutoWatch™ Fleet OBD II Version, Rev 050902, EASE Simulation, Inc., copyright 1998-2002, pp. 1-71.
Vehicle Monitoring Products—AutoWatch, EASE Diagnostics—The Leader in PC Automotive Diagnostic Software, EASE Simulation, Inc., Revised Apr. 30, 2004, copyright 1997-2004, 2 pages.
Vetronix Corporation—Crash Data Retrieval System Frequently Asked Questions, Vetronix Corporation, copyright 2004, printed from the Internet at <http://www.vetronix.com/diagnostics/cdr/faqs.html> on Sep. 8, 2004, 5 pages.
Vetronix Corporation Presentation "Advances in Scan Tool Technology," from OBD 2K On-Board Diagnostics Conference 2000, Ogden, UT, May 19, 2000, 13 pages.
Vetronix Corporation Presentation titled "Vetronix Crash Data Retrieval System," from IEEE P1616 Meeting, Sep. 24, 2002, 29 pages.
Vetronix Corporation Press Release article titled "Vetronix Corporation launches the Crash Data Retrieval (CDR) System," Mar. 9, 2000, printed from the internet at <http://www.vetronix.com/company/press/vtx_2000-03-09_cdr.html> on Sep. 8, 2004, 2 pages.
Vetronix Corporation Press Release article titled "Vetronix Corporation to Provide 'AutoConnect' Vehicle Interface Solutions for the Clarion AutoPC," Jan. 8, 1998, 1 page.
WKGM/TV 6, check for payment to Ease Simulation, Inc. of invoice #9813, Nov. 13, 1998, 1 page.
Briskman, Robert D., "Radio Determination Satellite Service," Proceedings of the IEEE, vol. 78, No. 7, Jul. 1990, pp. 1096-1106.
Declaration for Scott Andrews, Covered Business Method Review Petition of U.S. Pat. No. 8,140,358, LMIC-021-802, dated Nov. 19, 2012, 32 pages.
NHTSA, Summary Report: Workshop on Vehicle Technologies to Aid Teen Drivers, U.S. Department of Transportation, National Highway Traffic Safety Administration, Jun. 2006, 45 pages.
Petition for Covered Business Method Patent Review of U.S. Pat. No. 8,140,358 Pursuant to 35 U.S.C. §321, 37 C.F.R. § 42.304, LMIC-021-802, Nov. 19, 2012, 87 pages.
"Interpretative Opinion 3: Professional Communications of Actuaries and Interpretative Opinion 4: Actuarial Principles and Practices." Adopted 1970-1982 by the American Academy of Actuaries, Republished 1992 by the Acturial Standards Board, 10 pages.
"The Telematics Advantage: Growth, Retention and Transformational Improvement with Usage-Based Insurance," Cognizant 20-20 insights, Jan. 2012, 6 pages.
15 U.S.C. §§ 78 m, 1996 edition, 11 pages.
15 U.S.C. §§ 78o, 1996 edition, 18 pages.
157 Congressional Record § 1042, Mar. 1, 2011, 18 pages.
17 Code of Federal Regulatiorts, Parts 200 to 239, Revised Apr. 1, 1996, 29 pages.
American National Standard for Information Processing—"Documentation Symbols and Conventions fo rData, program and System Flowchards, Program Network Charts and System Resources Charts," American National Standards Institute, Inc., Information Technology Industry Council, ISO 5807, 1985, 32 pages.
Bauer, Alan R. et al., "Monitoring System for Determining and Communicating a Cost of Insurance," U.S. Appl. No. 10/764,076, filed Jan. 23, 2004 in the United States Patent and Trademark Office, 77 pages.
Buchanan, W., "Computer Busses: Design and Application," Arnold Publishers, copyright 2000, 37 pages.
Carreno, Luis A. et al., "A Fuzzy Expert System Approach to Insurance Risk Assessment Using FuzzyCLIPS," WESCON/'93 Conference Record, Sep. 1993, pp. 536-541.
Danise, Amy, "Control Your Own Car Insurance Costs: Pay As You Drive," Insure.com, printed from the internet at <http://www.insure.com/car-insurance/usage-based.html> on Feb. 21, 2013, 7 pages.
Derrig, Richard A. et al., "Fuzzy Techniques of Pattern Recognition in Risk and Claim Classification." The Journal of Risk and Insurance, vol. 62, No. 3, Sep. 1995, pp. 447-482.

Ex parte Chiranjit Acharya, Decision on Appeal dated Jun. 19, 2012, U.S. Patent and Trademark Office Board of Patent Appeals and Interferences No. 2010-3919, U.S. Appl. No. 11/284,603, filed Nov. 21, 2005, 8 pages.
Ex parte Daigo Taguchi, U.S. Patent and Trademark Office Board of Patent Appeals and Interferences No. 2000-0768, U.S. Appl. No. 08/607,458, filed Nov. 28, 2001, 8 pages.
Ex parte Dussaud, U.S. Patent and Trademark Office Board of Patent Appeals and Interferences No. 666-06, 7 U.S.P.Q.2d 1818, Jun. 9, 1988, 4 pages.
Ex parte Oetiker, U.S. Patent and Trademark Office Board of Patent Appeals and Interferences No. 88-3256, 23 U.S.P.Q.2d 1651, Jan. 14, 1992, 13 pages.
Ex Parte Reexamination Communication dated Mar. 7, 2011, U.S. Pat. No. 6,064,970, U.S. Appl. No. 90/011,252, United States Patent and Trademark Office, 220 pages.
Ex parte Teddy J. Hirsch and Don L. Ivey, U.S. Patent and Trademark Office Board of Patent Appeals and Interferences No. 1999-1037, U.S. Appl. No. 08/804,284, filed Feb. 22, 2000, 19 pages.
Ex parte Zoran Krivokapic, U.S. Patent and Trademark Office Board of Patent Appeals and Interferences No. 1998-2649, U.S. Appl. No. 08/616,990, filed Jul. 18,2001, 8 pages.
Excerpted sections of 15 U.S.C. §§ 78m (1996 edition)/ 15 U.S.C. §§ 78o(d)(1996 edition); and 17 C.F.R. §§ 200.80 (as of Apr. 1, 1996), 3 pages.
Henderson, Maria et al., "Monitoring System for Determining and Communicating a Cost of Insurance," U.S. Appl. No. 09/571,650, filed May 15, 2000 in the United States Patent and Trademark Office, 31 pages.
Hyle, Robert Regis, "Usage-Based Insurane Next Wave for Personal Auto," Property Casualty 360, Jul. 14, 2011, printed from the internet at <http://www.propertycasualty360.com/2011/07/14/usage-based-insurance-next-wave-for-p . . . > on Dec. 20, 2012, 3 pages.
International Standard, "Information Processing Systems—Computer System Configuration Diagram Symbols and Conventions," International Organization for Standardization, ISo 8790, 1st Edition, 1987, 20 pages.
Interpretative Opinion 3: Professional Communications of Actuaries and Interpretative Opinion 4: Acturial Principles and Practices, Adopted 1970-1982 by the American Academy of Actuaries, Republished 1992 by the Acturial Standards Board, 10 pages.
Johnson, James P. et al.. "Application of a Clustering Adaptive Fuzzy Logic Controller in a Brushless DC Drive," IEEE, IECON 97, vol. 3, 23rd International Conference, New Orleans, LA, 1997, pp. 1001-1005.
Lemaire, Jean, "Fuzzy Insurance," Astin Bulletin, vol. 20, No. 1, pp. 33-56.
Lemaire, Jean, Ch. 3—North America, Automobile Insurance, Acturial Models, Kluwer-Nijhoff Publishing, Boston, 1985, pp. 39-55.
Microsoft Press Computer Dictionary, 3rd Edition, Microsoft Corporation, copyright 1997, pp. 129 and 399, 4 pages.
Microsoft Press Computer Dictionary, 3rd Edition, Microsoft Corporation, copyright 1997, pp. 194, 199, and 430, 6 pages.
Microsoft Press Computer Dictionary, 3rd Edition, Microsoft Corporation, copyright 1997, pp. 430, 4 pages.
Microsoft Press Computer Dictionary, 3rd Edition, Microsoft Corporation, copyright 1997, pp. 68, 3 pages.
Notice of Abandonment for U.S. Appl. No. 09/907,545, United States Patent and Trademark Office, dated May 23, 2006, 2 pages.
Office Action for U.S. Appl. No. 09/907,545, United States Patent and Trademark Office, dated Nov. 4, 2005, 12 pages.
Pinder, Jeanne B., "Fuzzy Thinking Has Merits When It Comes to Elevators," The New York Times, Sep. 22, 1993, printed from the internet at <http://www.nytimes.com/1993/09/22/business/business-technology-fuzzy-thinking-has-m . . .>on Dec. 20, 2012, 2 pages.
Progressive Snapshot Privacy Statement, printed from the internet at <http:www.progressive.com/auto/snapshot-privacy-statement/>on Aug. 6, 2013, 2 pages.
Regis Hyle, Robert, "Usage-Based Insurance Next Wave for Personal Auto," Property Casualty 360, Jul. 14, 2011, printed from the internet at <http://www.propertycasualty360.com/2011/07/14/usage-based-insurance-next-wave-for-p . . . >on Dec. 20, 2012, 3 pages.

(56) References Cited

OTHER PUBLICATIONS

Request for Ex Parte Reexamination of U.S. Pat. No. 6,064,970 Pursuant to 35 U.S.C. § 302, 37 C.F.R. § 1.510, filed Sep. 22, 2010, U.S. Appl. No. 90/011,252, 176 pages.

Risk Classification Statement of Principles booklet, American Academy of Actuaries Committee on Risk Classification, 1980, 18 pages.

Robert Bosch, GmbH, CAN Specification 2.0, Sep. 1991, 72 pages.

Shapiro, Arnold F., "An Overview of Insurance Uses of Fuzzy Logic," Ed. P. Wang et al., Computational Intelligence in Economics and Finance, vol. 2, Springer 2007, pp. 25-61.

The Apache Software Foundation, ASF History Project—Timeline, copyright 2012, printed from the internet at <http://www.apache.org/history/timeline.html>on Aug. 15, 2013, 5 pages.

The Apache Software Foundation, Foundation Project, copyright 2012, printed from the internet at <http://www.apache.org/foundation/> on Sep. 18, 2013, 9 pages.

TMS320C5x, TM320LC5x Digital Signal Processors Data Sheet, Apr. 1995, Revised Apr. 1996, 94 pages.

Trether, Steven A., "Communication System Design Using DSP Algorithms: With Laboratory Experiments for the TMS320C30," Plenum Press, New York, NY, 1995, 10 pages.

Yen, John et al., "Fuzzy Logic: Intelligence, Control, and Information," Prentice-Hall, Inc. Upper Saddle River, NJ, copyright 1999, pp. 55 pages.

Young, Virginia R., "Adjusting Indicated Insurance Rates: Fuzzy Rules that Consider Both Experience and Auxiliary Data," Proceedings of the Casualty Acrtuarial Society Casualty Actuarial Society, Arlington, VA, 1997, pp. 734-785.

CBM2012-00002, U.S. Pat. No. 6,064,970, Declaration of Amanda F. Wieker, *Liberty Mutual Insurance Co.* versus *Progressive Casualty Insurance Co.*, United States Patent and Trademark Office before the Patent Trial and Appeal Board, Sep. 14, 2012, 3 pages.

CBM2012-00002, U.S. Pat. No. 6,064,970, Declaration of Georginne Blundell, *Liberty Mutual Insurance Co.* versus *Progressive Casualty Insurance Co.*, United States Patent and Trademark Office before the Patent Trial and Appeal Board, Sep. 14, 2012, 3 pages.

CBM2012-00002, U.S. Pat. No. 6,064,970, Order Conduct of the Proceeding, *Liberty Mutual Insurance Co.* versus *Progressive Casualty Insurance Co.*, United States Patent and Trademark Office before the Patent Trial and Appeal Board, Feb. 22, 2013, 4 pages.

CBM2012-00002, U.S. Pat. No. 6,064,970, Order Conduct of the Proceeding, *Liberty Mutual Insurance Co.* versus *Progressive Casualty Insurance Co.*, United States Patent and Trademark Office before the Patent Trial and Appeal Board, Feb. 26, 2013, 4 pages.

CBM2012-00002, U.S. Pat. No. 6,064,970, Order Conduct of the Proceeding, *Liberty Mutual Insurance Co.* versus *Progressive Casualty Insurance Co.*, United States Patent and Trademark Office before the Patent Trial and Appeal Board, Mar. 19, 2013, 4 pages.

CBM2012-00002, U.S. Pat. No. 6,064,970, Patent Owner's Response Pursuant to 37 C.F.R. § 42.220 and Exhibits, *Liberty Mutual Insurance Co.* versus *Progressive Casualty Insurance Co.*, United States Patent and Trademark Office before the Patent Trial and Appeal Board, May 1, 2013, 549 pages.

CBM2012-00002, U.S. Pat. No. 6,064,970, Declaration of Dr. Mark Ehsani, *Liberty Mutual Insurance Co.* versus *Progressive Casualty Insurance Co.*, United States Patent and Trademark Office before the Patent Trial and Appeal Board, May 1, 2013, 18 pages.

CBM2012-00002, U.S. Pat. No. 6,064,970, Declaration of Michael J. Miller, *Liberty Mutual Insurance Co.* versus *Progressive Casualty Insurance Co.*, United States Patent and Trademark Office before the Patent Trial and Appeal Board, May 1, 2013, 21 pages.

CBM2012-00002, U.S. Pat. No. 6,064,970, Declaration of John V. Biernacki, *Liberty Mutual Insurance Co.* versus *Progressive Casualty Insurance Co.*, United States Patent and Trademark Office before the Patent Trial and Appeal Board, May 1, 2013, 2 pages.

CBM2012-00002, U.S. Pat. No. 6,064,970, Petitioner's First Set of Objections to Patent Owner's Exhibits, *Liberty Mutual Insurance Co.* versus *Progressive Casualty Insurance Co.*, United States Patent and Trademark Office before the Patent Trial and Appeal Board, May 8, 2013, 7 pages.

CBM2012-00002, U.S. Pat. No. 6,064,970, Supplemental Declaration of Dr. Mark Ehsani, *Liberty Mutual Insurance Co.* versus *Progressive Casualty Insurance Co.*, United States Patent and Trademark Office before the Patent Trial and Appeal Board, May 21, 2013, 5 pages.

CBM2012-00002, U.S. Pat. No. 6,064,970, Supplemental Declaration of Michael J. Miller, *Liberty Mutual Insurance Co.* versus *Progressive Casualty Insurance Co.*, United States Patent and Trademark Office before the Patent Trial and Appeal Board, May 22, 2013, 13 pages.

CBM2012-00002, U.S. Pat. No. 6,064,970, Petitioner's Second Set of Objections to Patent Owner's Exhibits, *Liberty Mutual Insurance Co.* versus *Progressive Casualty Insurance Co.*, United States Patent and Trademark Office before the Patent Trial and Appeal Board, May 30, 2013, 5 pages.

CBM2012-00002, U.S. Pat. No. 6,064,970, Petitioner's Reply to Patent Owner's Response, *Liberty Mutual Insurance Co.* versus *Progressive Casualty Insurance Co.*, United States Patent and Trademark Office before the Patent Trial and Appeal Board, Aug. 6, 2013, 276 pages.

CBM2012-00002, U.S. Pat. No. 6,064,970, Declaration of Darrell W. Stark, *Liberty Mutual Insurance Co.* versus *Progressive Casualty Insurance Co.*, United States Patent and Trademark Office before the Patent Trial and Appeal Board, Aug. 6, 2013, 5 pages.

CBM2012-00002, U.S. Pat. No. 6,064,970, Rebuttal Declaration of Scott Andrews on behalf of Petitioner, *Liberty Mutual Insurance Co.* versus *Progressive Casualty Insurance Co.*, United States Patent and Trademark Office before the Patent Trial and Appeal Board, Aug. 6, 2013, 8 pages.

CBM2012-00002, U.S. Pat. No. 6,064,970, Rebuttal Declaration of Mary L. O'Neil on behalf of Petitioner, *Liberty Mutual Insurance Co.* versus *Progressive Casualty Insurance Co.*, United States Patent and Trademark Office before the Patent Trial and Appeal Board, Aug. 6, 2013, 31 pages.

CBM2012-00002, U.S. Pat. No. 6,064,970, Transcript of Deposition of Scott Andrews, *Liberty Mutual Insurance Co.* versus *Progressive Casualty Insurance Co.*, United States Patent and Trademark Office before the Patent Trial and Appeal Board, Apr. 12, 2013, 165 pages.

CBM2012-00002, U.S. Pat. No. 6,064,970, Transcript of Deposition of Mary L. O'Neil, *Liberty Mutual Insurance Co.* versus *Progressive Casualty Insurance Co.*, United States Patent and Trademark Office before the Patent Trial and Appeal Board, Apr. 13, 2013, 191 pages.

CBM2012-00002, U.S. Pat. No. 6,064,970, Patent Owner's Notice of Objections to Evidence Pursuant to 37 C.F.R. § 42.64 , *Liberty Mutual Insurance Co.* versus *Progressive Casualty Insurance Co.*, United States Patent and Trademark Office before the Patent Trial and Appeal Board, Aug. 13, 2013, 22 pages.

CBM2012-00002, U.S. Pat. No. 6,064,970, Rule 42.64(b)(2)Declaration of Scott Andrews on behalf of Petitioner, *Liberty Mutual Insurance Co.* versus *Progressive Casualty Insurance Co.*, United States Patent and Trademark Office before the Patent Trial and Appeal Board, Aug. 26, 2013, 3 pages.

CBM2012-00002, U.S. Pat. No. 6,064,970, Rule 42.64(b)(2)Declaration of Jordan M. Rossen on behalf of Petitioner, *Liberty Mutual Insurance Co.* versus *Progressive Casualty Insurance Co.*, United States Patent and Trademark Office before the Patent Trial and Appeal Board, Aug. 27, 2013, 4 pages.

CBM2012-00002, U.S. Pat. No. 6,064,970, Rule 42.64(b)(2)Declaration of Mary L. O'Neil on behalf of Petitioner, *Liberty Mutual Insurance Co.* versus *Progressive Casualty Insurance Co.*, United States Patent and Trademark Office before the Patent Trial and Appeal Board, Aug. 27, 2013, 3 pages.

CBM2012-00002, U.S. Pat. No. 6,064,970, Order, *Liberty Mutual Insurance Co.* versus *Progressive Casualty Insurance Co.*, United States Patent and Trademark Office before the Patent Trial and Appeal Board, Sep. 3, 2013, 5 pages.

CBM2012-00002, U.S. Pat. No. 6,064,970, Patent Owner's Notice of Objections to Evidence Pursuant to 37 C.F.R. § 42.64, *Liberty Mutual Insurance Co.* versus *Progressive Casualty Insurance Co.*, United States Patent and Trademark Office before the Patent Trial and Appeal Board, Sep. 4, 2013, 18 pages.

(56) References Cited

OTHER PUBLICATIONS

CBM2012-00002, U.S. Pat. No. 6,064,970, Petitioner's Notice of Service of Rule 42.64(b)(2)Exhibits, *Liberty Mutual Insurance Co.* versus *Progressive Casualty Insurance Co.*, United States Patent and Trademark Office before the Patent Trial and Appeal Board, Sep. 18, 2013, 7 pages.
CBM2012-00002, U.S. Pat. No. 6,064,970, Second Rule 42.64(b)(2)Declaration of Mary L. O'Neil on behalf of Petitioner, *Liberty Mutual Insurance Co.* versus *Progressive Casualty Insurance Co.*, United States Patent and Trademark Office before the Patent Trial and Appeal Board, Sep. 18, 2013, 2 pages.
CBM2012-00002, U.S. Pat. No. 6,064,970, Patent Owner's Notice of Objections to Evidence Pursuant to 37 C.F.R. § 42.64, *Liberty Mutual Insurance Co.* versus *Progressive Casualty Insurance Co.*, United States Patent and Trademark Office before the Patent Trial and Appeal Board, Sep. 25, 2013, 10 pages.
CBM2012-00002, U.S. Pat. No. 6,064,970, Order Conduct of the Proceeding, *Liberty Mutual Insurance Co.* versus *Progressive Casualty Insurance Co.*, United States Patent and Trademark Office before the Patent Trial and Appeal Board, Sep. 30, 2013, 3 pages.
CBM2012-00002, U.S. Pat. No. 6,064,970, Transcript of Telephonic Petition Hearing held Aug. 29, 2013, *Liberty Mutual Insurance Co.* versus *Progressive Casualty Insurance Co.*, United States Patent and Trademark Office before the Patent Trial and Appeal Board, Sep. 30, 2013, 28 pages.
CBM2012-00002, U.S. Pat. No. 6,064,970, Petitioner's Motion to Exclude Under 37 C.F.R. § 42.62 and 42.62, *Liberty Mutual Insurance Co.* versus *Progressive Casualty Insurance Co.*, United States Patent and Trademark Office before the Patent Trial and Appeal Board, Oct. 1, 2013, 10 pages.
CBM2012-00002, U.S. Pat. No. 6,064,970, Petitioner's Updated Exhibit List, *Liberty Mutual Insurance Co.* versus *Progressive Casualty Insurance Co.*, United States Patent and Trademark Office before the Patent Trial and Appeal Board, Oct. 1, 2013, 2 pages.
CBM2012-00002, U.S. Pat. No. 6,064,970, Patent Owner's Motion to Exclude Evidence Pursuant to 37 C.F.R. § 42.64(c), *Liberty Mutual Insurance Co.* versus *Progressive Casualty Insurance Co.*, United States Patent and Trademark Office before the Patent Trial and Appeal Board, Oct. 1, 2013, 18 pages.
CBM2012-00002, U.S. Pat. No. 6,064,970, Patent Owner's Updated Exhibit List, *Liberty Mutual Insurance Co.* versus *Progressive Casualty Insurance Co.*, United States Patent and Trademark Office before the Patent Trial and Appeal Board, Oct. 1, 2013, 2 pages.
CBM2012-00002, U.S. Pat. No. 6,064,970, Patent Owner's Observations on Testimony of Mary L. O'Neil, *Liberty Mutual Insurance Co.* versus *Progressive Casualty Insurance Co.*, United States Patent and Trademark Office before the Patent Trial and Appeal Board, Oct. 1, 2013, 12 pages.
CBM2012-00002, U.S. Pat. No. 6,064,970, Declaration of John V. Biernacki, *Liberty Mutual Insurance Co.* versus *Progressive Casualty Insurance Co.*, United States Patent and Trademark Office before the Patent Trial and Appeal Board, Oct. 1, 2013, 3 pages.
CBM2012-00002, U.S. Pat. No. 6,064,970, Order regarding Trial Hearing, *Liberty Mutual Insurance Co.* versus *Progressive Casualty Insurance Co.*, United States Patent and Trademark Office before the Patent Trial and Appeal Board, Oct. 7, 2013, 4 pages.
CBM2012-00002, U.S. Pat. No. 6,064,970, Patent Owner's Opposition to Petitioner's Motion to Exclude Evidence, *Liberty Mutual Insurance Co.* versus *Progressive Casualty Insurance Co.*, United States Patent and Trademark Office before the Patent Trial and Appeal Board, Oct. 11, 2013, 12 pages.
CBM2012-00002, U.S. Pat. No. 6,064,970, Petitioner's Opposition to Patent Owner's Motion to Exclude Evidence Pursuant to 37 C.F.R. § 42.64(c), *Liberty Mutual Insurance Co.* versus *Progressive Casualty Insurance Co.*, United States Patent and Trademark Office before the Patent Trial and Appeal Board, Oct. 11, 2013, 19 pages.
CBM2012-00002, U.S. Pat. No. 6,064,970, Petitioner's Response to Patent Owner's Observations on Testimony of Mary L. O'Neil, *Liberty Mutual Insurance Co.* versus *Progressive Casualty Insurance Co.*, United States Patent and Trademark Office before the Patent Trial and Appeal Board, Oct. 11, 2013, 8 pages.
CBM2012-00002, U.S. Pat. No. 6,064,970, Petitioner's Updated Exhibit List, *Liberty Mutual Insurance Co.* versus *Progressive Casualty Insurance Co.*, United States Patent and Trademark Office before the Patent Trial and Appeal Board, Oct. 11, 2013, 2 pages.
CBM2012-00002, U.S. Pat. No. 6,064,970, Declaration of Jordan M. Rossen, *Liberty Mutual Insurance Co.* versus *Progressive Casualty Insurance Co.*, United States Patent and Trademark Office before the Patent Trial and Appeal Board, Oct. 11, 2013, 2 pages.
CBM2012-00002, U.S. Pat. No. 6,064,970, Patent Owner's Updated Exhibit List, *Liberty Mutual Insurance Co.* versus *Progressive Casualty Insurance Co.*, United States Patent and Trademark Office before the Patent Trial and Appeal Board, Oct. 16, 2013, 2 pages.
CBM2012-00002, U.S. Pat. No. 6,064,970, Petitioner's Reply to Patent Owner's Opposition to Petitioner's Motion to Exclude, *Liberty Mutual Insurance Co.* versus *Progressive Casualty Insurance Co.*, United States Patent and Trademark Office before the Patent Trial and Appeal Board, Oct. 17, 2013, 8 pages.
CBM2012-00002, U.S. Pat. No. 6,064,970, Patent Owner's Reply in Support of its Motion to Exclude Evidence Pursuant to 37 C.F.R. § 42.64(c), *Liberty Mutual Insurance Co.* versus *Progressive Casualty Insurance Co.*, United States Patent and Trademark Office before the Patent Trial and Appeal Board, Oct. 17, 2013, 8 pages.
CBM2012-00002, U.S. Pat. No. 6,064,970, Order Conduct of the Proceeding, *Liberty Mutual Insurance Co.* versus *Progressive Casualty Insurance Co.*, United States Patent and Trademark Office before the Patent Trial and Appeal Board, Dec. 4, 2013, 4 pages.
CBM2012-00002, U.S. Pat. No. 6,064,970, Transcript of Hearing held Oct. 21, 2013, *Liberty Mutual Insurance Co.* versus *Progressive Casualty Insurance Co.*, United States Patent and Trademark Office before the Patent Trial and Appeal Board, Jan. 14, 2014, 90 pages.
CBM2012-00002, U.S. Pat. No. 6,064,970, Final Written Decision, *Liberty Mutual Insurance Co.* versus *Progressive Casualty Insurance Co.*, United States Patent and Trademark Office before the Patent Trial and Appeal Board, Jan. 23, 2014, 72 pages.
CBM2012-00002, U.S. Pat. No. 6,064,970, Order—Conduct of the Proceeding, *Liberty Mutual Insurance Co.* versus *Progressive Casualty Insurance Co.*, United States Patent and Trademark Office before the Patent Trial and Appeal Board, Feb. 20, 2014, 3 pages.
CBM2012-00002, U.S. Pat. No. 6,064,970, Patent Owner Updated Exhibit List, *Liberty Mutual Insurance Co.* versus *Progressive Casualty Insurance Co.*, United States Patent and Trademark Office before the Patent Trial and Appeal Board, Feb. 24, 2014, 2 pages.
CBM2012-00002, U.S. Pat. No. 6,064,970, Patent Owner Notice of Appeal, *Liberty Mutual Insurance Co.* versus *Progressive Casualty Insurance Co.*, United States Patent and Trademark Office before the Patent Trial and Appeal Board, Mar. 26, 5 pages.
Appeal No. 14-1466 of CBM2012-00002, U.S. Pat. No. 6,064,970, Motion for Temporary Stay Pending Possible Notice of Appeal in Related Proceeding, *Progressive Casualty Insurance Co.* versus *Liberty Mutual Insurance Co.*, United States Court of Appeals for the Federal Circuit, May 13, 2014, 8 pages.
Appeal No. 14-1466 of CBM2012-00002, U.S. Pat. No. 6,064,970, Appellant's Opposition to Appellee's Motion for Temporary Stay Pending Possible Notice of Appeal in Related Proceeding, *Progressive Casualty Insurance Co.* versus *Liberty Mutual Insurance Co.*, United States Court of Appeals for the Federal Circuit, May 19, 2014, 9 pages.
Appeal No. 14-1466 of CBM2012-00002, U.S. Pat. No. 6,064,970, Appellee's Reply In Support of Motion for Temporary Stay Pending Possible Notice of Appeal in Related Proceeding, *Progressive Casualty Insurance Co.* versus *Liberty Mutual Insurance Co.*, United States Court of Appeals for the Federal Circuit, May 29, 2014, 24 pages.
Appeal No. 14-1466 of CBM2012-00002, U.S. Pat. No. 6,064,970, Order, *Progressive Casualty Insurance Co.* versus *Liberty Mutual Insurance Co.*, United States Court of Appeals for the Federal Circuit, May 30, 2014, 2 pages.
CBM2012-00003, U.S. Pat. No. 8,140,358, Declaration of Amanda F. Wieker, *Liberty Mutual Insurance Co.* versus *Progressive Casu-*

(56) References Cited

OTHER PUBLICATIONS

*alty Insurance Co.*, United States Patent and Trademark Office before the Patent Trial and Appeal Board, Sep. 14, 2012, 4 pages.
CBM2012-00003, U.S. Pat. No. 8,140,358, Declaration of Georginne Blundell, *Liberty Mutual Insurance Co. versus Progressive Casualty Insurance Co.*, United States Patent and Trademark Office before the Patent Trial and Appeal Board, Sep. 15, 2012, 6 pages.
CBM2012-00003, U.S. Pat. No. 8,140,358, Order—Denial of Grounds, *Liberty Mutual Insurance Co. versus Progressive Casualty Insurance Co.*, United States Patent and Trademark Office before the Patent Trial and Appeal Board, Oct. 25, 2012, 16 pages.
CBM2012-00003, U.S. Pat. No. 8,0140,358, Order (Denial of Grounds—37 C.F.R. § 42.208(b)), *Liberty Mutual Insurance Co. versus Progressive Casualty Insurance Co.*, United States Patent and Trademark Office before the Patent Trial and Appeal Board, Oct. 25, 2012, 16 pages.
CBM2012-00003, U.S. Pat. No. 8,140,358, Order (Redundant Grounds), *Liberty Mutual Insurance Co. versus Progressive Casualty Insurance Co.*, United States Patent and Trademark Office before the Patent Trial and Appeal Board, Oct. 25, 2012, 18 pages.
CBM2012-00003, U.S. Pat. No. 8,140,358, Scheduling Order, *Liberty Mutual Insurance Co. versus Progressive Casualty Insurance Co.*, United States Patent and Trademark Office before the Patent Trial and Appeal Board, Feb. 12, 2013, 6 pages.
CBM2012-00003, U.S. Pat. No. 8,140,358, Order Conduct of the Proceeding, *Liberty Mutual Insurance Co. versus Progressive Casualty Insurance Co.*, United States Patent and Trademark Office before the Patent Trial and Appeal Board, Mar. 1, 2013, 4 pages.
CBM2012-00003, U.S. Pat. No. 8,140,358, Order Conduct of the Proceeding, *Liberty Mutual Insurance Co. versus Progressive Casualty Insurance Co.*, United States Patent and Trademark Office before the Patent Trial and Appeal Board, Mar. 19, 2013, 5 pages.
CBM2012-00003, U.S. Pat. No. 8,140,358, Transcript of Deposition under Oral Examination of Scott Andrews, *Liberty Mutual Insurance Co. versus Progressive Casualty Insurance Co.*, United States Patent and Trademark Office before the Patent Trial and Appeal Board, Apr. 12, 2013, 185 pages.
CBM2012-00003, U.S. Pat. No. 8,140,358, Order Synchronizing Trial Schedules, *Liberty Mutual Insurance Co. versus Progressive Casualty Insurance Co.*, United States Patent and Trademark Office before the Patent Trial and Appeal Board, Apr. 19, 2013, 3 pages.
CBM2012-00003, U.S. Pat. No. 8,140,358, First Revised Scheduling Order, *Liberty Mutual Insurance Co. versus Progressive Casualty Insurance Co.*, United States Patent and Trademark Office before the Patent Trial and Appeal Board, Apr. 19, 2013, 5 pages.
CBM2012-00003, U.S. Pat. No. 8,140,358, Declaration of Ivan Zatkovich, *Liberty Mutual Insurance Co. versus Progressive Casualty Insurance Co.*, United States Patent and Trademark Office before the Patent Trial and Appeal Board, Jun. 11, 2013, 86 pages.
CBM2012-00003, U.S. Pat. No. 8,140,358, Patent Owner's Response Pursuant to 37 C.F.R. § 42.220, *Liberty Mutual Insurance Co. versus Progressive Casualty Insurance Co.*, United States Patent and Trademark Office before the Patent Trial and Appeal Board, Jun. 12, 2013, 70 pages.
CBM2012-00003, U.S. Pat. No. 8,140,358, Declaration of Michael J. Miller, *Liberty Mutual Insurance Co. versus Progressive Casualty Insurance Co.*, United States Patent and Trademark Office before the Patent Trial and Appeal Board, Jun. 12, 2013, 19 pages.
CBM2012-00003, U.S. Pat. No. 8,140,358, Petitioner's First Set of Objections to Patent Owner's Exhibits, *Liberty Mutual Insurance Co. versus Progressive Casualty Insurance Co.*, United States Patent and Trademark Office before the Patent Trial and Appeal Board, Jun. 19, 2013, 7 pages.
CBM2012-00003, U.S. Pat. No. 8,140,358, Supplemental Declaration of Michael J. Miller, *Liberty Mutual Insurance Co. versus Progressive Casualty Insurance Co.*, United States Patent and Trademark Office before the Patent Trial and Appeal Board, Jun. 25, 2013, 2 pages.
CBM2012-00003, U.S. Pat. No. 8,140,358, Petitioner's Second Set of Objections to Patent Owner's Exhibits, *Liberty Mutual Insurance Co. versus Progressive Casualty Insurance Co.*, United Sstates Patent and Trademark Office before the Patent Trial and Appeal Board, Jul. 3, 2013, 4 pages.
CBM2012-00003, U.S. Pat. No. 8,140,358, Declaration of Jordan M. Rossen, *Liberty Mutual Insurance Co. versus Progressive Casualty Insurance Co.*, United States Patent and Trademark Office before the Patent Trial and Appeal Board, Aug. 15, 2013, 2 pages.
CBM2012-00003, U.S. Pat. No. 8,140,358, Rebuttal Declaration of Mary L. O'Neil on behalf of Petitioner, *Liberty Mutual Insurance Co. versus Progressive Casualty Insurance Co.*, United States Patent and Trademark Office before the Patent Trial and Appeal Board, Aug. 15, 2013, 13 pages. (EX 1032).
CBM2012-00003, U.S. Pat. No. 8,140,358, Rebuttal Declaration of Scott Andrews on behalf of Petitioner, *Liberty Mutual Insurance Co. versus Progressive Casualty Insurance Co.*, United States Patent and Trademark Office before the Patent Trial and Appeal Board, Aug. 15, 2013, 29 pages. (EX 1034).
CBM2012-00003, U.S. Pat. No. 8,140,358, Petitioner's Reply to Patent Owner's Response, *Liberty Mutual Insurance Co. versus Progressive Casualty Insurance Co.*, United States Patent and Trademark Office before the Patent Trial and Appeal Board, Aug. 15, 2013, 22 pages.
CBM2012-00003, U.S. Pat. No. 8,140,358, Patent Owner's Notice of Objections to Evidence Pursuant to 37 C.F.R. § 42.64, *Liberty Mutual Insurance Co. versus Progressive Casualty Insurance Co.*, United States Patent and Trademark Office before the Patent Trial and Appeal Board, Aug. 22, 2013, 22 pages.
CBM2012-00003, U.S. Pat. No. 8,140,358, Order Conduct of the Proceeding, *Liberty Mutual Insurance Co. versus Progressive Casualty Insurance Co.*, United States Patent and Trademark Office before the Patent Trial and Appeal Board, Sep. 3, 2013, 5 pages.
CBM2012-00003, U.S. Pat. No. 8,140,358, Rule 42.64(b)(2)Declaration of Jordan M. Rossen, *Liberty Mutual Insurance Co. versus Progressive Casualty Insurance Co.*, United States Patent and Trademark Office before the Patent Trial and Appeal Board, Sep. 5, 2013, 2 pages.
CBM2012-00003, U.S. Pat. No. 8,140,358, Rule 42.64(b)(2)Declaration of Mary L. O'Neil on behalf of Petitioner regarding U.S. Pat. No. 8,140,358, *Liberty Mutual Insurance Co. versus Progressive Casualty Insurance Co.*, United States Patent and Trademark Office before the Patent Trial and Appeal Board, Sep. 5, 2013, 2 pages.
CBM2012-00003, U.S. Pat. No. 8,140,358, Rule 42.64(b)(2)Declaration of Scott Andrews on behalf of Petitioner regarding U.S. Pat. No. 8,140,358, *Liberty Mutual Insurance Co. versus Progressive Casualty Insurance Co.*, United States Patent and Trademark Office before the Patent Trial and Appeal Board, Sep. 5, 2013, 3 pages.
CBM2012-00003, U.S. Pat. No. 8,140,358, Order Conduct of the Proceeding, *Liberty Mutual Insurance Co. versus Progressive Casualty Insurance Co.*, United States Patent and Trademark Office before the Patent Trial and Appeal Board, Sep. 6, 2013, 3 pages.
CBM2012-00003, U.S. Pat. No. 8,140,358, Petitioner's Notice of Service of Rule 42.64(b)(2)Exhibits, *Liberty Mutual Insurance Co. versus Progressive Casualty Insurance Co.*, United States Patent and Trademark Office before the Patent Trial and Appeal Board, Sep. 26, 2013, 3 pages.
CBM2012-00003, U.S. Pat. No. 8,140,358, Patent Owner's Updated Exhibit List, *Liberty Mutual Insurance Co. versus Progressive Casualty Insurance Co.*, United States Patent and Trademark Office before the Patent Trial and Appeal Board, Sep. 26, 2013, 4 pages.
CBM2012-00003, U.S. Pat. No. 8,140,358, Second Rule 42.64(b)(2)Declaration of Jordan M. Rossen, *Liberty Mutual Insurance Co. versus Progressive Casualty Insurance Co.*, United States Patent and Trademark Office before the Patent Trial and Appeal Board, Sep. 26, 2013, 2 pages.
CBM2012-00003, U.S. Pat. No. 8,140,358, Second Rule 42.64(b)(2)Declaration of Scott Andrews on behalf of Petitioner regarding U.S. Pat. No. 8,140,358, *Liberty Mutual Insurance Co. versus Progressive Casualty Insurance Co.*, United States Patent and Trademark Office before the Patent Trial and Appeal Board, Sep. 26, 2013, 2 pages.
CBM2012-00003, U.S. Pat. No. 8,140,358, Order Conduct of the Proceeding, *Liberty Mutual Insurance Co. versus Progressive Casu-*

(56) References Cited

OTHER PUBLICATIONS

*alty Insurance Co.*, United States Patent and Trademark Office before the Patent Trial and Appeal Board, Sep. 30, 2013, 3 pages.
CBM2012-00003, U.S. Pat. No. 8,140,358, Transcript of Telephonic Petition Hearing held Aug. 29, 2013, *Liberty Mutual Insurance Co.* versus *Progressive Casualty Insurance Co.*, United States Patent and Trademark Office before the Patent Trial and Appeal Board, Sep. 30, 2013, 28 pages.
CBM2012-00003, U.S. Pat. No. 8,140,358, Petitioner's Motion to Exclude Under 37 C.F.R. § 42.62 and 42.64, *Liberty Mutual Insurance Co.* versus *Progressive Casualty Insurance Co.*, United States Patent and Trademark Office before the Patent Trial and Appeal Board, Sep. 30, 2013, 10 pages.
CBM2012-00003, U.S. Pat. No. 8,140,358, Patent Owner's Motion to Exclude Evidence Pursuant to 37 C.F.R. § 42.64(c), *Liberty Mutual Insurance Co.* versus *Progressive Casualty Insurance Co.*, United States Patent and Trademark Office before the Patent Trial and Appeal Board, Sep. 30, 2013, 16 pages.
CBM2012-00003, U.S. Pat. No. 8,140,358, Patent Owner's Observations on Testimony of Mary L. O'Neil, *Liberty Mutual Insurance Co.* versus *Progressive Casualty Insurance Co.*, United States Patent and Trademark Office before the Patent Trial and Appeal Board, Sep. 30, 2013, 9 pages.
CBM2012-00003, U.S. Pat. No. 8,140,358, Declaration of John V. Biernacki, *Liberty Mutual Insurance Co.* versus *Progressive Casualty Insurance Co.*, United States Patent and Trademark Office before the Patent Trial and Appeal Board, Sep. 30, 2013, 2 pages.
CBM2012-00003, U.S. Pat. No. 8,140,358, Order regarding Trial Hearing, *Liberty Mutual Insurance Co.* versus *Progressive Casualty Insurance Co.*, United States Patent and Trademark Office before the Patent Trial and Appeal Board, Oct. 2, 2013, 4 pages.
CBM2012-00003, U.S. Pat. No. 8,140,358, Patent Owner's Notice of Objections to Evidence Pursuant to 37 C.F.R. § 42.64, *Liberty Mutual Insurance Co.* versus *Progressive Casualty Insurance Co.*, United States Patent and Trademark Office before the Patent Trial and Appeal Board, Oct. 3, 2013, 15 pages.
CBM2012-00003, U.S. Pat. No. 8,140,358, Patent Owner's Opposition to Petitioner's Motion to Exclude Evidence, *Liberty Mutual Insurance Co.* versus *Progressive Casualty Insurance Co.*, United States Patent and Trademark Office before the Patent Trial and Appeal Board, Oct. 4, 2013, 10 pages.
CBM2012-00003, U.S. Pat. No. 8,140,358, Petitioner's Response to Patent Owner's Observations on Testimony of Mary L. O'Neil, *Liberty Mutual Insurance Co.* versus *Progressive Casualty Insurance Co.*, United States Patent and Trademark Office before the Patent Trial and Appeal Board, Oct. 4, 2013, 5 pages.
CBM2012-00003, U.S. Pat. No. 8,140,358, Petitioner's Opposition to Patent Owner's Motion to Exclude Evidence Pursuant to 37 C.F.R. § 42.64(c), *Liberty Mutual Insurance Co.* versus *Progressive Casualty Insurance Co.*, United States Patent and Trademark Office before the Patent Trial and Appeal Board, Oct. 4, 2013, 18 pages.
CBM2012-00003, U.S. Pat. No. 8,140,358, Declaration of John V. Biernacki, *Liberty Mutual Insurance Co.* versus *Progressive Casualty Insurance Co.*, United States Patent and Trademark Office before the Patent Trial and Appeal Board, Oct. 4, 2013, 2 pages.
CBM2012-00003, U.S. Pat. No. 8,140,358, Declaration of Jordan M. Rossen, *Liberty Mutual Insurance Co.* versus *Progressive Casualty Insurance Co.*, United States Patent and Trademark Office before the Patent Trial and Appeal Board, Oct. 4, 2013, 2 pages.
CBM2012-00003, U.S. Pat. No. 8,140,358, Petitioner's Reply to Patent Owner's Opposition to Petitioner's Motion to Exclude, *Liberty Mutual Insurance Co.* versus *Progressive Casualty Insurance Co.*, United States Patent and Trademark Office before the Patent Trial and Appeal Board, Oct. 6, 2013, 6 pages.
CBM2012-00003, U.S. Pat. No. 8,140,358, Petitioner's Notice of Third Set of Objections to Patent Owner's Exhibits, *Liberty Mutual Insurance Co.* versus *Progressive Casualty Insurance Co.*, United States Patent and Trademark Office before the Patent Trial and Appeal Board, Oct. 6, 2013, 6 pages.

CBM2012-00003, U.S. Pat. No. 8,140,358, Patent Owner's Reply In Support of Its Motion to Exclude Evidence Pursuant to 37 C.F.R. § 42.64(c), *Liberty Mutual Insurance Co.* versus *Progressive Casualty Insurance Co.*, United States Patent and Trademark Office before the Patent Trial and Appeal Board, Oct. 8, 2013, 8 pages.
CBM2012-00003, U.S. Pat. No. 8,140,358, Petitioner's Notice of Service of Oral Hearing Demonstrative Slides, *Liberty Mutual Insurance Co.* versus *Progressive Casualty Insurance Co.*, United States Patent and Trademark Office before the Patent Trial and Appeal Board, Oct. 9, 2013, 3 pages.
CBM2012-00003, U.S. Pat. No. 8,140,358, Order Conduct of the Proceeding, *Liberty Mutual Insurance Co.* versus *Progressive Casualty Insurance Co.*, United States Patent and Trademark Office before the Patent Trial and Appeal Board, Dec. 4, 2013, 4 pages.
CBM2012-00003, U.S. Pat. No. 8,140,358, Transcript for Hearing held Oct. 15, 2013, *Liberty Mutual Insurance Co.* versus *Progressive Casualty Insurance Co.*, United States Patent and Trademark Office before the Patent Trial and Appeal Board, Jan. 14, 2014, 127 pages.
CBM2012-00003, U.S. Pat. No. 8,140,358, Final Written Decision, *Liberty Mutual Insurance Co.* versus *Progressive Casualty Insurance Co.*, United States Patent and Trademark Office before the Patent Trial and Appeal Board, Feb. 11, 2014, 70 pages.
CBM2012-00003, U.S. Pat. No. 8,140,358, Order Conduct of the Proceeding, *Liberty Mutual Insurance Co.* versus *Progressive Casualty Insurance Co.*, United States Patent and Trademark Office before the Patent Trial and Appeal Board, Feb. 20, 2014, 3 pages.
CBM2012-00003, U.S. Pat. No. 8,140,358, Petitioner's Request for Reharing Seeking Conditional Relief Pursuant to 37 C.F.R. § 42.71, *Liberty Mutual Insurance Co.* versus *Progressive Casualty Insurance Co.*, United States Patent and Trademark Office before the Patent Trial and Appeal Board, Mar. 13, 2014, 7 pages.
CBM2012-00003, U.S. Pat. No. 8,140,358, Transcript of Telephonic Hearing held Mar. 25, 2014, *Liberty Mutual Insurance Co.* versus *Progressive Casualty Insurance Co.*, United States Patent and Trademark Office before the Patent Trial and Appeal Board, Mar. 26, 2014, 16 pages.
CBM2012-00003, U.S. Pat. No. 8,140,358, Order Conduct of the Proceeding, *Liberty Mutual Insurance Co.* versus *Progressive Casualty Insurance Co.*, United States Patent and Trademark Office before the Patent Trial and Appeal Board, Mar. 26, 2014, 3 pages.
CBM2012-00003, U.S. Pat. No. 8,140,358, Patent Owner's Opposition to Petitioner's Improperly Filed Paper No. 61, *Liberty Mutual Insurance Co.* versus *Progressive Casualty Insurance Co.*, United States Patent and Trademark Office before the Patent Trial and Appeal Board, Mar. 28, 2014, 6 pages.
CBM2012-00003, U.S. Pat. No. 8,140,358, Decision regarding Petitioner's Request for Rehearing, *Liberty Mutual Insurance Co.* versus *Progressive Casualty Insurance Co.*, United States Patent and Trademark Office before the Patent Trial and Appeal Board, Apr. 1, 2014, 5 pages.
CBM2012-00003, U.S. Pat. No. 8,140,358, Petitioner's Notice of Appeal, *Liberty Mutual Insurance Co.* versus *Progressive Casualty Insurance Co.*, United States Patent and Trademark Office before the Patent Trial and Appeal Board, Jun. 3, 2014, 5 pages.
CBM2012-00003, U.S. Pat. No. 8,140,358, Patent Owner's Notice of Cross-Appeal, *Liberty Mutual Insurance Co.* versus *Progressive Casualty Insurance Co.*, United States Patent and Trademark Office before the Patent Trial and Appeal Board, Jun. 17, 2014, 6 pages.
Appeal No. 14-1636, of CBM2012-00003, U.S. Pat. No. 8,140,358, Appellant's Motion to Treat Appeals as Companion Cases and to Realign Briefing Schedule, *Liberty Mutual Insurance Co.* versus *Progressive Casualty Insurance Co.*, United States Court of Appeals for the Federal Circuit, Jul. 23, 2014, 2014, 17 pages.
Appeal No. 14~1636 of CBM2012-00003, U.S. Pat. No. 8,140,358, Appellee's Partial Opposition to Liberty's Motion to Treat Appeals as Companion Cases and to Realign Briefing Schedule, *Liberty Mutual Insurance Co.* versus *Progressive Casualty Insurance Co.*, United States Court of Appeals for the Federal Circuit, Jul. 31, 2014, 133 pages.
Appeal No. 14-1636 of CBM2012-00003, U.S. Pat. No. 8,140,358, Appellant's Reply In Support of Motion to Treat Appeals as Companion Cases and to Realign Briefing Schedule, *Liberty Mutual*

(56) References Cited

OTHER PUBLICATIONS

*Insurance Co.* versus *Progressive Casualty Insurance Co.*, United States Court of Appeals for the Federal Circuit, Aug. 1, 2014, 8 pages.
Appeal No. 14-1637 of CBM2012-00003, U.S. Pat. No. 8,140,358, Appellant's Motion to Treat Appeals as Companion Cases and to Realign Briefing Schedule, *Liberty Mutual Insurance Co.* versus *Progressive Casualty Insurance Co.*, United States Court of Appeals for the Federal Circuit, Jul. 23, 2014, 17 pages.
Appeal No. 14-1637 of CBM2012-00003, U.S. Pat. No. 8,140,358, Appellee's Partial Opposition to Liberty's Motion to Treat Appeals as Companion Cases and to Realign Briefing Schedule, *Liberty Mutual Insurance Co.* versus *Progressive Casualty Insurance Co.*, United States Court of Appeals for the Federal Circuit, Jul. 31, 2014, 133 pages.
Appeal No. 14-1637 of CBM2012-00003, U.S. Pat. No. 8,140,358, Appellant's Reply In Support of Motion to Treat Appeals as Companion Cases and to Realign Briefing Schedule, *Liberty Mutual Insurance Co.* versus *Progressive Casualty Insurance Co.*, United States Court of Appeals for the Federal Circuit, Aug. 1, 2014, 8 pages.
CBM2012-00004, U.S. Pat. No. 6,064,970, Declaration of Amanda F. Wieker, *Liberty Mutual Insurance Co.* versus *Progressive Casualty Insurance Co.*, United States Patent and Trademark Office before the Patent Trial and Appeal Board, Sep. 14, 2012, 3 pages.
CBM2012-00004, U.S. Pat. No. 6,064,970, Declaration of Georginne Blundell, *Liberty Mutual Insurance Co.* versus *Progressive Casualty Insurance Co.*, United States Patent and Trademark Office before the Patent Trial and Appeal Board, Sep. 14, 2012, 3 pages.
CBM2012-00004, U.S. Pat. No. 6,064,970, Order Conduct of the Proceeding, *Liberty Mutual Insurance Co.* versus *Progressive Casualty Insurance Co.*, United States Patent and Trademark Office before the Patent Trial and Appeal Board, Feb. 22, 2013, 4 pages.
CBM2012-00004, U.S. Pat. No. 6,064,970, Order Conduct of the Proceeding, *Liberty Mutual Insurance Co.* versus *Progressive Casualty Insurance Co.*, United States Patent and Trademark Office before the Patent Trial and Appeal Board, Feb. 26, 2013, 4 pages.
CBM2012-00004, U.S. Pat. No. 6,064,970, Order Conduct of the Proceeding, *Liberty Mutual Insurance Co.* versus *Progressive Casualty Insurance Co.*, United States Patent and Trademark Office before the Patent Trial and Appeal Board, Mar. 19, 2013, 5 pages.
CBM2012-00004, U.S. Pat. No. 6,064,970, Transcript of Deposition of Mary L. O'Neil, *Liberty Mutual Insurance Co.* versus *Progressive Casualty Insurance Co.*, United States Patent and Trademark Office before the Patent Trial and Appeal Board, Apr. 13, 2013, 191 pages.
CBM2012-00004, U.S. Pat. No. 6,064,970, Patent Owner's Response Pursuant to 37 C.F.R. § 42.220 and Exhibits, *Liberty Mutual Insurance Co.* versus *Progressive Casualty Insurance Co.*, United States Patent and Trademark Office before the Patent Trial and Appeal Board, May 1, 2013, 278 pages.
CBM2012-00004, U.S. Pat. No. 6,064,970, Patent Owner's Exhibit List, *Liberty Mutual Insurance Co.* versus *Progressive Casualty Insurance Co.*, United States Patent and Trademark Office before the Patent Trial and Appeal Board, May 1, 2013, 1 page.
CBM2012-00004, U.S. Pat. No. 6,064,970, Declaration of John V. Biernacki, *Liberty Mutual Insurance Co.* versus *Progressive Casualty Insurance Co.*, United States Patent and Trademark Office before the Patent Trial and Appeal Board, May 1, 2013, 2 pages.
CBM2012-00004, U.S. Pat. No. 6,064,970, Declaration of Michael J. Miller, *Liberty Mutual Insurance Co.* versus *Progressive Casualty Insurance Co.*, United States Patent and Trademark Office before the Patent Trial and Appeal Board, May 1, 2013, 19 pages.
CBM2012-00004, U.S. Pat. No. 6,064,970, Petitioner's First Set of Objections to Patent Owner's Exhibits, *Liberty Mutual Insurance Co.* versus *Progressive Casualty Insurance Co.*, United States Patent and Trademark Office before the Patent Trial and Appeal Board, May 8, 2013, 5 pages.
CBM2012-00004, U.S. Pat. No. 6,064,970, Patent Owner's Updated Exhibit List, *Liberty Mutual Insurance Co.* versus *Progressive Casualty Insurance Co.*, United States Patent and Trademark Office before the Patent Trial and Appeal Board, May 22, 2013, 1 page.
CBM2012-00004, U.S. Pat. No. 6,064,970, Supplemental Declaration of Michael J. Miller, *Liberty Mutual Insurance Co.* versus *Progressive Casualty Insurance Co.*, United States Patent and Trademark Office before the Patent Trial and Appeal Board, May 22, 2013, 13 pages.
CBM2012-00004, U.S. Pat. No. 6,064,970, Petitioner's Second Set of Objections to Patent Owner's Exhibits, *Liberty Mutual Insurance Co.* versus *Progressive Casualty Insurance Co.*, United States Patent and Trademark Office before the Patent Trial and Appeal Board, May 30, 2013, 4 pages.
CBM2012-00004, U.S. Pat. No. 6,064,970, Petitioner's Reply to Patent Owner's Response, *Liberty Mutual Insurance Co.* versus *Progressive Casualty Insurance Co.*, United States Patent and Trademark Office before the Patent Trial and Appeal Board, Aug. 6, 2013, 57 pages.
CBM2012-00004, U.S. Pat. No. 6,064,970, Declaration of Darrell W. Stark, *Liberty Mutual Insurance Co.* versus *Progressive Casualty Insurance Co.*, United States Patent and Trademark Office before the Patent Trial and Appeal Board, Aug. 6, 2013, 2 pages.
CBM2012-00004, U.S. Pat. No. 6,064,970, Rebuttal Declaration of Mary L. O'Neil on behalf of Petitioner, *Liberty Mutual Insurance Co.* versus *Progressive Casualty Insurance Co.*, United States Patent and Trademark Office before the Patent Trial and Appeal Board, Aug. 6, 2013, 22 pages.
CBM2012-00004, U.S. Pat. No. 6,064,970, Patent Owner's Notice of Objections to Evidence Pursuant to 37 C.F.R. § 42.64, *Liberty Mutual Insurance Co.* versus *Progressive Casualty Insurance Co.*, United States Patent and Trademark Office before the Patent Trial and Appeal Board, Aug. 13, 2013, 14 pages.
CBM2012-00004, U.S. Pat. No. 6,064,970, Petitioner's Notice of Service of Rule 42.64(b)(2)Exhibits, *Liberty Mutual Insurance Co.* versus *Progressive Casualty Insurance Co.*, United States Patent and Trademark Office before the Patent Trial and Appeal Board, Aug. 27, 2013, 10 pages.
CBM2012-00004, U.S. Pat. No. 6,064,970, Petitioner's Exhibit List, *Liberty Mutual Insurance Co.* versus *Progressive Casualty Insurance Co.*, United States Patent and Trademark Office before the Patent Trial and Appeal Board, Aug. 27, 2013, 2 pages.
CBM2012-00004, U.S. Pat. No. 6,064,970, Rule 42.6(b)(2)Declaration of Jordan M. Rossen on behalf of Petitioner regarding U.S. Pat. No. 6,064,970, *Liberty Mutual Insurance Co.* versus *Progressive Casualty Insurance Co.*, United States Patent and Trademark Office before the Patent Trial and Appeal Board, Aug. 27, 2013, 2 pages.
CBM2012-00004, U.S. Pat. No. 6,064,970, Rule 42.64(b)(2)Declaration of Mary L. O'Neil. on behalf of Petitioner regarding U.S. Pat. No. 6,064,970, *Liberty Mutual Insurance Co.* versus *Progressive Casualty Insurance Co.*, United States Patent and Trademark Office before the Patent Trial and Appeal Board, Aug. 27, 2013, 3 pages.
CBM2012-00004, U.S. Pat. No. 6,064,970, Patent Owner's Notice of Objections to Evidence Pursuant to 37 C.F.R. § 42.64, *Liberty Mutual Insurance Co.* versus *Progressive Casualty Insurance Co.*, United States Patent and Trademark Office before the Patent Trial and Appeal Board, Sep. 4, 2013, 13 pages.
CBM2012-00004, U.S. Pat. No. 6,064,970, Petitioner's Notice of Service of Rule 42.64(b)(2)Exhibits, *Liberty Mutual Insurance Co.* versus *Progressive Casualty Insurance Co.*, United States Patent and Trademark Office before the Patent Trial and Appeal Board, Sep. 18, 2013, 7 pages.
CBM2012-00004, U.S. Pat. No. 6,064,970, Petitioner's Updated Exhibit List, *Liberty Mutual Insurance Co.* versus *Progressive Casualty Insurance Co.*, United States Patent and Trademark Office before the Patent Trial and Appeal Board, Sep. 18, 2013, 2 pages.
CBM2012-00004, U.S. Pat. No. 6,064,970, Second Rule (b)(2)Declaration of Mary L. O'Neil on behalf of Petitioner regarding U.S. Pat. No. 6,064,970, *Liberty Mutual Insurance Co.* versus *Progressive Casualty Insurance Co.*, United States Patent and Trademark Office before the Patent Trial and Appeal Board, Sep. 18, 2013, 2 pages.
CBM2012-00004, U.S. Pat. No. 6,064,970, Patent Owner's Notice of Objections to Evidence Pursuant to 37 C.F.R. § 42.64, *Liberty Mutual Insurance Co.* versus *Progressive Casualty Insurance Co.*,

(56) References Cited

OTHER PUBLICATIONS

United States Patent and Trademark Office before the Patent Trial and Appeal Board, Sep. 25, 2013, 10 pages.
CBM2012-00004, U.S. Pat. No. 6,064,970, Transcript of Telephonic Petition Hearing held Aug. 29, 2013, *Liberty Mutual Insurance Co.* versus *Progressive Casualty Insurance Co.*, United States Patent and Trademark Office before the Patent Trial and Appeal Board, Sep. 30, 2013, 28 pages.
CBM2012-00004, U.S. Pat. No. 6,064,970, Order Conduct of the Proceeding, *Liberty Mutual Insurance Co.* versus *Progressive Casualty Insurance Co.*, United States Patent and Trademark Office before the Patent Trial and Appeal Board, Sep. 30, 2013, 3 pages.
CBM2012-00004, U.S. Pat. No. 6,064,970, Patent Owner's Motion to Exclude Evidence Pursuant to 37 C.F.R. § 42.64(c), *Liberty Mutual Insurance Co.* versus *Progressive Casualty Insurance Co.*, United States Patent and Trademark Office before the Patent Trial and Appeal Board, Oct. 1, 2013, 12 pages.
CBM2012-00004, U.S. Pat. No. 6,064,970, Patent Owner's Updated Exhibit List, *Liberty Mutual Insurance Co.* versus *Progressive Casualty Insurance Co.*, United States Patent and Trademark Office before the Patent Trial and Appeal Board, Oct. 1, 2013, 1 page.
CBM2012-00004, U.S. Pat. No. 6,064,970, Patent Owner's Observations on Testimony of Mary L. O'Neil, *Liberty Mutual Insurance Co.* versus *Progressive Casualty Insurance Co.*, United States Patent and Trademark Office before the Patent Trial and Appeal Board, Oct. 1, 2013, 12 pages.
CBM2012-00004, U.S. Pat. No. 6,064,970, Declaration of John V. Biernacki, *Liberty Mutual Insurance Co.* versus *Progressive Casualty Insurance Co.*, United States Patent and Trademark Office before the Patent Trial and Appeal Board, Oct. 1, 2013, 3 pages.
CBM2012-00004, U.S. Pat. No. 6,064,970, Order regarding Trial Hearing, *Liberty Mutual Insurance Co.* versus *Progressive Casualty Insurance Co.*, United States Patent and Trademark Office before the Patent Trial and Appeal Board, Oct. 7, 2013, 4 pages.
CBM2012-00004, U.S. Pat. No. 6,064,970, Petitioner's Opposition to Patent Owner's Motion to Exclude Evidence Pursuant to 37 C.F.R. § 42.64(c), *Liberty Mutual Insurance Co.* versus *Progressive Casualty Insurance Co.*, United States Patent and Trademark Office before the Patent Trial and Appeal Board, Oct. 11, 2013, 11 pages.
CBM2012-00004, U.S. Pat. No. 6,064,970, Petitioner's Response to Patent Owner's Observations on Testimony of Mary L. O'Neil, *Liberty Mutual Insurance Co.* versus *Progressive Casualty Insurance Co.*, United States Patent and Trademark Office before the Patent Trial and Appeal Board, Oct. 11, 2013, 7 pages.
CBM2012-00004, U.S. Pat. No. 6,064,970, Petitioner's Updated Exhibit List, *Liberty Mutual Insurance Co.* versus *Progressive Casualty Insurance Co.*, United States Patent and Trademark Office before the Patent Trial and Appeal Board, Oct. 11, 2013, 2 pages.
CBM2012-00004, U.S. Pat. No. 6,064,970, Declaration of Jordan M. Rossen, *Liberty Mutual Insurance Co.* versus *Progressive Casualty Insurance Co.*, United States Patent and Trademark Office before the Patent Trial and Appeal Board, Oct. 11, 2013, 2 pages.
CBM2012-00004, U.S. Pat. No. 6,064,970, Patent Owner's Updated Exhibit List, *Liberty Mutual Insurance Co.* versus *Progressive Casualty Insurance Co.*, United States Patent and Trademark Office before the Patent Trial and Appeal Board, Oct. 16, 2013, 1 page.
CBM2012-00004, U.S. Pat. No. 6,064,970, Patent Owner's Reply In Support of Its Motion to Exclude Evidence Pursuant to 37 C.F.R. § 42.64(c), *Liberty Mutual Insurance Co.* versus *Progressive Casualty Insurance Co.*, United States Patent and Trademark Office before the Patent Trial and Appeal Board, Oct. 17, 2014, 8 pages.
CBM2012-00004, U.S. Pat. No. 6,064,970, Order Conduct of the Proceeding, *Liberty Mutual Insurance Co.* versus *Progressive Casualty Insurance Co.*, United States Patent and Trademark Office before the Patent Trial and Appeal Board, Dec. 4, 2013, 4 pages.
CBM2012-00004, U.S. Pat. No. 6,064,970, Transcript of Hearing held Oct. 21, 2013, *Liberty Mutual Insurance Co.* versus *Progressive Casualty Insurance Co.*, United States Patent and Trademark Office before the Patent Trial and Appeal Board, Jan. 14, 2014, 90 pages.
CBM2012-00004, U.S. Pat. No. 6,064,970, Final Written Decision *Liberty Mutual Insurance Co.* versus *Progressive Casualty Insurance Co.*, United States Patent and Trademark Office before the Patent Trial and Appeal Board, Jan. 23, 2014, 54 pages.
CBM2012-00004, U.S. Pat. No. 6,064,970, Order—Conduct of the Proceeding, *Liberty Mutual Insurance Co.* versus *Progressive Casualty Insurance Co.*, United States Patent and Trademark Office before the Patent Trial and Appeal Board, Feb. 20, 2014, 3 pages.
CBM2012-00004, U.S. Pat. No. 6,064,970, Declaration of James L. Wamsley, *Liberty Mutual Insurance Co.* versus *Progressive Casualty Insurance Co.*, United States Patent and Trademark Office before the Patent Trial and Appeal Board, Feb. 21, 2014, 16 pages.
CBM2012-00004, U.S. Pat. No. 6,064,970, Patent Owner's Request for Rehearing Pursuant to 37 C.F.R. § 42.71 , *Liberty Mutual Insurance Co.* versus *Progressive Casualty Insurance Co.*, United States Patent and Trademark Office before the Patent Trial and Appeal Board, Feb. 21, 2014, 20 pages.
CBM2012-00004, U.S. Pat. No. 6,064,970, Patent Owner's Updated Exhibit List, *Liberty Mutual Insurance Co.* versus *Progressive Casualty Insurance Co.*, United States Patent and Trademark Office before the Patent Trial and Appeal Board, Feb. 21, 2014, 1 page.
CBM2012-00004, U.S. Pat. No. 6,064,970, Decision for Patent Owner's Request for Rehearing, *Liberty Mutual Insurance Co.* versus *Progressive Casualty Insurance Co.*, United States Patent and Trademark Office before the Patent Trial and Appeal Board, Apr. 1, 2014, 13 pages.
CBM2012-00004, U.S. Pat. No. 6,064,970, Patent Owner's Notice of Appeal, *Liberty Mutual Insurance Co.* versus *Progressive Casualty Insurance Co.*, United States Patent and Trademark Office before the Patent Trial and Appeal Board, Jun. 2, 2014, 6 pages.
CBM2013-00003, U.S. Pat. No. 8,090598, Declaration of Amanda F. Wieker, *Liberty Mutual Insurance Co.* versus *Progressive Casualty Insurance Co.*, United States Patent and Trademark Office before the Patent Trial and Appeal Board, Oct. 10, 2012, 3 pages.
CBM2013-00003, U.S. Pat. No. 8,090,598, Declaration of Georginne Blundell, *Liberty Mutual Insurance Co.* versus *Progressive Casualty Insurance Co.*, United States Patent and Trademark Office before the Patent Trial and Appeal Board, Oct. 12, 2012, 4 pages.
CBM2013-00004, U.S. Pat. No. 8,090,598, Declaration of Amanda F. Wieker, *Liberty Mutual Insurance Co.* versus *Progressive Casualty Insurance Co.*, United States Patent and Trademark Office before the Patent Trial and Appeal Board, Oct. 10, 2012, 2 pages.
CBM2013-00004, U.S. Pat. No. 8,090,598, Declaration of Georginne Blundell, *Liberty Mutual Insurance Co.* versus *Progressive Casualty Insurance Co.*, United States Patent and Trademark Office before the Patent Trial and Appeal Board, Oct. 11, 2012, 4 pages.
CBM2013-00004, U.S. Pat. No. 8,090,598, Scheduling Order, *Liberty Mutual Insurance Co.* versus *Progressive Casualty Insurance Co.*, United States Patent and Trademark Office before the Patent Trial and Appeal Board, Mar. 15, 2013, 6 pages.
CBM2013-00004, U.S. Pat. No. 8,090,598, Order Conduct of the Proceeding, *Liberty Mutual Insurance Co.* versus *Progressive Casualty Insurance Co.*, United States Patent and Trademark Office before the Patent Trial and Appeal Board, Mar. 19, 2013, 5 pages.
CBM2013-00004, U.S. Pat. No. 8,090,598, Order Conduct of the Proceeding, *Liberty Mutual Insurance Co.* versus *Progressive Casualty Insurance Co.*, United States Patent and Trademark Office before the Patent Trial and Appeal Board, Apr. 3, 2013, 4 pages.
CBM2013-00004, U.S. Pat. No. 8,090,598, Transcript of Deposition of Scott Andrews, *Liberty Mutual Insurance Co.* versus *Progressive Casualty Insurance Co.*, United States Patent and Trademark Office before the Patent Trial and Appeal Board, Apr. 12, 2013, 185 pages.
CBM2013-00004, U.S. Pat. No. 8,090,598, Declaration of Ivan Zatkovich, *Liberty Mutual Insurance Co.* versus *Progressive Casualty Insurance Co.*, United States Patent and Trademark Office before the Patent Trial and Appeal Board, Jun. 5, 2013, 45 pages.
CBM2013-00004, U.S. Pat. No. 8,090,598, Declaration of Michael J. Miller, *Liberty Mutual Insurance Co.* versus *Progressive Casualty Insurance Co.*, United States Patent and Trademark Office before the Patent Trial and Appeal Board, Jun. 5, 2013, 17 pages.
CBM2013-00004, U.S. Pat. No. 8,090,598, Patent Owner's Response Pursuant to 37 C.F.R. § 42.220, *Liberty Mutual Insurance Co.*

(56) References Cited

OTHER PUBLICATIONS versus *Progressive Casualty Insurance Co.*, United States Patent and Trademark Office before the Patent Trial and Appeal Board, Jun. 5, 2013, 87 pages.
CBM2013-00004, U.S. Pat. No. 8,090,598, Petitioner's First Set of Objections to Patent Owner's Exhibits, *Liberty Mutual Insurance Co.* versus *Progressive Casualty Insurance Co.*, United States Patent and Trademark Office before the Patent Trial and Appeal Board, Jun. 12, 2013, 10 pages.
CBM2013-00004, U.S. Pat. No. 8,090,598, Supplemental Declaration of Michael J. Miller, *Liberty Mutual Insurance Co.* versus *Progressive Casualty Insurance Co.*, United States Patent and Trademark Office before the Patent Trial and Appeal Board, Jun. 25, 2013, 2 pages.
CBM2013-00004, U.S. Pat. No. 8,090,598, Petitioner's Second Set of Objections to Patent Owner's Exhibits, *Liberty Mutual Insurance Co.* versus *Progressive Casualty Insurance Co.*, United States Patent and Trademark Office before the Patent Trial and Appeal Board, Jul. 3, 2013, 4 pages.
CBM2013-00004, U.S. Pat. No. 8,090,598, Declaration of Jordan M. Rossen, *Liberty Mutual Insurance Co.* versus *Progressive Casualty Insurance Co.*, United States Patent and Trademark Office before the Patent Trial and Appeal Board, Aug. 27, 2013, 3 pages.
CBM2013-00004, U.S. Pat. No. 8,090,598, Order Conduct of the Proceeding, *Liberty Mutual Insurance Co.* versus *Progressive Casualty Insurance Co.*, United States Patent and Trademark Office before the Patent Trial and Appeal Board, Sep. 3, 2013, 5 pages.
CBM2013-00004, U.S. Pat. No. 8,090,598, Patent Owner's Notice of Objections to Evidence Pursuant to 37 C.F.R. § 42.64, *Liberty Mutual Insurance Co.* versus *Progressive Casualty Insurance Co.*, United States Patent and Trademark Office before the Patent Trial and Appeal Board, Sep. 4, 2013, 26 pages.
CBM2013-00004, U.S. Pat. No. 8,090,598, Petitioner's Notice of Service of Rule 42.64(b)(2)Exhibits, *Liberty Mutual Insurance Co.* versus *Progressive Casualty Insurance Co.*, United States Patent and Trademark Office before the Patent Trial and Appeal Board, Sep. 18, 2013, 3 pages.
CBM2013-00004, U.S. Pat. No. 8,090,598, Patent Owner's Notice of Objections to Evidence Pursuant to 37 C.F.R. § 42.64, *Liberty Mutual Insurance Co.* versus *Progressive Casualty Insurance Co.*, United States Patent and Trademark Office before the Patent Trial and Appeal Board, Sep. 25, 2013, 21 pages.
CBM2013-00004, U.S. Pat. No. 8,090,598, Transcript for Telephonic Petition Hearing held Aug. 29, 2013, *Liberty Mutual Insurance Co.* versus *Progressive Casualty Insurance Co.*, United States Patent and Trademark Office before the Patent Trial and Appeal Board, Sep. 30, 2013, 28 pages.
CBM2013-00004, U.S. Pat. No. 8,090,598, Order Conduct of the Proceeding, *Liberty Mutual Insurance Co.* versus *Progressive Casualty Insurance Co.*, United States Patent and Trademark Office before the Patent Trial and Appeal Board, Sep. 30, 2013, 3 pages.
CBM2013-00004, U.S. Pat. No. 8,090,598, Petitioner's Motion to Exclude Under 37 C.F.R. §§ 42.62 and 42.64, *Liberty Mutual Insurance Co.* versus *Progressive Casualty Insurance Co.*, United States Patent and Trademark Office before the Patent Trial and Appeal Board, Oct. 3, 2013, 10 pages.
CBM2013-00004, U.S. Pat. No. 8,090598, Petitioner's Request for Oral Hearing, *Liberty Mutual Insurance Co.* versus *Progressive Casualty Insurance Co.*, United States Patent and Trademark Office before the Patent Trial and Appeal Board, Oct. 3, 2013, 3 pages.
CBM2013-00004, U.S. Pat. No. 8,090,598, Patent Owner's Motion to Exclude Evidence Pursuant to 37 C.F.R. § 42.64(c), *Liberty Mutual Insurance Co.* versus *Progressive Casualty Insurance Co.*, United States Patent and Trademark Office before the Patent Trial and Appeal Board, Oct. 3, 2013, 13 pages.
CBM2013-00004, U.S. Pat. No. 8,090,598, Patent Owner's Observations on Testimony of Mary L. O'Neil, *Liberty Mutual Insurance Co.* versus *Progressive Casualty Insurance Co.*, United States Patent and Trademark Office before the Patent Trial and Appeal Board, Oct. 3, 2013, 10 pages.

CBM2013-00004, U.S. Pat. No. 8,090,598, Patent Owner's Request for Oral Hearing Pursuant to 37 C.F.R. § 42.70, *Liberty Mutual Insurance Co.* versus *Progressive Casualty Insurance Co.*, United States Patent and Trademark Office before the Patent Trial and Appeal Board, Oct. 3, 2013, 3 pages.
CBM2013-00004, U.S. Pat. No. 8,090,598, Declaration of John V. Biernacki, *Liberty Mutual Insurance Co.* versus *Progressive Casualty Insurance Co.*, United States Patent and Trademark Office before the Patent Trial and Appeal Board, Oct. 3, 2013, 3 pages.
CBM2013-00004, U.S. Pat. No. 8,090,598, Petitioner's Opposition to Patent Owner's Motion to Exclude Evidence Pursuant to 37 C.F.R. § 42.64(c), *Liberty Mutual Insurance Co.* versus *Progressive Casualty Insurance Co.*, United States Patent and Trademark Office before the Patent Trial and Appeal Board, Oct. 18, 2013, 16 pages.
CBM2013-00004, U.S. Pat. No. 8,090,598, Petitioner's Response to Patent Owner's Observations on Testimony of Mary L. O'Neil, *Liberty Mutual Insurance Co.* versus *Progressive Casualty Insurance Co.*, United States Patent and Trademark Office before the Patent Trial and Appeal Board, Oct. 18, 2013, 6 pages.
CBM2013-00004, U.S. Pat. No. 8,090,598, Patent Owner's Opposition to Petitioner's Motion to Exclude Evidence, *Liberty Mutual Insurance Co.* versus *Progressive Casualty Insurance Co.*, United States Patent and Trademark Office before the Patent Trial and Appeal Board, Oct. 18, 2013, 13 pages.
CBM2013-00004, U.S. Pat. No. 8,090,598, Declaration of John V. Biernacki, *Liberty Mutual Insurance Co.* versus *Progressive Casualty Insurance Co.*, United States Patent and Trademark Office before the Patent Trial and Appeal Board, Oct. 18, 2013, 3 pages.
CBM2013-00004, U.S. Pat. No. 8,090,598, Declaration of Jordan M. Rossen, *Liberty Mutual Insurance Co.* versus *Progressive Casualty Insurance Co.*, United States Patent and Trademark Office before the Patent Trial and Appeal Board, Oct. 18, 2013, 2 pages.
CBM2013-00004, U.S. Pat. No. 8,090,598, Petitioner's Reply to Patent Owner's Opposition to Petitioner's Motion to Exclude, *Liberty Mutual Insurance Co.* versus *Progressive Casualty Insurance Co.*, United States Patent and Trademark Office before the Patent Trial and Appeal Board, Oct. 24, 2013, 8 pages.
CBM2013-00004, U.S. Pat. No. 8,090,598, Patent Owner's Reply In Support of Its Motion to Exclude Evidence Pursuant to 37 C.F.R. § 42.64(c), *Liberty Mutual Insurance Co.* versus *Progressive Casualty Insurance Co.*, United States Patent and Trademark Office before the Patent Trial and Appeal Board, Oct. 24, 2013, 8 pages.
CBM2013-00004, U.S. Pat. No. 8,090,598, Order regarding Trial Hearing, *Liberty Mutual Insurance Co.* versus *Progressive Casualty Insurance Co.*, United States Patent and Trademark Office before the Patent Trial and Appeal Board, Nov. 4, 2013, 4 pages.
CBM2013-00004, U.S. Pat. No. 8,090,598, Patent Owner's Oral Argument Demonstrative Exhibits, *Liberty Mutual Insurance Co.* versus *Progressive Casualty Insurance Co.*, United States Patent and Trademark Office before the Patent Trial and Appeal Board, Nov. 13, 2013, 90 pages.
CBM2013-00004, U.S. Pat. No. 8,090,598, Transcript of Hearing held Nov. 21, 2013, *Liberty Mutual Insurance Co.* versus *Progressive Casualty Insurance Co.*, United States Patent and Trademark Office before the Patent Trial and Appeal Board, Feb. 20, 2014, 77 pages.
CBM2013-00004, U.S. Pat. No. 8,090,598, Final Written Decision, *Liberty Mutual Insurance Co.* versus *Progressive Casualty Insurance Co.*, United States Patent and Trademark Office before the Patent Trial and Appeal Board, Mar. 13, 2014, 69 pages.
CBM2013-00004, U.S. Pat. No. 8,090,598, Patent Owner's Notice of Appeal, *Liberty Mutual Insurance Co.* versus *Progressive Casualty Insurance Co.*, United States Patent and Trademark Office before the Patent Trial and Appeal Board, May 14, 2014, 5 pages.
CBM2013-00009, U.S. Pat. No. 8,140,358, Declaration of Amanda Wieker, *Liberty Mutual Insurance Co.* versus *Progressive Casualty Insurance Co.*, United States Patent and Trademark Office before the Patent Trial and Appeal Board, Nov. 19, 2012, 3 pages.
CBM2013-00009, U.S. Pat. No. 8,140,358, Declaration of Georginne Blundell, *Liberty Mutual Insurance Co.* versus *Progressive Casualty Insurance Co.*, United States Patent and Trademark Office before the Patent Trial and Appeal Board, Nov. 19, 2012, 5 pages.

(56) References Cited

OTHER PUBLICATIONS

CBM2013-00009, U.S. Pat. No. 8,140,358, Order Conduct of the Proceeding, *Liberty Mutual Insurance Co.* versus *Progressive Casualty Insurance Co.*, United States Patent and Trademark Office before the Patent Trial and Appeal Board, Apr. 12, 2013, 7 pages.
CBM2013-00009, U.S. Pat. No. 8,140,358, First Revised Scheduling Order, *Liberty Mutual Insurance Co.* versus *Progressive Casualty Insurance Co.*, United States Patent and Trademark Office before the Patent Trial and Appeal Board, Apr. 12, 2013, 6 pages.
CBM2013-00009, U.S. Pat. No. 8,140,358, Order Synchronizing Trial Schedules, *Liberty Mutual Insurance Co.* versus *Progressive Casualty Insurance Co.*, United States Patent and Trademark Office before the Patent Trial and Appeal Board, Apr. 19, 2013, 3 pages.
CBM2013-00009, U.S. Pat. No. 8,140,358, Second Revised Scheduling Order, *Liberty Mutual Insurance Co.* versus *Progressive Casualty Insurance Co.*, United States Patent and Trademark Office before the Patent Trial and Appeal Board, Apr. 19, 2013, 5 pages.
CBM2013-00009, U.S. Pat. No. 8,140,358, Declaration of Dr. Mark Ehsani, *Liberty Mutual Insurance Co.* versus *Progressive Casualty Insurance Co.*, United States Patent and Trademark Office before the Patent Trial and Appeal Board, Jun. 11, 2013, 39 pages.
CBM2013-00009, U.S. Pat. No. 8,140,358, Patent Owner's Response Pursuant to 37 C.F.R. § 42.220, *Liberty Mutual Insurance Co.* versus *Progressive Casualty Insurance Co.*, United States Patent and Trademark Office before the Patent Trial and Appeal Board, Jun. 13, 2013, 52 pages.
CBM2013-00009, U.S. Pat. No. 8,140,358, Declaration of Ivan Zatkovich, *Liberty Mutual Insurance Co.* versus *Progressive Casualty Insurance Co.*, United States Patent and Trademark Office before the Patent Trial and Appeal Board, Jun. 13, 2013, 19 pages.
CBM2013-00009, U.S. Pat. No. 8,140,358, Declaration of Michael J. Miller, *Liberty Mutual Insurance Co.* versus *Progressive Casualty Insurance Co.*, United States Patent and Trademark Office before the Patent Trial and Appeal Board, Jun. 13, 2013, 19 pages.
CBM2013-00009, U.S. Pat. No. 8,140,358, Petitioner's First Set of Objections to Patent Owner's Exhibits, *Liberty Mutual Insurance Co.* versus *Progressive Casualty Insurance Co.*, United States Patent and Trademark Office before the Patent Trial and Appeal Board, Jun. 20, 2013, 7 pages.
CBM2013-00009, U.S. Pat. No. 8,140,358, Supplemental Declaration of Michael J. Miller, *Liberty Mutual Insurance Co.* versus *Progressive Casualty Insurance Co.*, United States Patent and Trademark Office before the Patent Trial and Appeal Board, Jun. 25, 2013, 2 pages.
CBM2013-00009, U.S. Pat. No. 8,140,358, Petitioner's Second Set of Objections to Patent Owner's Exhibits, *Liberty Mutual Insurance Co.* versus *Progressive Casualty Insurance Co.*, United States Patent and Trademark Office before the Patent Trial and Appeal Board, Jul. 3, 2013, 4 pages.
CBM2013-00009, U.S. Pat. No. 8,140,358, Petitioner's Reply to Patent Owner's Response, *Liberty Mutual Insurance Co.* versus *Progressive Casualty Insurance Co.*, United States Patent and Trademark Office before the Patent Trial and Appeal Board, Aug. 16, 2013, 23 pages.
CBM2013-00009, U.S. Pat. No. 8,140,358, Patent Owner's Notice of Objections to Evidence Pursuant to 37 C.F.R. § 42.64, *Liberty Mutual Insurance Co.* versus *Progressive Casualty Insurance Co.*, United States Patent and Trademark Office before the Patent Trial and Appeal Board, Aug. 23, 2013, 21 pages.
CBM2013-00009, U.S. Pat. No. 8,140,358, Order Conduct of the Proceeding, *Liberty Mutual Insurance Co.* versus *Progressive Casualty Insurance Co.*, United States Patent and Trademark Office before the Patent Trial and Appeal Board, Sep. 6, 2013, 3 pages.
CBM2013-00009, U.S. Pat. No. 8,140,358, Petitioner's Notice of Service of Rule 42.64(b)(2)Exhibits, *Liberty Mutual Insurance Co.* versus *Progressive Casualty Insurance Co.*, United States Patent and Trademark Office before the Patent Trial and Appeal Board, Sep. 9, 2013, 3 pages.
CBM2013-00009, U.S. Pat. No. 8,140,358, Transcript of Telephonic Petition Hearing held Aug. 29, 2013, *Liberty Mutual Insurance Co.* versus *Progressive Casualty Insurance Co.*, United States Patent and Trademark Office before the Patent Trial and Appeal Board, Sep. 30, 2013, 28 pages.
CBM2013-00009, U.S. Pat. No. 8,140,358, Order Conduct of the Proceeding, *Liberty Mutual Insurance Co.* versus *Progressive Casualty Insurance Co.*, United States Patent and Trademark Office before the Patent Trial and Appeal Board, Sep. 30, 2013, 3 pages.
CBM2013-00009, U.S. Pat. No. 8,140,358, Petitioner's Notice of Service of Rule 42.64(b)(2)Exhibits, *Liberty Mutual Insurance Co.* versus *Progressive Casualty Insurance Co.*, United States Patent and Trademark Office before the Patent Trial and Appeal Board, Sep. 30, 2013, 3 pages.
CBM2013-00009, U.S. Pat. No. 8,140,358, Petitioner's Motion to Exclude Under 37 C.F.R. §§ 42.62 and 42.64, *Liberty Mutual Insurance Co.* versus *Progressive Casualty Insurance Co.*, United States Patent and Trademark Office before the Patent Trial and Appeal Board, Sep. 30, 2013, 13 pages.
CBM2013-00009, U.S. Pat. No. 8,140,358, Petitioner's Request for Oral Hearing, *Liberty Mutual Insurance Co.* versus *Progressive Casualty Insurance Co.*, United States Patent and Trademark Office before the Patent Trial and Appeal Board, Sep. 30, 2013, 3 pages.
CBM2013-00009, U.S. Pat. No. 8,140,358, Patent Owner's Motion to Exclude Evidence Pursuant to 37 C.F.R. § 42.64(c), *Liberty Mutual Insurance Co.* versus *Progressive Casualty Insurance Co.*, United States Patent and Trademark Office before the Patent Trial and Appeal Board, Sep. 30, 2013, 18 pages.
CBM2013-00009, U.S. Pat. No. 8,140,358, Patent Owner's Observations on Testimony of Mary L. O'Neil, *Liberty Mutual Insurance Co.* versus *Progressive Casualty Insurance Co.*, United States Patent and Trademark Office before the Patent Trial and Appeal Board, Sep. 30, 2013, 11 pages.
CBM2013-00009, U.S. Pat. No. 8,140,358, Patent Owner's Request for Oral Hearing Pursuant to 37 C.F.R. § 42.70, *Liberty Mutual Insurance Co.* versus *Progressive Casualty Insurance Co.*, United States Patent and Trademark Office before the Patent Trial and Appeal Board, Sep. 30, 2013, 3 pages.
CBM2013-00009, U.S. Pat. No. 8,140,358, Declaration of John V. Biernacki, *Liberty Mutual Insurance Co.* versus *Progressive Casualty Insurance Co.*, United States Patent and Trademark Office before the Patent Trial and Appeal Board, Sep. 30, 2013, 2 pages. (EX2030).
CBM2013-00009, U.S. Pat. No. 8,140,358, Second Rule 42.64(b)(2)Declaration of Mary Lou O'Neil on behalf of Petitioner regarding U.S. Pat. No. 8,140,358, *Liberty Mutual Insurance Co.* versus *Progressive Casualty Insurance Co.*, United States Patent and Trademark Office before the Patent Trial and Appeal Board, Sep. 30, 2013, 2 pages.
CBM2013-00009, U.S. Pat. No. 8,140,358, Order regarding Trial Hearing, *Liberty Mutual Insurance Co.* versus *Progressive Casualty Insurance Co.*, United States Patent and Trademark Office before the Patent Trial and Appeal Board, Oct. 2, 2013, 4 pages.
CBM2013-00009, U.S. Pat. No. 8,140,358, Patent Owner's Opposition to Petitioner's Motion to Exclude Evidence, *Liberty Mutual Insurance Co.* versus *Progressive Casualty Insurance Co.*, United States Patent and Trademark Office before the Patent Trial and Appeal Board, Oct. 4, 2013, 16 pages.
CBM2013-00009, U.S. Pat. No. 8,140,358, Petitioner's Response to Patent Owner's Observations on Testimony of Mary L. O'Neil, *Liberty Mutual Insurance Co.* versus *Progressive Casualty Insurance Co.*, United States Patent and Trademark Office before the Patent Trial and Appeal Board, Oct. 4, 2013, 8 pages.
CBM2013-00009, U.S. Pat. No. 8,140,358, Declaration of Jordan M. Rossen, *Liberty Mutual Insurance Co.* versus *Progressive Casualty Insurance Co.*, United States Patent and Trademark Office before the Patent Trial and Appeal Board, Oct. 4, 2013, 2 pages. (EX 1049).
CBM2013-00009, U.S. Pat. No. 8,140,358, Declaration of John V. Biernacki, *Liberty Mutual Insurance Co.* versus *Progressive Casualty Insurance Co.*, United States Patent and Trademark Office before the Patent Trial and Appeal Board, Oct. 4, 2013, 3 pages.
CBM2013-00009, U.S. Pat. No. 8,140,358, Petitioner's Opposition to Patent Owner's Motion to Exclude Evidence Pursuant to 37 C.F.R. § 42.64(c), *Liberty Mutual Insurance Co.* versus *Progressive*

(56) References Cited

OTHER PUBLICATIONS

*Casualty Insurance Co.*, United States Patent and Trademark Office before the Patent Trial and Appeal Board, Oct. 4, 2013, 18 pages.
CBM2013-00009, U.S. Pat. No. 8,140,358, Petitioner's Reply to Patent Owner's Opposition to Petitioner's Motion to Exclude, *Liberty Mutual Insurance Co.* versus *Progressive Casualty Insurance Co.*, United States Patent and Trademark Office before the Patent Trial and Appeal Board, Oct. 8, 2013, 8 pages.
CBM2013-00009, U.S. Pat. No. 8,140,358, Petitioner's Notice of Third Set of Objections to Patent Owner's Exhibits, *Liberty Mutual Insurance Co.* versus *Progressive Casualty Insurance Co.*, United States Patent and Trademark Office before the Patent Trial and Appeal Board, Oct. 8, 2013, 6 pages.
CBM2013-00009, U.S. Pat. No. 8,140,358, Patent Owner's Reply In Support of Its Motion to Exclude Evidence Pursuant to 37 C.F.R. § 42.64(c), *Liberty Mutual Insurance Co.* versus *Progressive Casualty Insurance Co.*, United States Patent and Trademark Office before the Patent Trial and Appeal Board, Oct. 8, 2013, 8 pages.
CBM2013-00009, U.S. Pat. No. 8,140,358, Petitioner's Notice of Service of Oral Hearing Demonstrative Slides, *Liberty Mutual Insurance Co.* versus *Progressive Casualty Insurance Co.*, United States Patent and Trademark Office before the Patent Trial and Appeal Board, Oct. 9, 2013, 3 pages.
CBM2013-00009, U.S. Pat. No. 8,140,358, Joint Notice of Statutes and Regulations, *Liberty Mutual Insurance Co.* versus *Progressive Casualty Insurance Co.*, United States Patent and Trademark Office before the Patent Trial and Appeal Board, Nov. 8, 2013, 4 pages.
CBM2013-00009, U.S. Pat. No. 8,140,358, Order Conduct of the Proceeding, *Liberty Mutual Insurance Co.* versus *Progressive Casualty Insurance Co.*, United States Patent and Trademark Office before the Patent Trial and Appeal Board, Dec. 4, 2013, 4 pages.
CBM2013-00009, U.S. Pat. No. 8,140,358, Transcript of Hearing held Oct. 15, 2013, *Liberty Mutual Insurance Co.* versus *Progressive Casualty Insurance Co.*, United States Patent and Trademark Office before the Patent Trial and Appeal Board, Jan. 14, 2014, 127 pages.
CBM2013-00009, U.S. Pat. No. 8,140,358, Final Written Decision, *Liberty Mutual Insurance Co.* versus *Progressive Casualty Insurance Co.*, United States Patent and Trademark Office before the Patent Trial and Appeal Board, Feb. 11, 2014, 51 pages.
CBM2013-00009, U.S. Pat. No. 8,140,358, Order Conduct of the Proceeding, *Liberty Mutual Insurance Co.* versus *Progressive Casualty Insurance Co.*, United States Patent and Trademark Office before the Patent and Appeal Board, Feb. 20, 2014, 3 pages.
CBM2013-00009, U.S. Pat. No. 8,140,358, Patent Owner's Request for Rehearing Pursuant to 37 C.F.R. § 42.71, *Liberty Mutual Insurance Co.* versus *Progressive Casualty Insurance Co.*, United States Patent and Trademark Office before the Patent Trial and Appeal Board, Mar. 12, 2014, 20 pages.
CBM2013-00009, U.S. Pat. No. 8,140,358, Declaration of James L. Wamsley, *Liberty Mutual Insurance Co.* versus *Progressive Casualty Insurance Co.*, United States Patent and Trademark Office before the Patent Trial and Appeal Board, Mar. 12, 2014, 20 pages.
CBM2013-00009, U.S. Pat. No. 8,140,358, Petitioner's Request for Rehearing Seeking Conditional Relief Pursuant to 37 C.F.R. § 42.71, *Liberty Mutual Insurance Co.* versus *Progressive Casualty Insurance Co.*, United States Patent and Trademark Office before the Patent Trial and Appeal Board, Mar. 13, 2014, 7 pages.
CBM2013-00009, U.S. Pat. No. 8,140,358, Transcript of Telephonic Hearing held Mar. 25, 2014, *Liberty Mutual Insurance Co.* versus *Progressive Casualty Insurance Co.*, United States Patent and Trademark Office before the Patent Trial and Appeal Board, Mar. 25, 2014, 16 pages.
CBM2013-00009, U.S. Pat. No. 8,140,358, Order Conduct of the Proceeding, *Liberty Mutual Insurance Co.* versus *Progressive Casualty Insurance Co.*, United States Patent and Trademark Office before the Patent Trial and Appeal Board, Mar. 26, 2014, 3 pages.
CBM2013-00009, U.S. Pat. No. 8,140,358, Petitioner's Opposition to Patent Owner's Request for Rehearing Pursuant to 37 § 42.71, *Liberty Mutual Insurance Co.* versus *Progressive Casualty Insurance Co.*, United States Patent and Trademark Office before the Patent Trial and Appeal Board, Mar. 28, 2014, 6 pages.
CBM2013-00009, U.S. Pat. No. 8,140,358, Patent Owner's Opposition to Petitioner's Improperly Filed Paper No. 73, *Liberty Mutual Insurance Co.* versus *Progressive Casualty Insurance Co.*, United States Patent and Trademark Office before the Patent Trial and Appeal Board, Mar. 28, 2014, 6 pages.
CBM2013-00009, U.S. Pat. No. 8,140,358, Decision Patent Owner's Request for Rehearing, *Liberty Mutual Insurance Co.* versus *Progressive Casualty Insurance Co.*, United States Patent and Trademark Office before the Patent Trial and Appeal Board, Apr. 1, 2014, 14 pages.
CBM2013-00009, U.S. Pat. No. 8,140,358, Decision Petitioner's Request for Rehearing, *Liberty Mutual Insurance Co.* versus *Progressive Casualty Insurance Co.*, United States Patent and Trademark Office before the Patent Trial and Appeal Board, Apr. 1, 2014, 5 pages.
CBM2013-00009, U.S. Pat. No. 8,140,358, Patent Owner's Notice of Appeal, *Liberty Mutual Insurance Co.* versus *Progressive Casualty Insurance Co.*, United States Patent and Trademark Office before the Patent Trial and Appeal Board, Jun. 2, 2014, 6 pages.
Appeal No. 14-1639 of CBM2013-00009, U.S. Pat. No. 8,140,358, Appelle's Motion to Treat Appeals as Companion Cases and to Realign Briefing Schedule, *Progressive Casualty Insurance Co.* versus *Liberty Mutual Insurance Co.*, United States Court of Appeals for the Federal Circuit, Jul. 23, 2014, 17 pages.
Appeal No. 14-1639 of CBM2013-00009, U.S. Pat. No. 8,140,358, Appellant's Partial Opposition to Appellee's Motion to Treat Appeals as Companion Cases and to Realign Briefing Schedule, *Progressive Casualty Insurance Co.* versus *Liberty Mutual Insurance Co.*, United States Court of Appeals for the Federal Circuit, Jul. 31, 2014, 133 pages.
Appeal No. 14-1639 of CBM2013-00009, U.S. Pat. No. 8,140,358, Appellee's Reply In Support of Motion to Treat Appeals as Companion Cases and to Realign Briefing Schedule, *Progressive Casualty Insurance Co.* versus *Liberty Mutual Insurance Co.*, United States Court of Appeals for the Federal Circuit, Aug. 1, 2014, 8 pages.
CBM2012-00002 and CBM2012-00004, U.S. Pat. No. 6,064,970, Patent Owner's Oral Hearing Demonstrative Slides, *Liberty Mutual Insurance Co.* versus *Progressive Casualty Insurance Co.*, United States Patent and Trademark Office before the Patent Trial and Appeal Board, Oct. 21, 2013, 73 pages.
CBM2012-00003 and CBM2013-00009, U.S. Pat. No. 8,140,358, Petitioner's Oral Hearing Demonstrative Slides, *Liberty Mutual Insurance Co.* versus *Progressive Casualty Insurance Co.*, United States Patent and Trademark Office before the Patent Trial and Appeal Board, Oct. 15, 2013, 20 pages.
CBM2012-00003 and CBM2013-00009, U.S. Pat. No. 8,140,358, Petitioner's Oral Hearing Demonstrative Slides, *Liberty Mutual Insurance Co.* versus *Progressive Casualty Insurance Co.*, United States Patent and Trademark Office before the Patent Trial and Appeal Board, Oct. 15, 2013, 10 pages.
CBM2012-00003 and CBM2013-00009, U.S. Pat. No. 8,140,358, Patent Owner's Oral Argument Demonstrative Exhibits, *Liberty Mutual Insurance Co.* versus *Progressive Casualty Insurance Co.*, United States Patent and Trademark Office before the Patent Trial and Appeal Board, Oct. 15, 2013, 99 pages.
CBM2012-00002, CBM 2012-00004, U.S. Pat. No. 6,064,970; Cases CBM2012-00003, CBM2013-00009, U.S. Pat. No. 8,140,358, Transcript of Feb. 19, 2014 Teleconference, *Liberty Mutual Insurance Co.* versus *Progressive Casualty Insurance Co.*, United States Patent and Trademark Office before the Patent Trial and Appeal Board, Feb. 19, 2014, 14 pages.
Excerpts from Transcript of Deposition of Mary L. O'Neil for pp. 6-13, 18-21, 26-37, 42-49, 66-85, and 182-189, Cases CBM2012-00002, CBM2012-00004, U.S. Pat. No. 6,064,970; Case CBM2013-00004, U.S. Pat. No. 8,090,598; Cases CBM2012-00003, CBM2013-00009, U.S. Pat. No. 8,140,358, *Liberty Mutual Insurance Co.* versus *Progressive Casualty Insurance Co.*, United States Patent and Trademark Office before the Patent Trial and Appeal Board, Sep. 13, 2013, 16 pages.

(56) References Cited

OTHER PUBLICATIONS

Excerpts from Transcript of Deposition of Mary L. O'Neil for pp. 6-13, 18-21, 26-37, 42-49,98-101, and 182-189, Cases CBM2012-00002, CBM2012-00004, U.S. Pat. No. 6,064,970; Case CBM2013-00004, U.S. Pat. No. 8,090,598; Cases CBM2012-00003, CBM2013-00009, U.S. Pat. No. 8,140,358, *Liberty Mutual Insurance Co.* versus *Progressive Casualty Insurance Co.*, United States Patent and Trademark Office before the Patent Trial and Appeal Board, Sep. 13, 2013, 12 pages.

Excerpts from Transcript of Deposition of Mary L. O'Neil for pp. 6-13, 18-21, 30-37, 50-53, 66-77, 82-85, 98-101, 118-121, 130-133, and 182-189, Cases CBM2012-00002, CBM2012-00004, U.S. Pat. No. 6,064,970; Case CBM2013-00004, U.S. Pat. No. 8,090,598; Cases CBM2012-00003, CBM2013-00009, U.S. Pat. No. 8,140,358, *Liberty Mutual Insurance Co.* versus *Progressive Casualty Insurance Co.*, United States Patent and Trademark Office before the Patent Trial and Appeal Board, Sep. 13, 2013, 16 pages.

Excerpts from Transcript of Deposition of Mary L. O'Neil for pp. 6-9, 14-21, 30-33, and 98-113, Cases CBM2012-00002, CBM2012-00004, U.S. Pat. No. 6,064,970; Case CBM2013-00004, U.S. Pat. No. 8,090,598; Cases CBM2012-00003, CBM2013-00009, U.S. Pat. No. 8,140,358, *Liberty Mutual Insurance Co.* versus *Progressive Casualty Insurance Co.*, United States Patent and Trademark Office before the Patent Trial and Appeal Board, Sep. 13, 2013, 9 pages.

Excerpts from Transcript of Deposition of Mary L. O'Neil for pp. 6-9, 14-21, 30-45, 50-53, 66-69, 78-85, and 90-93, Cases CBM2012-00002, CBM2012-00004, U.S. Pat. No. 6,064,970; Case CBM2013-00004, U.S. Pat. No. 8,090,598; Cases CBM2012-00003, CBM2013-00009, U.S. Pat. No. 8,140,358, *Liberty Mutual Insurance Co.* versus *Progressive Casualty Insurance Co.*, United States Patent and Trademark Office before the Patent Trial and Appeal Board, Sep. 13, 2013, 13 pages.

Excerpts from Transcript of Deposition of Mary L. O'Neil for pp. 6-9, 14-21, 30-45, and 102-105, Cases CBM2012-00002, CBM2012-00004, U.S. Pat. No. 6,064,970; Case CBM2013-00004, U.S. Pat. No. 8,090,598; Cases CBM2012-00003, CBM2013-00009, U.S. Pat. No. 8,140,358, *Liberty Mutual Insurance Co.* versus *Progressive Casualty Insurance Co.*, United States Patent and Trademark Office before the Patent Trial and Appeal Board, Sep. 13, 2013, 9 pages.

Excerpts from Transcript of Deposition of Mary L. O'Neil for pp. 6-9, 42-45, 94-113, Cases CBM2012-00002, CBM2012-00004, U.S. Pat. No. 6,064,970; Case CBM2013-00004, U.S. Pat. No. 8,090,598; Cases CBM2012-00003, CBM2013-00009, U.S. Pat. No. 8,140,358, *Liberty Mutual Insurance Co.* versus *Progressive Casualty Insurance Co.*, United States Patent and Trademark Office before the Patent Trial and Appeal Board, Sep. 13, 2013, 8 pages.

Excerpts from Transcript of Deposition of Mary L. O'Neil for pp. 98-101, 118-121, and 130-133, Cases CBM2012-00002, CBM2012-00004, U.S. Pat. No. 6,064,970; Case CBM2013-00004, U.S. Pat. No. 8,090,598; Cases CBM2012-00003, CBM2013-00009, U.S. Pat. No. 8,140,358, *Liberty Mutual Insurance Co.* versus *Progressive Casualty Insurance Co.*, United States Patent and Trademark Office before the Patent Trial and Appeal Board, Sep. 13, 2013, 4 pages.

Excerpts from Transcript of Deposition of Mary L. O'Neil, Cases CBM2012-00002, CBM2012-00004, U.S. Pat. No. 6,064,970; Case CBM2013-00004, U.S. Pat. No. 8,090,598; Cases CBM2012-00003, CBM2013-00009, U.S. Pat. No. 8,140,358, *Liberty Mutual Insurance Co.* versus *Progressive Casualty Insurance Co.*, United States Patent and Trademark Office before the Patent Trial and Appeal Board, Sep. 13, 2013, 16 pages.

Excerpts from Transcript of Deposition of Scott Andrews for pp. 195-198, and 219-226, Cases CBM2012-00002, CBM2012-00004, U.S. Pat. No. 6,064,970; Case CBM2013-00004, U.S. Pat. No. 8,090,598; Cases CBM2012-00003, CBM2013-00009, U.S. Pat. No. 8,140,358, *Liberty Mutual Insurance Co.* versus *Progressive Casualty Insurance Co.*, United States Patent and Trademark Office before the Patent Trial and Appeal Board, Sep. 24, 2013, 4 pages.

Excerpts from Transcript of Deposition of Scott Andrews for pp. 203-206, and 239-242, Cases CBM2012-00002, CBM2012-00004, U.S. Pat. No. 6,064,970; Case CBM2013-00004, U.S. Pat. No. 8,090,598; Cases CBM2012-00003, CBM2013-00009, U.S. Pat. No. 8,140,358, *Liberty Mutual Insurance Co.* versus *Progressive Casualty Insurance Co.*, United States Patent and Trademark Office before the Patent Trial and Appeal Board, Sep. 24, 2013, 3 pages.

Excerpts from Transcript of Deposition of Scott Andrews for pp. 283-286, and 295-302, Cases CBM2012-00002, CBM2012-00004, U.S. Pat. No. 6,064,970; Case CBM2013-00004, U.S. Pat. No. 8,090,598; Cases CBM2012-00003, CBM2013-00009, U.S. Pat. No. 8,140,358, *Liberty Mutual Insurance Co.* versus *Progressive Casualty Insurance Co.*, United States Patent and Trademark Office before the Patent Trial and Appeal Board, Sep. 24, 2013, 4 pages.

Excerpts from Transcript of Deposition of Scott Andrews for pp. 283-286, Cases CBM2012-00002, CBM2012-00004, U.S. Pat. No. 6,064,970; Case CBM 2013-00004, U.S. Pat. No. 8,090,598; Cases CBM2012-00003, CBM2013-00009, U.S. Pat. No. 8,140,358, *Liberty Mutual Insurance Co.* versus *Progressive Casualty Insurance Co.*, United States Patent and Trademark Office before the Patent Trial and Appeal Board, Sep. 24, 2013, 2 pages.

Excerpts from Transcript of Deposition of Scott Andrews for pp. 311-314, Cases CBM2012-00002, CBM2012-00004, U.S. Pat. No. 6,064,970; Case CBM2013-00004, U.S. Pat. No. 8,090,598; Cases CBM2012-00003, CBM2013-00009, U.S. Pat. No. 8,140,358, *Liberty Mutual Insurance Co.* versus *Progressive Casualty Insurance Co.*, United States Patent and Trademark Office before the Patent Trial and Appeal Board, Sep. 24, 2013, 2 pages.

Excerpts from Transcript of Deposition of Scott Andrews, Cases CBM2012-00002, CBM2012-00004, U.S. Pat. No. 6,064,970, Case CBM2013-00004, U.S. Pat. No. 8,090,598; Cases CBM2012-00003, CBM2013-00009, U.S. Pat. No. 8,140,358, *Liberty Mutual Insurance Co.* versus *Progressive Casualty Insurance Co.*, United States Patent and Trademark Office before the Patent Trial and Appeal Board, Sep. 24, 2013, 4 pages.

Excerpts from Transcript of Deposition of Scott Andrews for pp. 259-262, Cases CBM2012-00002, CBM2012-00004, U.S. Pat. No. 6,064,970; Case CBM2013-00004, U.S. Pat. No. 8,090,598; Cases CBm2012-00003, CBM2013-00009, U.S. Pat. No. 8,140,358, *Liberty Mutual Insurance Co.* versus *Progressive Casualty Insurance Co.*, United States Patent and Trademark Office before the Patent Trial and Appeal Board, Sep. 24, 2013, 2 pages.

Appeal No. 2014-1586 of CBM2013-00004, Appellant Progressive Csualty Insurance Co.'s Opening Brief, *Progressive Casualty Insurance Co.* v. *Liberety Mutual Insurance Co.*, United States Court of Appeals for the Federal Circuit, Oct. 2, 2014, 230 pages.

Appeal No. 2014-1656 of CBM2012-00004, Appellant Progressive Casualty Insurance Co.'s Opening Brief, *Progressive Casualty Insurance Co.* v. *Liberty Mutual Insurance Co.*, United States Court of Appeals for the Federal Circuit, Oct. 31, 2014, 172 pages.

Appeal No. 2014-1466 of CBM2012-00002, Corrected Appellant Progressive Casualty Insurance Co.'s Opening Brief, *Progressive Casualty Insurance Co.* v. *Liberty Mutual Insurance Co.*, United States Court of Appeals for the Federal Circuit, Oct. 31, 2014, 204 pages.

Appeal No. 2014-1639 of CBM2013-00009, Appellant Progressive Casualty Insurance Co.'s Opening Brief, *Progressive Casualty Insurance Co.* v. *Liberty Mutual Insurance Co.*, United States Court of Appeals for the Federal Circuit, Nov. 14, 2014, 243 pages.

Appeal Nos. 14-1636.-1637 of CBM2012-00003, Corrected Appellant Progressive Casualty Insurance Co.'s Opening Brief, *Progressive Casualty Insurance Co.* v. *Liberty Mutual Insurance Co.*, United States Court of Appeals for the Federal Circuit, Nov. 14, 2014, 237 pages.

Appeal No. 2014-1586 of CBM2013-00004, Brief of Appellee Liberty Mutual Insurance Co., *Progressive Casualty Insurance Co.* v. *Liberty Mutual Insurance Co.*United States Court of Appeals for the Federal Circuit, Dec. 1, 2014, 83 pages.

Appeal No. 2014-1586 of CBM2013-00004, Brief for Inventor—Director of The United States Patent and Trademark Office, *Progressive Casualty Insurance Co.* v. *Liberty Mutual Insurance Co.*, United States Court of Appeals for the Federal Circuit, Dec. 1, 2014, 60 pages.

(56) References Cited

OTHER PUBLICATIONS

Appeal Nos. 2014-1636, -1637 of CBM2012-00003, Opening Brief of Cross-Appellant Liberty Mutual Insurance Co., *Progressive Casualty Insurance Co. v. Liberty Mutual Insurance Co.*, United States Court of Appeals for the Federal Circuit, Jan. 12, 2015, 85 pages.

Appeal No. 2014-1639 of CBM2013-00009, Brief of Appellee Liberty Mutual Insurance Co., *Progressive Casualty Insurance Co. v. Liberty Mutual Insurance Co.*, United States Court of Appeals for the Federal Circuit, Jan. 12, 2015, 76 pages.

Appeal No. 2014-1639 of CBM2013-00009, Brief for Inventor—Director of The United States Patent and Trademark Office, *Progressive Casualty Insurance Co. v. Liberty Mutual Insurance Co.*, United States Court of Appeals for the Federal Circuit, Jan. 12, 2015, 63 pages.

Appeal No. 2014-1586 of CBM2013-00004, Appellant Progressive Casualty Insurance Co.'s Reply Brief, *Progressive Casualty Insurance Co. v. Liberty Mutual Insurance Co.*, United States Court of Appeals for the Federal Circuit, Jan. 20, 2015, 44 pages.

Appeal No. 2014-1656 of CBM2012-00004, Brief of Appelle Liberty Mutual Insurance Co., *Progressive Casualty Insurance Co. v. Liberty Mutual Insurance Co.*, United States Court of Appeals for the Federal Circuit, Feb. 12, 2015, 76 pages.

Appeal No. 2014-1656 of CBM2012-00004, Brief for Inventor—Director of The United States Patent and Trademark Office, *Progressive Casualty Insurance Co. v. Liberty Mutual Insurance Co.*, United States Court of Appeals for the Federal Circuit, Feb. 12, 2015, 51 pages.

Appeal No. 2014-1466 of CBm2012-00002, Brief of Appellee Liberty Mutual Insurance Co., *Progressive Casualty Insurance Co. v. Liberty Mutual Insurance Co.*, United States Court of Appeals for the Federal Circuit, Feb. 12, 2015, 75 pages.

Appeal No. 2014-1466 of CBM2012-00002, Brief for Inventor—Director of The United States Patent and Trademark Office, *Progressive Casualty Insurance Co. v. Liberty Mutual Insurance Co.*, United States Court of Appeals for the Federal Circuit, Feb. 12, 2015, 53 pages.

Appeal No. 2014-1639 of CBM2013-00009, Appellant Progressive Casualty Insurance Co.'s Reply Brief, *Progressive Casualty Insurance Co. v. Liberty Mutual Insurance Co.*, United States Court of Appeals for the Federal Circuit, Feb. 12, 2015, 44 pages.

Appeal Nos. 2014-1636, -1637 of CBM2012-00003, Brief for Inventor—Director of The United States Patent and Trademark Office, *Progressive Casualty Insurance Co. v. Liberty Mutual Insurance Co.*, United States Court of Appeals for the Federal Circuit, Feb. 26, 2015, 44 pages.

Appeal No. 2014-1656 of CBm2012-00004, Appellant Progressive Casualty Insurance Co.'s Reply Brief, *Progressive Casualty Insurance Co. v. Liberty Mutual Insurance Co.*, United States Court of Appeals for the Federal Circuit, Mar. 27, 2015, 44 pages.

Appeal No. 2014-1666 of CBM2012-00002, Appellant Progressive Casualty Insurance Co.'s Reply Brief, *Progressive Casualty Insurance Co. v. Liberty Mutual Insurance Co.*, United States Court of Appeals for the Federal Circuit, Mar. 27, 2015, 44 pages.

Appeal Nos. 2014-1636, -1637 of CBM2012-00003, Appellant Progressive Casualty Insurance Co.'s Response and Reply Brief, *Progressive Casualty Insurance Co. v. Liberty Mutual Insurance Co.*, United States Court of Appeals for the Federal Circuit, Apr. 17, 2015, 65 pages.

\* cited by examiner

MOBILE INSURANCE PLATFORM SYSTEM

1. Related Application

This application is a continuation of application of Ser. No. 15/916,722 filed Mar. 9, 2018, titled "Mobile Insurance System," now U.S. Pat. No. 10,497,063, which is a continuation of Ser. No. 13/364,953 filed on Feb. 2, 2012, titled "Mobile Insurance System," now U.S. Pat. No. 9,916,625, each of which are incorporated by reference in their entirety.

BACKGROUND OF THE INVENTION

1. Technical Field

This disclosure relates to insurance devices, systems, and methods, and more particularly to a mobile architecture that supports mobile applications that may be accessible through or executed by mobile devices.

2. Related Art

Insurance often requires back-office operations and customer interactions to optimize customer relationships and achieve growth. The operations may require collaboration between insurance representatives and customers to capture new business, service existing business, and resolve insurance issues such as claim handling and fulfillment. The process requires regular communication to service customers and attract new business.

From an insurer's perspective a higher level of communication is required to maintain operational visibility, customer relationships, and support core business processes. Such processes may include the management of distribution channels, commissions, collaboration with insurance agent partners, billing, claim evaluations, payments, and the capture and processing of insurance information. The support needed to generate and deliver insurance products that support these functions and others is not a straight through automated process that may be serviced and sustained by a limited network bandwidth or through one or more general purpose computers. Such functions have yet to be serviced or empowered by a mobile architecture.

SUMMARY

A mobile insurance architecture includes a wireless communication interface that connects mobile client devices to wireless networks. An insurance server cluster that includes a group of independent computer network servers operates and appears to mobile client devices as if the group of independent computer network servers were a single unit. An adaptive transmission controller communicates with the insurance server cluster and processes content in multiple mobile formats that may be optimized to the screen sizes of the mobile client devices. The insurance server cluster responds to native application clients resident to the mobile client devices. The native application clients contain code stored on a non-transitory media that may be executed by a mobile processor to render insurance quoting services, insurance claims services, on-line insurance policy services, usage based insurance services, mobile monitoring services, or insurance agency management services.

Other systems, methods, features, and advantages of the inventions will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The inventions can be better understood with reference to the following drawings and description. The components in the figures are not necessarily to scale, emphasis instead being placed upon illustrating the principles of the invention. Moreover, in the figures, like referenced numerals designate corresponding parts throughout the different views.

BRIEF DESCRIPTION OF THE APPENDICES

Figure 1:
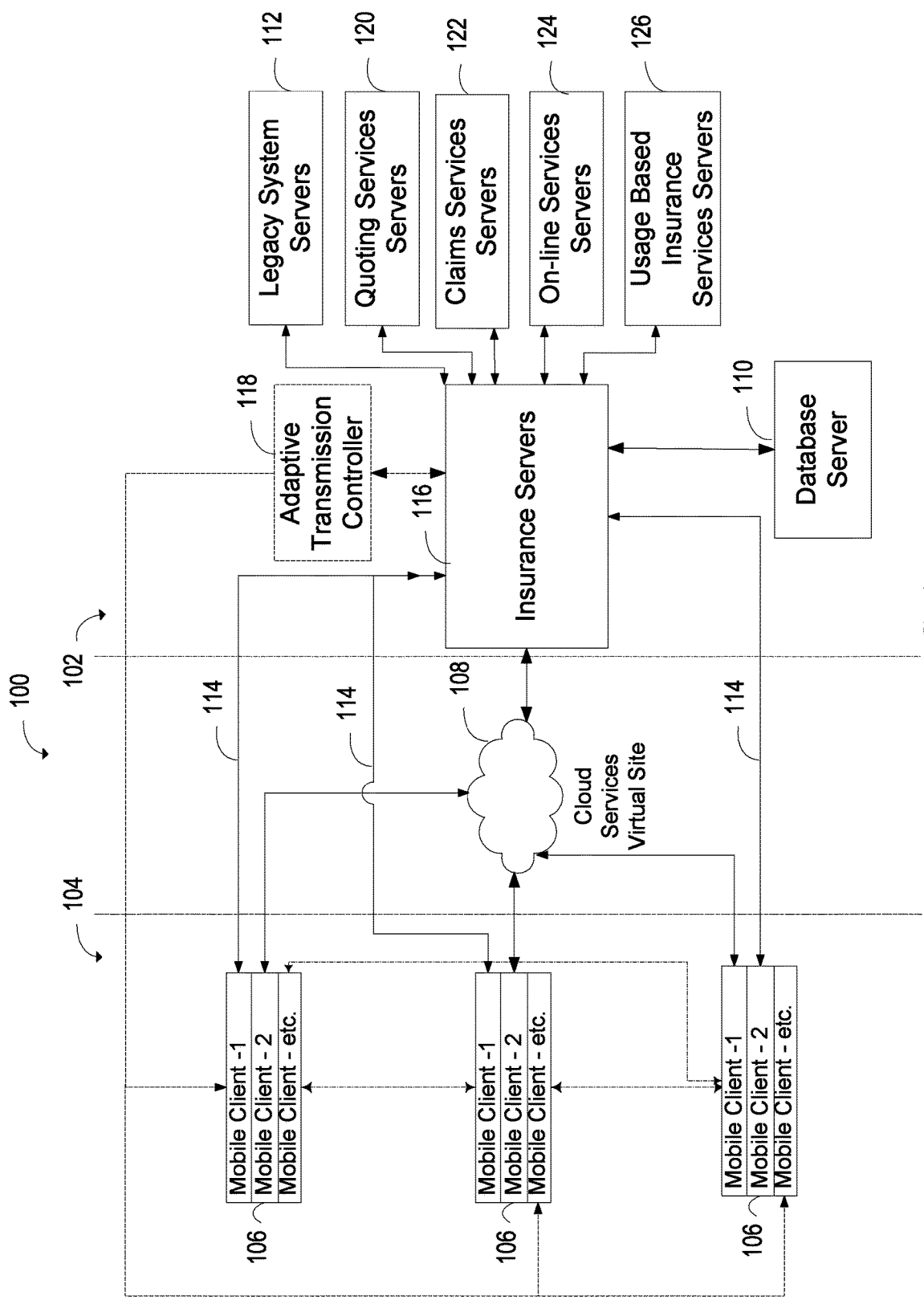
FIG. 1 is a block diagram of an exemplary mobile insurance architecture.

APP. 1-21 are exemplary mobile screens that may be rendered in a claim process such as the process shown in part in FIGS. 5-8.

DETAILED DESCRIPTION OF THE PREFERRED EMBODIMENTS

This disclosure provides a mobile insurance architecture that delivers innovative insurance products and high level customer service. The mobile insurance architecture may attain a high level market and operational visibility while supporting core business processes of the insurance industry. The architecture may include and/or support distribution channel management, insurance agent collaboration, customer and claimant direct service, and the capture of new insurance business.

As a multi-user architecture, the operations and functions described herein may be provided after a mobile user's authentication. Access may be granted through processes that validate a mobile user's logon information through passwords and user names, through biometrics, facial recognition (e.g., that may analyze feature locations through weighted difference maps), etc., for example, that may be executed locally on the mobile devices, through a distributed process shared between the mobile device and insurer's side, or in a combination of distributed processes executed locally and across a communication network.

From a claims processing perspective, the mobile insurance architecture facilitates the initiation and capture of claim information, facilitates the evaluation of claims, facilitates the communication of claim status (e.g., where the claim or insured item is in the evaluation or repair process, provide photos, video, real-time or delayed video relating to status, such as the status of a repair) and integrates access to service providers (e.g., repair centers, rental services, etc.) via one or more insurance servers and/or claims services servers. The claiming functionality may further support insurance agent referrals, roadside assistance, and/or the disbursement of payments to the mobile users through one or more servers.

From a quoting perspective the architecture may include and/or support a fully or partially automated customized point-of-sale application that supports insurance quotes, insurance related sales, and insurance services at any time and in any place (e.g., 24 hours a day, 7 days a week). The quoting, buying, and claiming architecture may provide direct access to telephone call centers and provide contextual screening, contextual interrogation, and/or contextual queries based on the unique information gathered from the user's own mobile applications resident to the user's mobile device. Such information may be supplemented or gathered automatically through one, two, three or more sensors built into the user's mobile device and software routines, such as a camera that may be a unitary part of or integrated to the mobile device, and optical character recognition (OCR) software.

Some quoting and claiming architectures may facilitate automated requests made and transmitted by the mobile device itself and may program the mobile device to make decisions on its own, such as transmitting requests to any destination, including remote analytic services, government services, data warehouses, local or remote databases, and/or third party vendors upon the occurrence of an event. The architecture may also include or support the automatic prefilling of forms, such as electronic forms, without requiring users to manually enter or re-enter information. A text-to-speech engine and/or speech-to-text engine may further solicit and capture information with little user effort. Through an aural contextual query, written contextual query, graphical query, static query, query screen, or user inquiry session (each of which may be interactive) the mobile architecture may streamline one or more insurance application processes, service processes, claim handling and fulfillment processes, collection and disbursement processes, etc. The architecture increases productivity and service offerings in insurance shopping, customer servicing, claim handling and fulfillment, insurance agent services, contextual screening, customer referrals, product offerings (e.g., product bundles such as home insurance, vehicle insurance, recreational vehicle insurance, etc.), fraud prevention, etc.

FIG. 1 shows a mobile insurance architecture 100 that supports a mobile user and one or more insurance providers or insurance intermediaries. The insurance providers or insurance intermediaries (referred to as "insurer's side" or "back end" 102) may comprise one or more servers (e.g., computers that respond to commands from a client device) or proxy servers that operate and appear to the mobile client side 104 as a single server. The clustering of the insurer's side or back end 102 improves capacity by, among other things, enabling the devices or computer servers in the cluster to shift work to balance loads. The mobile insurance architecture 100 may enable one or more devices or servers to take over for another, to enhance network stability and minimize or eliminate downtime caused by application or system failure.

The mobile client side 104 and insurance back-end 102 may include one or more components or modules that may be implemented in software, hardware, or a combination of software and hardware. The system may enable the transmission and reception of any type or combination of information including data, video, and audio sent exclusively through the air or through a combination of a wireless medium and a tangible medium (e.g., conductive mediums, optical mediums, etc.). Some mobile client devices 106 interface, are integrated to, or are a unitary part of wireless communication devices, such as cell phones, wireless phones, personal digital assistants, two-way pagers, smartphones, portable computers, vehicle based devices, or other such devices that include one, two, three or more processors such as portable processors (e.g., central processing units, digital processing units, graphical processing units, etc.) that interface a local storage device or virtual (or remote) storage resources such as on-line cloud storage resources 108. The on-line cloud storage resources 108 or local or remote storage device may include nonvolatile memory (e.g., memory cards, flash drives, solid-state devices, ROM/PROM/EPROM/EEPROM, etc.), volatile memory (e.g., RAM/DRAM, etc.), that may retain a database or are part of database server(s) 110 or cluster (shown on the insurer's side 102, but may also serve the mobile client side 104 and/or the network side exclusively or in combination) that retains data in a database structure and supports a database sublanguage (e.g., structured query language, for example) that may be used for querying, updating, and managing data stored in a local or distributed memory of the databases. The database is accessible through database engine or a software interface between the database and user that handles user requests for database actions and controls database security and data integrity requirements. The mobile device 106 may be further configured to communicate with or through one or more tangible devices, such as a personal computer, a laptop computer, a set-top box, a customized computer system such as a game console, and other devices, for example.

Some mobile devices 106 include one or more standalone or integrated/unitary native application clients stored on a non-transitory media (shown as Mobile Client-1, Mobile Client-2, Mobile Client—etc. in FIG. 1), including an insurance shopping client, a claims application client, a customer service client, a usage based insurance client, and a monitoring client. Each of the native application clients may be resident to and executed by one or more mobile device 106 processors. The native application clients may be remote from the insurer's side 102 and may request services provided by other programs run on the quoting services server(s) 120, claims services server(s) 122, on-line services server(s), usage based insurance services server(s) 124, legacy systems server(s) 112, storage resources, and other servers that may comprise, are a part of, or interface the insurer's back end 102. A server may comprise a program or a programmed computer, for example, that responds to commands from a client such as a mobile device. The native application clients may take advantage of the particular mobile device 106 functions, features, and built-in (or accessible) sensors and devices, such as global positioning sensors and services, accelerometers, gyroscopes, cameras, temperature sensors, humidity sensors, altimeter sensors, proximity sensors, etc. The native application clients may offer a superior experience to desktop Web browsing and mobile Web browsing because native application clients are not run within a Web browser, the native application client's fast performance, their well-designed interfaces, and their ability to navigate portions of the applications content without Internet or network connectivity and/or the need to access a browser cache.

The interface 114 linking the native application clients on the mobile devices 106 to the insurer's side 102 may convey commands and information or data between the mobile device side 104 and the insurer's side 102, such as notifications, sharing, uploading, downloading, importing etc. The commands and data that are exchanged between the mobile device side 104 and the insurer's side 102 may be processed without the originating side "knowing" any of the working details or resources provided by the receiving hardware, software, or the resources themselves (e.g., its device/server agnostic). The communication may occur through an extensible markup language (XML), hypertext markup language (HTML), applets, etc. that may include the ability to change and update content dynamically.

On the mobile side 104, content may be accessible or change in response to mobile based user actions, voice commands, facial recognition, or through native gesture recognition applications. Furthermore, when a version or functionality similar to dynamic XML or HTML is used, rich content may be delivered and user interactivity may be enhanced (scaled up or down) to the mobile device. The underlying protocol may support mobile-side application program interfaces (APIs), facial recognition applications, and/or multi-directional gesture controls that may authenticate a user, confirm a mobile user's activity (e.g., the mobile user is driving) and/or emulate a joystick, a mouse click, a swipe, a zoom-in, a zoom-out, a rotation, the throwing of content from one mobile device 106 to another 106 or between a mobile device 106 and the insurance servers 116 or back end 102, among other functionality through the built-in or interfaced sensors of the mobile device. Facial recognition and/or motion may be detected through local mobile device sensors or remote sensors interfaced to the mobile device 106 that detect sound above the audible range (e.g., ultrasonic sensors) and/or below the audible range with the help of a microphone to track voice. Some mobile devices 106 support one, two, or more optical cameras to detect feature locations of an image (e.g., to recognize a user's presence and facial features), and to track motion through two and/or three dimensional images. Other mobile devices 106 use a combination of the above and/or other sensors to track the mobile user's presence and interaction with the mobile device 106. Some mobile devices 106 may sense a mobile user's entire body or a portion of the mobile user interacting with the mobile device 106 or an insured item. The physical gesture recognition may be supplemented by voice commands that may control the mobile device 106 and its native application clients through a touchless, and in some instances, "no-look" (e.g., without the aid of an optical camera) control.

An optional client-side synchronization object that may interface one or more (or any one or combination) of the mobile device clients may synchronize the delivery of data between the mobile device side 104 and the insurer's side 102. Some synchronization objects may automatically switch between cellular networks and a number of different wireless communication networks, including wireless Internet networks or public networks such as Wi-Fi (e.g., 802.11b/g/n), when a successful network connection is made to another network or an existing connection is dropped. The synchronization object may automatically connect to destinations, nearby devices or networks over a high-performance secure connection, such as a high-performance secure Wi-Fi connection. Some synchronization objects may automatically look, and in some instances, automatically connect to communication networks when connectivity is lost, when a high bandwidth mobile client is active, or a higher priority-designated network is discovered or becomes available. The client-side synchronization processing may allow users to set network priority connections and the network order in which the mobile device 106 accesses them. Some mobile-side synchronization schemes may be implemented with restrictions that limit one or more designated mobile device native application client communications to one or more specific communication networks to facilitate faster processing and limit mobile data consumption. When network connectivity is restricted (by a mobile user, an insurance provider, or intermediary, for example) or when all network connections are lost, or when a dead zone is encountered, the mobile device 106 may delay further processing or delay the further transmission of data to remote destinations until an acceptable communication connection is reestablished, or may buffer data in a local memory resident to the mobile device 106 or buffer the data in virtualized storage resources 108 that are accessible through a wireless or physical media. When an acceptable communication connection is reestablished, data transmission may resume or begin. If data was stored, the data may be transferred or an address of the storage location of the data (e.g., an address or address range, for example) may be communicated to the receiving destination, node, or device.

Some synchronization objects may create or support a mesh based network that allows the mobile devices 106 to communicate with each other (shown by the dash lines interlinking the mobile devices 106 to each other in FIG. 1). In some mobile insurance architectures, some or all of the mobile devices 106 may serve as a node in the mesh communication network and act as an independent router or modem-router, regardless of whether the mobile device 106 is connected to another communication network. Some synchronization objects may facilitate continuous connections and automated reconfiguration around dead, non-functional, or disrupted connections by hopping data from node to node until a destination is reached. In some systems, the automated reconfiguration will include other communication networks. In other architectures, it is limited exclusively to the mobile devices 106. In some systems, the synchronization objects may modify the data that is transmitted from node to node by adding or inserting data to a payload, header, or metadata, for example; reconfiguring payload, header, or metadata; compressing some or all of such data; or executing a combination of processing schemes described, etc. The data may capture dynamic and/or static information about the network, such as the configuration or reconfiguration of the network including its dead zones, its disrupted connections, etc. Mobile device 106 analysis of the added, compressed, or modified data, or analysis at the insurer's side 102, may measure and/or reflect real-time traffic congestion, the physical or operational state of infrastructure (e.g., the state of roads, bridges, landlines, mobile phone network, etc.) among other things, and result in real-time or near real-time mobile notifications transmitted to some or all of the mobile devices 106 that may comprise the mesh network (or non-mesh networks) and other devices outside of the network. While the range and speed of some mesh networks may depend on the concentration, functionality, and performance of the mobile devices 106, the mobile device's 106 potential to sustain communication when some of or the entire mobile phone network and/or landline phone networks are knocked out, such as in areas being served by disaster relief, may be significant.

As shown in FIG. 1, a mobile insurance architecture may include an optional adaptive transmission controller 118 that may process content and video (e.g., mobile content) in multiple mobile versions optimized for different variables, such as screen size, resolution, operating system, and the availability and use of plug-ins (e.g., such as Adobe Acrobat). A plug-in may comprise a small software program that plugs into a larger application program retained in a non-transitory media to provide added functionality and/or permit access and execution of files, objects, data, etc. embedded in documents, files, and/or data that may not otherwise be recognized. When a request is received at the insurer's side 102, the adaptive transmission controller 118 may transmit content received from the insurer's server 116 that is formatted to the correct size of the designated mobile device 106. Some adaptive transmission controllers 118 use graphic video chips and graphic processors that are configured to manipulate superfast content, instead of relying on traditional server controls that may rely exclusively on central processing units. Through the use of a parallel processing architecture, some adaptive transmission controllers 118 may deliver faster than real-time encoding and multiple adaptive bit rate outputs, to deliver multiple resolution, and deliver output formats in real-time or near real-time that target a variety of mobile devices 106 and operating platforms including Microsoft®, Adobe®, and Apple's® systems, to name a few. A real-time operation may comprise an operation matching a human's perception of time or a virtual process that is processed at the same rate (or perceived to be at the same rate) as a physical or an external process.

Figure 2:
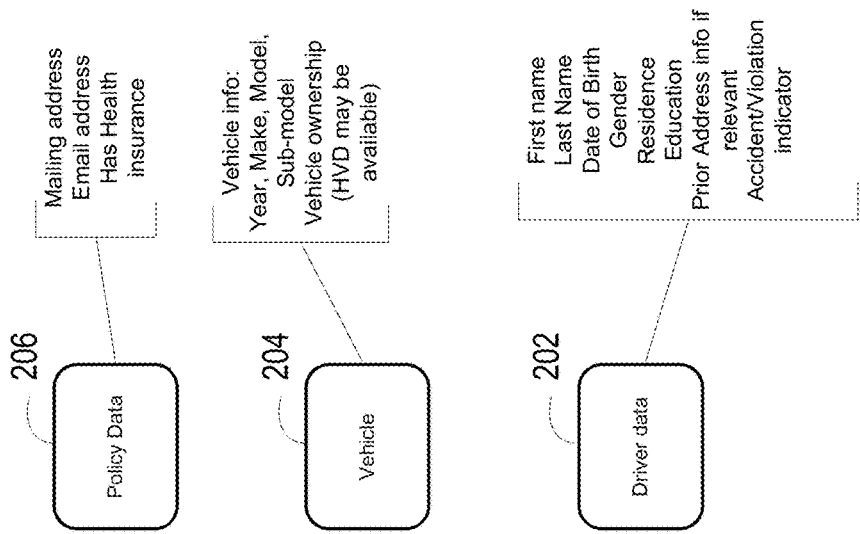
FIG. 2 shows exemplary data collected by a mobile insurance client.
Figure 3:
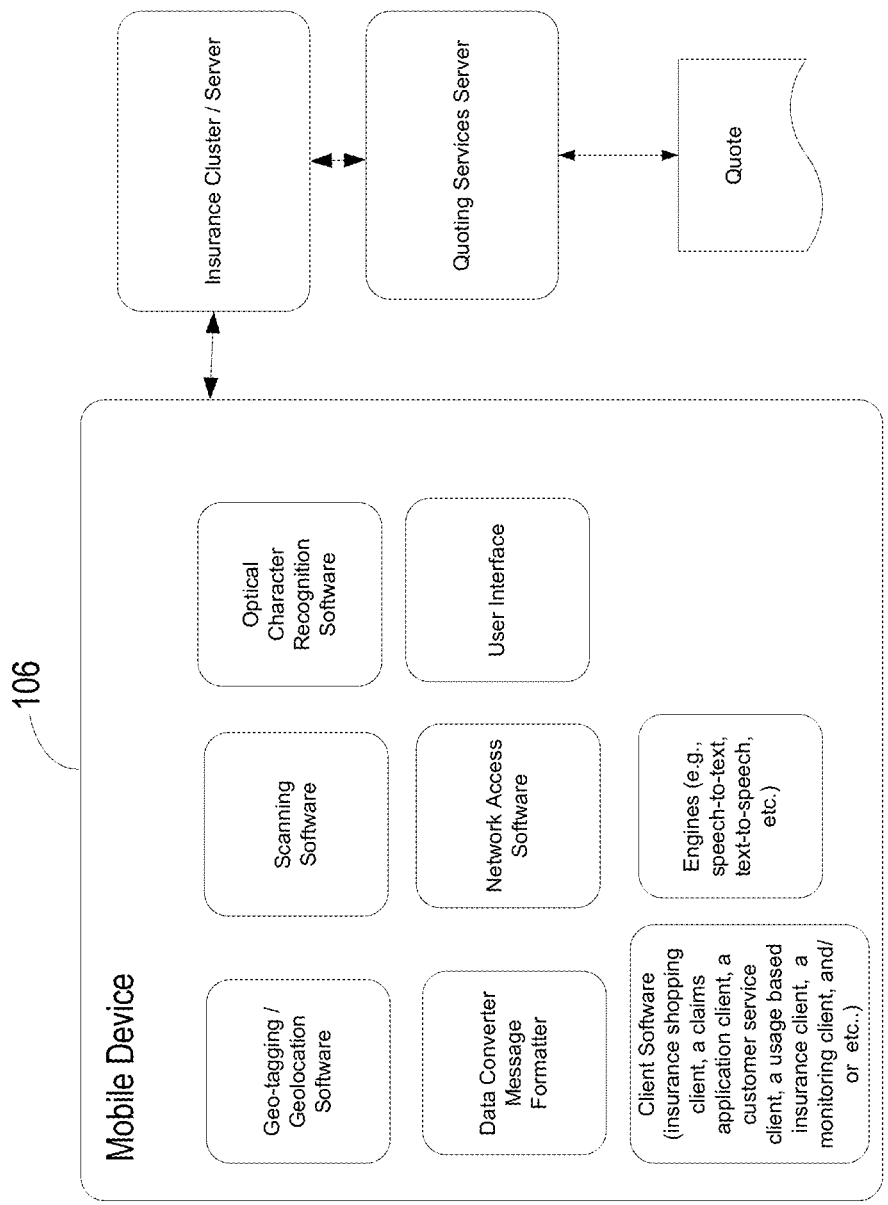
FIG. 3 is a block diagram of an exemplary mobile client device in communication with a quoting services server(s) or server cluster.
Figure 4:
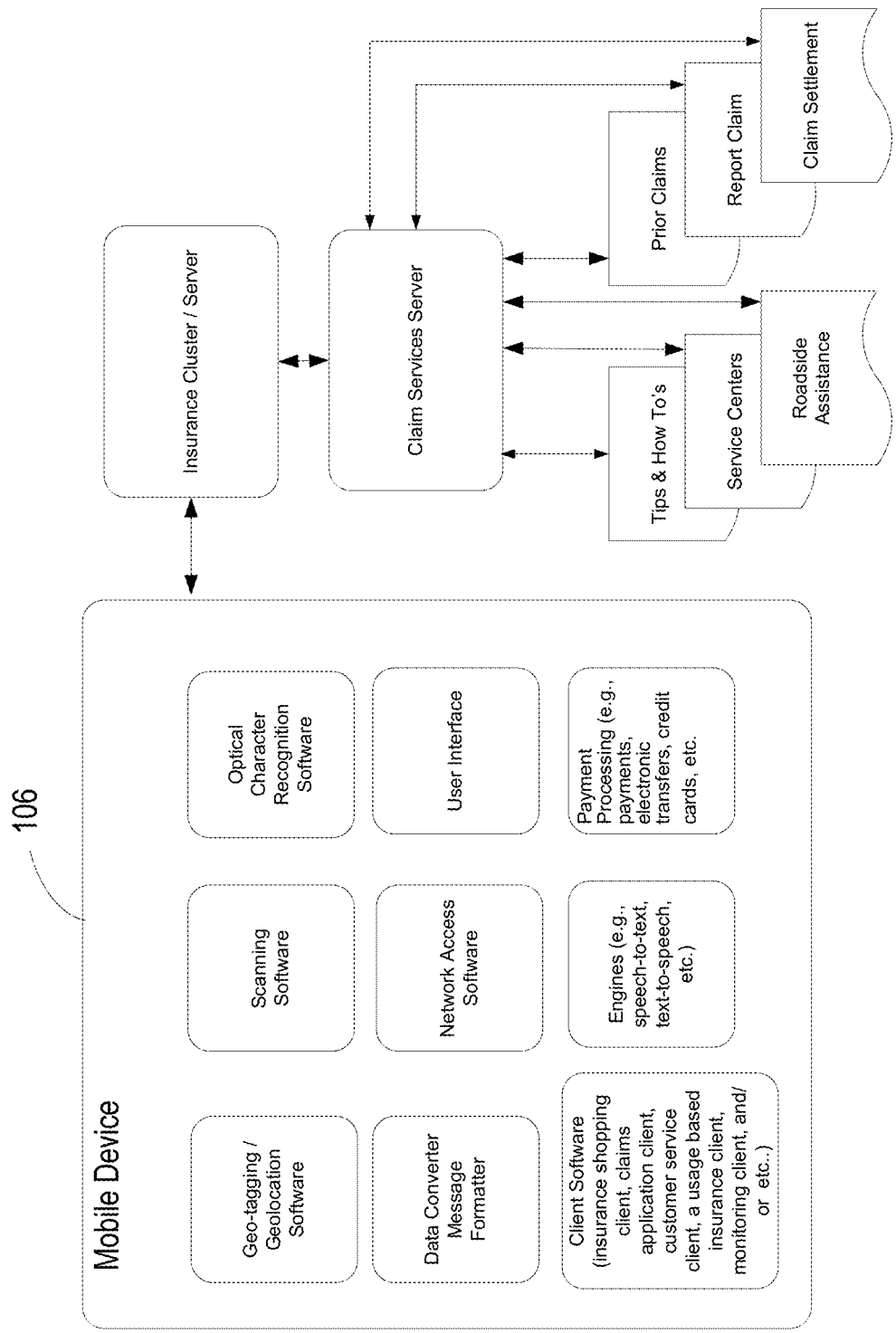
FIG. 4 is a block diagram of an exemplary mobile client device in communication with a claims services server(s) or server cluster.

Referring to FIGS. 2 and 3, a mobile device 106 may include an insurance shopping client that may include multiple objects (e.g., variables that comprise software routines or source code stored in a non-transitory media and in some applications include data that collectively may be treated as discrete programmed hardware or non-transitory hardware modules) to provide fully or partially automated customized point-of-sale applications that support insurance quotes and insurance related sales. The insurance shopping client is responsible for gathering information from prospects and/or existing customers and delivering insurance quotes that may be customizable to the user by premium, plan type, coverages, deductible, effective policy date, etc. For example, one or more insurance parameters may be customized by the user including those described in the Customizable Insurance System pending as U.S. application Ser. No. 12/482, 111, which is incorporated herein by reference. Some insurance shopping clients allow prospects and customers to compare plans, rates, and carriers side-by-side (or between mobile screens) twenty-four hours a day seven days a week. In some implementations, the customized and/or competitor quotes may be normalized at the insurance server(s) 116 or insurance server cluster to ensure a consistent comparison (e.g., a statistical normalization that may render similar coverage, policy terms, etc.). The insurance shopping client may render a textual and/or graphical comparison on the mobile device 106 that allows a user to compare coverages, deductibles, rates, insurance carriers, other insurance parameters, and elect insurance plans on one or more mobile screens.

The insurance shopping client may gather the information needed to process quotes, such as the prospect's driver data 202 that may include first name, last name, date of birth, street address, city, state, zip, social security number, gender, vehicle data 204 (that may include year, make, model/submodel, vehicle identification number or VIN, for example) and/or other data through one or more mobile templates. Such information may also include policy data 206 and may further include information gathered or supplemented automatically through one, two, or more sensors built into the mobile devices 106. Some insurance shopping client objects configure an optical camera of the mobile device 106 into an optical scanner. Mobile OCR and optional geo-tagging software associated with the insurance shopping client objects resident to the mobile device 106 (or in the alternative accessible through a metered service over a network, like the Internet, through cloud computing resources 108, or resident to the insurer's side 102) may translate the identification characters (such as one, two, or three dimensional bar codes such the vertical bars of differing widths if scanning a U.P.C. bar code (a UNIVERSAL PRODUCT CODE bar code is bar code representation of numeric characters that uniquely identify a company's individual product), such as a Code 39 bar code associated with a VIN, a Quick Response code or Q.R. code (a QUICK RESPONSE code is a machine-readable optical label that contains information about at item) that may be used in the automotive industry, etc.) and in some systems, the geographical location of the VIN, into a computer/mobile device readable text to a quick-fill object that may automatically prefill or suggest data to prefill one or more mobile templates or may be directly transmitted to the insurer's side 102. Similarly, the optical camera and mobile OCR and optional geo-tagging software may capture or scan driver's license information and deliver that information, and in some systems geographical identification metadata, to a quick-fill object that may automatically prefill or suggest data to prefill one or more mobile templates that are delivered to the insurer's side 102 or in the alternative, may deliver the information directly to the insurer's side 102 as it is entered (e.g., through a persistent connection). In another alternative, the insurance shopping client may automatically gather or harvest information resident to the mobile device 106 itself and other native mobile device clients or mobile web browser applications (e.g., other native software or internet applications that run on cell phones, wireless devices, personal digital assistants, two way pagers, vehicle devices, smartphones, and other mobile devices) that are resident to the mobile device 106 or in network with the mobile device 106. Besides the exemplary driver data 202, vehicle data 204, and policy data 206 described above, personal data, phone information, device identification, usage history, etc., may also be automatically gathered from the mobile device 106 itself and transmitted to the insurer's side 102 during the quoting process.

The information gathering process may solicit different information from prospects based on the information gathered and insurer provided heuristics. Other features available to the insurance shopping client and the other mobile device native application clients (e.g., available to the customer service client, the claims application client, a usage based insurance client, insurance agency management client, and/or the monitoring client) include text-to-speech engines and speech-to-text engines that may solicit, capture, and/or report information or may translate user voice commands. The engines may comprise a processor or portion of a computer program or routine resident to a non-transitory media in the mobile device 106 or accessible through a metered virtual service across a network.

Alternatively, the mobile device 106 may gather some or all of the information automatically. Some insurance shopping client objects may communicate directly with the object that may be the focus of a desired insurance quote, such as a vehicle, for example. Through a personal area network that may include a high level of security, such as a Bluetooth®, network (e.g., that may encompass the wireless specification defined by IEEE 802.15, 802.15.4 (TG4), 802.15.3 (TG3), or other standards), for example, the mobile device may communicate directly with the vehicle to capture the vehicle's VIN, and in some systems, supplement the VIN identification data with personal information and/or usage based information resident to the vehicle's powertrain control module, body control module, entertainment and comfort module, and/or other in-vehicle or vehicle interfaced systems and/or other data descriptive or associated with the vehicle. Some mobile devices 106 may automatically identify and then connect with some or all of the original equipment manufacture's communication bus protocols.

Some information gathered in the quoting process may be validated through shared data and mobile device services. For example, shared data and location services (e.g., global positioning sensors, geo-tagging software, etc.) in or available to the mobile device 106, for example, may capture some of the user's demographic information and the user's geographic location (e.g., latitude and longitude) that may be further processed to confirm the user's identity, current address, etc. An address may be confirmed through an address look-up API, through cross-platform requests, comparisons to shared data on the mobile device 106, through requests to other service providers, or through a comparison to data accessible through cloud based services 108.

Figure 17:
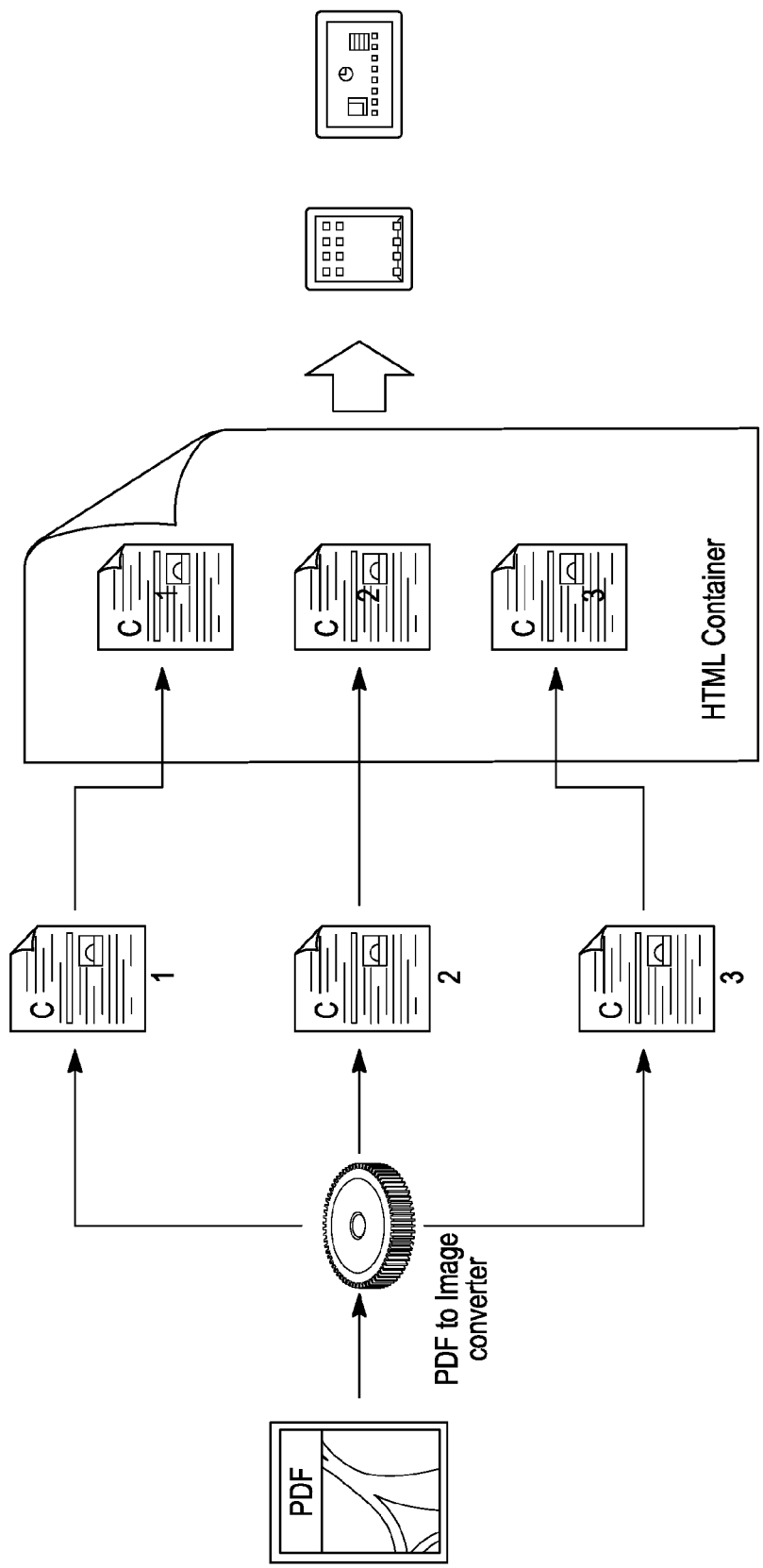
FIG. 17 is an exemplary process that converts a mobile document into a mobile portable image.

Through the above interaction, the insurance shopping client may transmit the information an insurer needs to provide a quote (e.g., to the insurance server(s) and/or quoting services server(s) 120), or in the alternative, make a referral to an insurance agent. Some mobile device data and/or vehicle specific data (e.g., global positioning data, usage based vehicle data, etc.) may also be processed to validate the user transmitted information along with or in addition to data previously entered into or accessible to the insurance provider's system allowing the insurer side 102 to deliver a validated quote to the mobile device 106. The quote may be delivered by the quoting services server(s) 120 through a secure transmission of a path or address of where the quote resides (e.g., a uniform resource locator) via a secure network, a document (e.g., HTML, XML, etc. documents that may be scaled up or down) or file from the insurer' side in real-time or near real-time. To ensure the integrity and/or security of some or all documents delivered to the mobile user, some documents delivered by the insurer's side 102 may be converted into multiple document formats before being delivered through a container—such as a mark-up container, for example—to the mobile devices 106. For example, one or more mobile or electronic documents may be converted into portable document formats (as separate or a common document) and then rendered as an image (or multiple images) before being encapsulated or placed in a container that uses tags (e.g., code or software that identifies an element in a document) to mark elements. Some containers may comprise a Standard Generalized Markup or Hypertext Markup Language container, for example, that is then delivered to a mobile device 106 as shown in FIG. 17.

Acceptance of a quote (e.g., via an acceptance object) may occur in many ways through the mobile device 106. Acceptance may occur by a prospect's acknowledgement, an electronic signature, voice recognition, an accepted gesture, etc. The acknowledgement may be received, encoded, and transmitted with a time and date stamp rendered by the prospect's mobile device 106 or the time and date stamp (a location stamp in some applications that) may be added to the acknowledgment data (e.g., payload, header, metadata) when received at the insurer's side 102 (e.g., insurance server(s) 116). An alternative acceptance object captures, encodes, and transmits to the insurer's side 102 and in some systems displays the actual user's signature via a touch screen on the mobile device 106 that scans user's actual signature via a screen that recognizes a touch or movement in the screen's proximity (e.g., an adjustable nominal distance that in some applications are measured in millimeters), by appending or adding secure signature data or a signature file to the acceptance data, through encryption (e.g., a system that encodes data to prevent unauthorized access such as during transmission of the data to or from the insurer's side 102), or through other means that uniquely identifies the prospect and the prospect's acceptance (e.g., through a user's voice, gesture, etc.). If no hardware keyboard is part of the mobile device 106, the mobile device 106 may render a "soft keyboard" or "virtual keyboard" that may be displayed on the screen when text is desired to be entered in. In some mobile devices 106, the touch screens may accept printing, handwriting, graphics and finger movement, stylus movements that may be captured by many types of screens, such as pressure sensitive screens, capacitive screens, projected capacitive screens, acoustic wave and/or infrared screens, etc. Each of these embodiments and acceptance objects may allow users to sign and/or accept some or all documents, forms, etc. generated by the insurer's side or back-end 102 and/or mobile client side 104 and transmit the acceptance to the insurer's side or back-end 102 and/or mobile client side 102 in real-time, near real-time or after a deliberate delay.

An insurance shopping client may further include one or more insurance shopping client objects that allow prospects to receive a customized quote before purchasing insurance. The customized purchase may comprise a change to an existing insurance policy (e.g., it may include any policy endorsement, any coverage changes, any changes in insurance limits, any changes in insurance deductibles, etc.) or an addition of an insurable item, such as a vehicle, a home, or an addition or change to another insurable item. A prospect may specify the details of the potential insurance purchase through an interface, such as a graphical user interface on the mobile device 106. Information may be solicited through dynamic and/or static verbal, written, and/or gestured control query that may be gathered as described in this disclosure or through other processes that extract data. By example, if the prospect is interested in adding a car to an existing or new insurance policy, the prospect may scan the vehicle's VIN and primary driver's license that may be further processed by geolocation software on the mobile device 106. After selecting or to customizing one or more customizable parameters on the mobile device 106 such as a desired premium, plan type, coverages, deductible, effective date, and/or etc., a request may be transmitted to the insured side 102 and a valid quote may be delivered to the mobile device 106 through the quoting services server(s) 120. The valid quote may include conditions, such as a period for acceptance. If adjustments are required, the desired or adjustable parameters may be further modified graphically, textually, etc. by directly entering data or information into the mobile device 106, for example, without reentering the previously entered data or information. Some native insurance shopping clients and/or quoting services server(s) 120 also enable prospects to compare plans, rates, and/or insurance carriers side-by-side (or between mobile screens). A summary may be saved in the mobile device 106, in virtual storage resources such as on-line cloud storage resources 108, or at the insurer's side 102 that may be further accessible through the mobile device's native application clients, a mobile Web browser, a browser-based Web application, or a desktop based Web browser, for example.

A native claims application client facilitates the initiation and capture of claim information, facilitates the evaluation of insurance claims, and provides access to external service providers (e.g., such as appraisers, repair shops, rental service providers, etc.). The claims application client may further support insurance agent referrals, roadside assistance, and the disbursement of payments to the mobile user. The claims application client may also support the dynamic or real-time rendering of mobile insurance identification cards or mobile insurance information cards that may identify the policy number, coverage period, names of the insureds, agent(s) (if applicable), and a description of the insured item (e.g., a vehicle description), for example, on demand via the mobile device 106 and in response to real-time data received form the claims services server(s) 122.

In some mobile devices 106, access—either by simply logging in (via a user name and password), or by identity validation through a facial recognition mobile application—may allow the mobile device 106 to identify some of or all of the details of the insured and/or insured items that are the subject of a claim. Once the insured item or object of the claim is identified, the mobile device 106 may display the insured items or items that may be associated with a user or another claimant. Some mobile devices 106 may access local or remote libraries (e.g., a collection of data and/or programs, routines, subroutines, etc.) to provide descriptions, graphical illustrations, or thumbnail images that may correspond to a possible insured item that is subject to a claim. The descriptions, illustrations, or images may be selected through requests to other server destinations or through an information gathering process. Information may be further gathered through a mobile implementation of a rich claim reporting system, like the systems described in U.S. application Ser. No. 11/803,932, which is herein incorporated by reference.

To gather more information, a fact gathering object may render a dynamic and/or static aural contextual query, written contextual query, graphical query, query screen, or initiate a user inquiry session to fill in one or more mobile templates. The templates may initiate an interactive, real-time, or near real-time interactive exchange with the insurer's side 102 to improve the fact gathering process that may be facilitated by a text-to-speech engine and/or speech-to-text engine. The mobile device's 106 sensors and functionality (e.g., sensors that may track velocity, time of day, location, etc., for example) may also allow the mobile user to capture information associated with a claim and quickly report a loss. Some fact-gathering objects configure the mobile device's 106 camera into a scanner. Mobile OCR software and optional geo-tagging software associated with or accessible to the fact gathering objects resident to the mobile device 106 may translate images—and in some systems, the geographical location of a scan—into a mobile device readable text to automatically prefill or suggest data to prefill one or more of the mobile templates, or may directly transmit the images, information, or data to the insurer's side 102. In another alternative, the fact gathering client may gather or harvest information resident to the mobile device 106 itself and other native mobile device clients or mobile web browser applications (e.g., other native software or internet applications that run on smartphones and other mobile devices) that are resident to the mobile device 106 that share data. Besides the insured or claimant's data, insured item data, and policy data, personal data, phone information, device identification, usage history, etc., may also be gathered from the mobile device 106 itself and transmitted to the insurer's side 102 during the claim servicing process. In some instances, the transmission and/or gathering of some or all of the data described herein may be communicated to an immediate response system. The immediate response system may interface with a claim representative or electronically interface with a navigation system (e.g., through geo-location data) and/or insurance response systems that are a unitary part of or interface with a mobile response vehicle, such as an immediate vehicle response vehicle. In some systems, the immediate response system and the in-vehicle system may comprise native applications (such as those described herein) resident to an insurance agent's mobile device or an insurer's representative's mobile device, such as a claim adjuster's mobile device. Some immediate response systems are configured to provide on-the-scene assistance, facilitate a full or partial settlement of claims, and/or facilitate the collection of information and data for claim adjustment purposes.

Some fact gathering objects may gather information or supplement the information gathered automatically. Some fact gathering objects may communicate directly or indirectly with the object of a claim. Through a local network, such as a personal area network that may include a high level of security, for example, the mobile device 106 may communicate directly with the focus of the claim (e.g., such as a vehicle) to capture claim based information. If the object of a claim is a vehicle, for example, the fact gathering object (resident to the mobile device 106) may gather information through a local network and one or more vehicle or in-vehicle systems, such as a vehicle's powertrain control module, body control module, entertainment and/or comfort module, for example, that may capture relevant data (e.g., time of day, location, speed, braking patterns, entertainment and comfort settings, etc.) before or after the occurrence of a loss. The data collected may allow the claims application client to carry out initial checks, trigger automated or manual follow-up processes, and report notice of losses through letters, data exchanges, call centers, wireless network exchanges, cellular network exchanges, Internet exchanges, etc. Some of the data may be fact-checked at the insurer's side 102 via the claims services server(s) 122 and/or mobile client side 104 to clarify the facts related to the claim, validate the policy and claim details, and determine whether the insurer must pay compensation. When fraud is suspected or found, the optional advanced analytics programmed within the mobile device 106 and/or insurance server(s) 116 may identify the suspected claims and route or flag those claim requests or submissions to an automated investigative processes or investigative node coupled to the system. Some mobile devices 106 and/or insurance servers 116 may be further linked via a network to third party insurance industry servers dedicated to identifying fraudulent claims in response to requests received from the mobile client side 104 or the insurance back end 102. The claims application client may also facilitate or complete the settlement of claims (e.g., a payment, a partial or full satisfaction, liquidation, etc.) when enabled by the insurance servers 116 to make payments to the policyholders or claimants, provide replacements for the damaged items, or arrange for the delivery of services by third party providers through the mobile devices 106, and in some applications, without the involvement of insurance personnel such as insurance agents or claims adjusters, for example (e.g., the native claims application client comprises a turnkey system).

Figure 5:
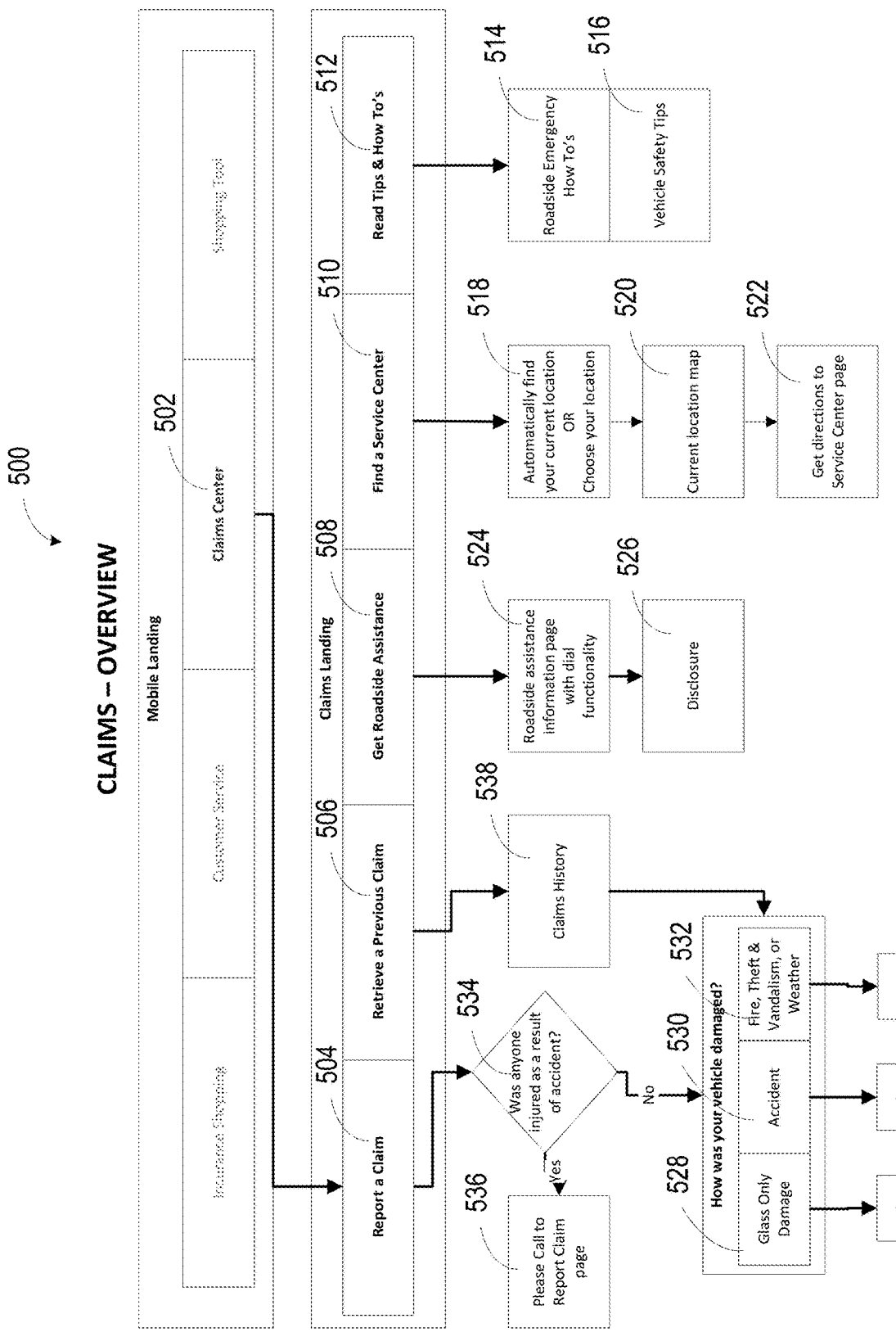
FIG. 5 is an exemplary flow diagram of a claims reporting process.

FIG. 5 illustrates an exemplary menu-driven fact gathering process used to gather claim related information. The exemplary menu driven process 500 may begin when a user enters the claim center 502 that comprises a graphical user interface that presents choices of commands, available options, and hyperlinks for reporting a claim 504, retrieving a previous claims 506 and 538, requesting roadside assistance 508, locating a service center 510, and information on roadside emergencies and vehicle safety 512, 514, and 516. When activated, such as when a user is interested in finding a service center 510, the native claims application client allows a mobile user to specify a location or find his or her current location through the mobile device's sensors and location services resident to and/or accessible to their mobile device 106. Once activated or selected 518, the mobile device 106 makes a request to the insurance servers 116 via interface 114. In response, the mobile device 106 may receive the geographic location of service centers in proximity to the specified or current location of the mobile device 106 that may include graphics and/or scripts 520 from the insurance servers 116 and/or other servers. Some mobile devices 106 map current mobile device 106 locations and service centers in a predetermined proximity or mobile user-defined proximity, and provide the option of receiving turn-by-turn directions to a referred or selected service center 522.

Roadside assistance 508 is also available through some claim landing screens. Information may be provided visually or aurally, and in real time or near real time that may reflect changing conditions or in combination depending on the nature of the request and/or available bandwidth 524 and 526.

When a claim is reported, a mobile user may elect to report a claim 504. In the exemplary menu-driven fact gathering process shown in FIG. 5, the process gathers information about how a vehicle was damaged 528, 530, and 532 asks if injuries occurred 534. If an injury occurred, the mobile device 106 may automatically initiate a telephone call to a call center or direct the mobile user to report the claim by telephone at 536.

Figure 6:
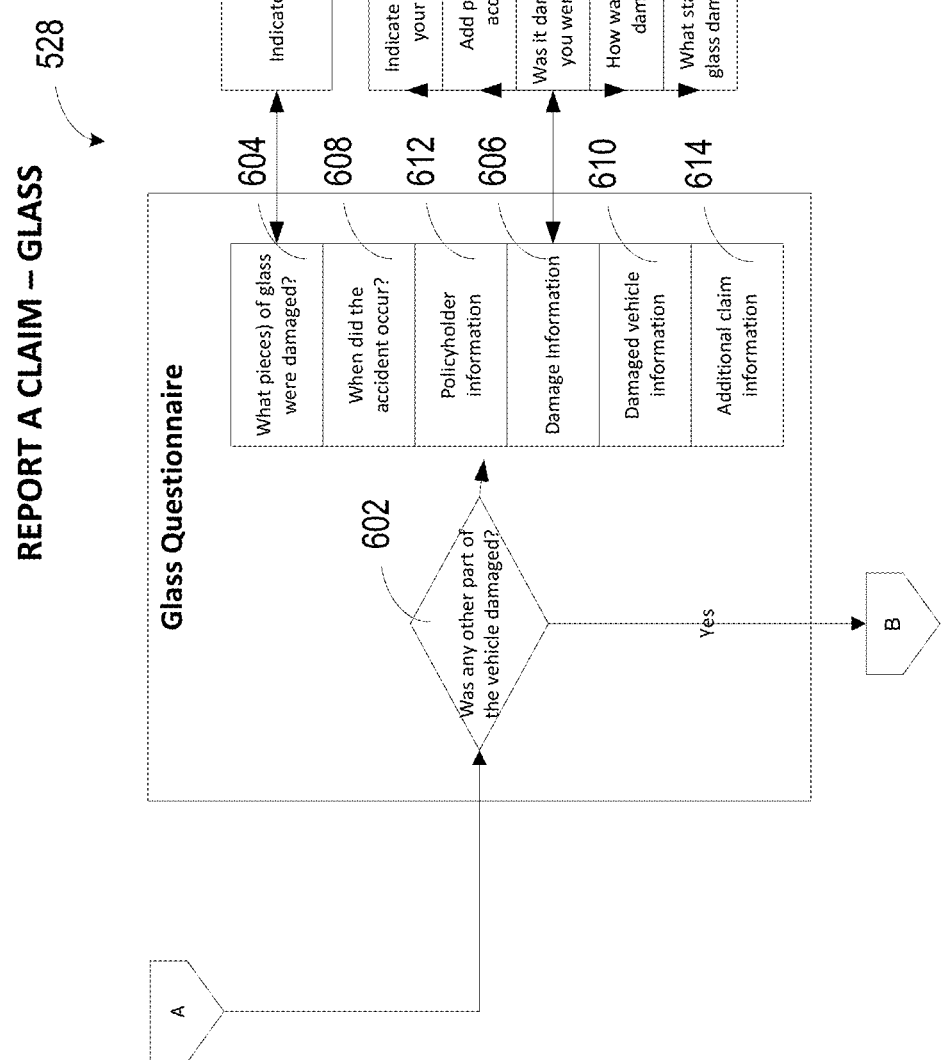
FIG. 6 is an exemplary flow diagram of a claims reporting process for glass.
Figure 7:
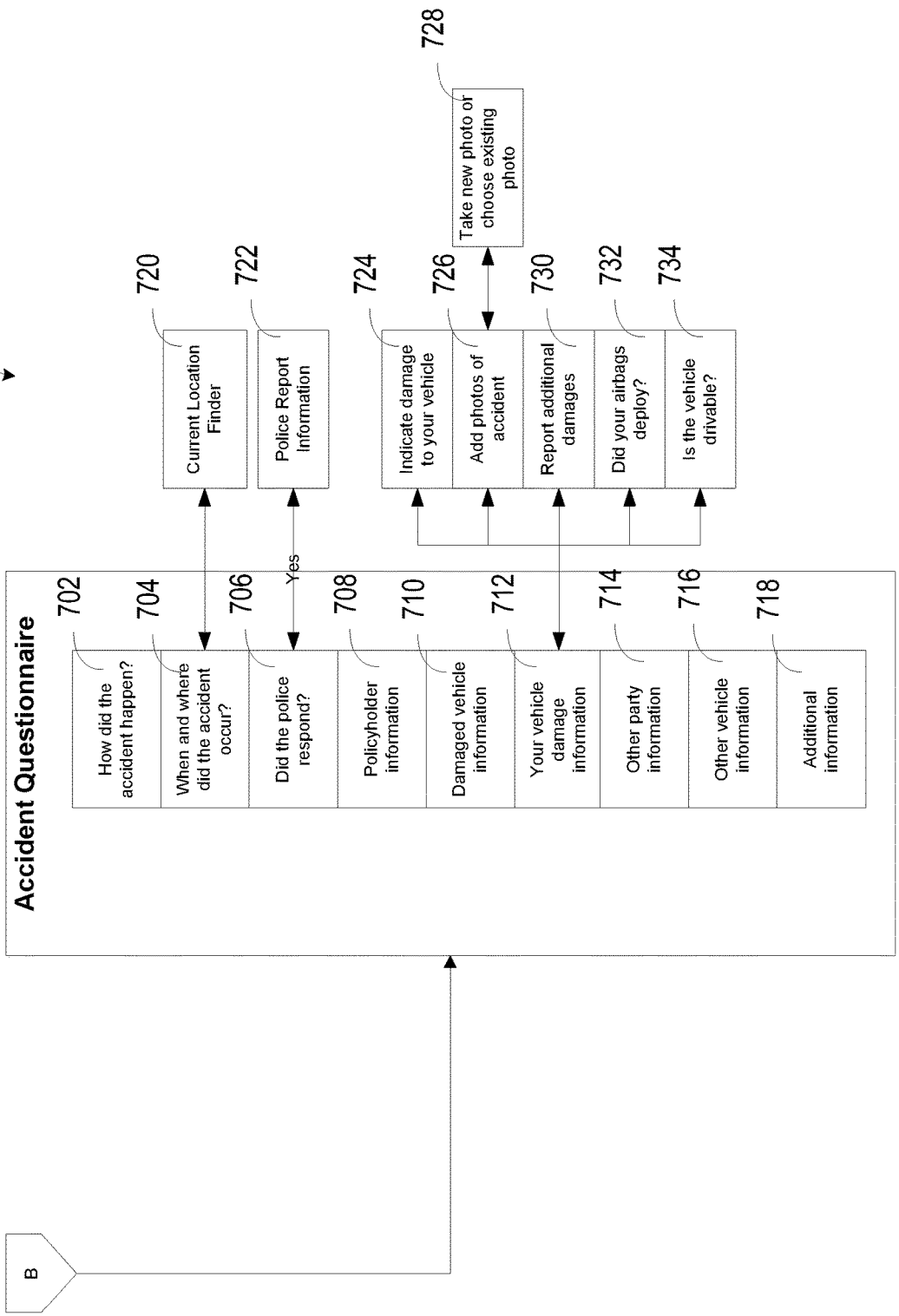
FIG. 7 is an exemplary flow diagram of a claims reporting process for an accident.

Menu choices in some graphical mobile user interfaces allow a mobile user to specify how one or more vehicles are damaged at 528, 530, and 532. If the damage is limited to glass 602 as shown in FIG. 6, information about the glass that was damaged 604, the severity of the glass damage 606, location of the accident 608, vehicle information 610, policyholder information 612, and additional claim information 614 may be gathered via the mobile device 106. Some claim application clients executed on a mobile device 106, such as those shown in FIG. 6, may solicit information through linked connections about damage to the vehicle 616, damaged areas to the glass 618, when the damage occurred 620, how the glass was damaged 622, and in what state the damage occurred in 624. Some menu choices allow mobile users to report damage through the mobile device's 106 camera, optional mobile OCR software, and may execute optional geo-tagging software that may identify not only the severity of the damage through pictures or video, but also the time of day, date and/or geographic location (e.g., longitude, latitude, address, city, state, etc. of where the damage occurred) 626. Other menu choices allow mobile users to select an existing photo or video to report glass damage 628.

When other portions of the vehicle are damaged 602, other menu choices rendered through the graphical mobile user interface of the mobile device 106 allow the mobile user to specify how, when, and where the accident occurred 702 and 704, indicate if the police responded to the accident 706, and allow the mobile user to enter or select policyholder information 708, vehicle damage information 710 and 712, other party information 716, other vehicle information 716, as well as additional information 718. In some systems, location services in the mobile device 106 may automatically identity the location 720. Some systems may access a native police application resident to or accessible to the mobile device 106 to request and submit police report information or details to the insurer's side 102 or rely on the optical camera and mobile OCR software resident to or interfaced to the mobile device 106 and optional geo-tagging software to capture all or a portion of the police report information 722. Other menu choices, such as those shown in FIG. 7, may solicit or receive information (e.g., in the form of text, photos, video, etc.) about the state of the claimant's vehicle, damage to the claimant's vehicle and the drivability of the vehicle 720-734.

Figure 8:
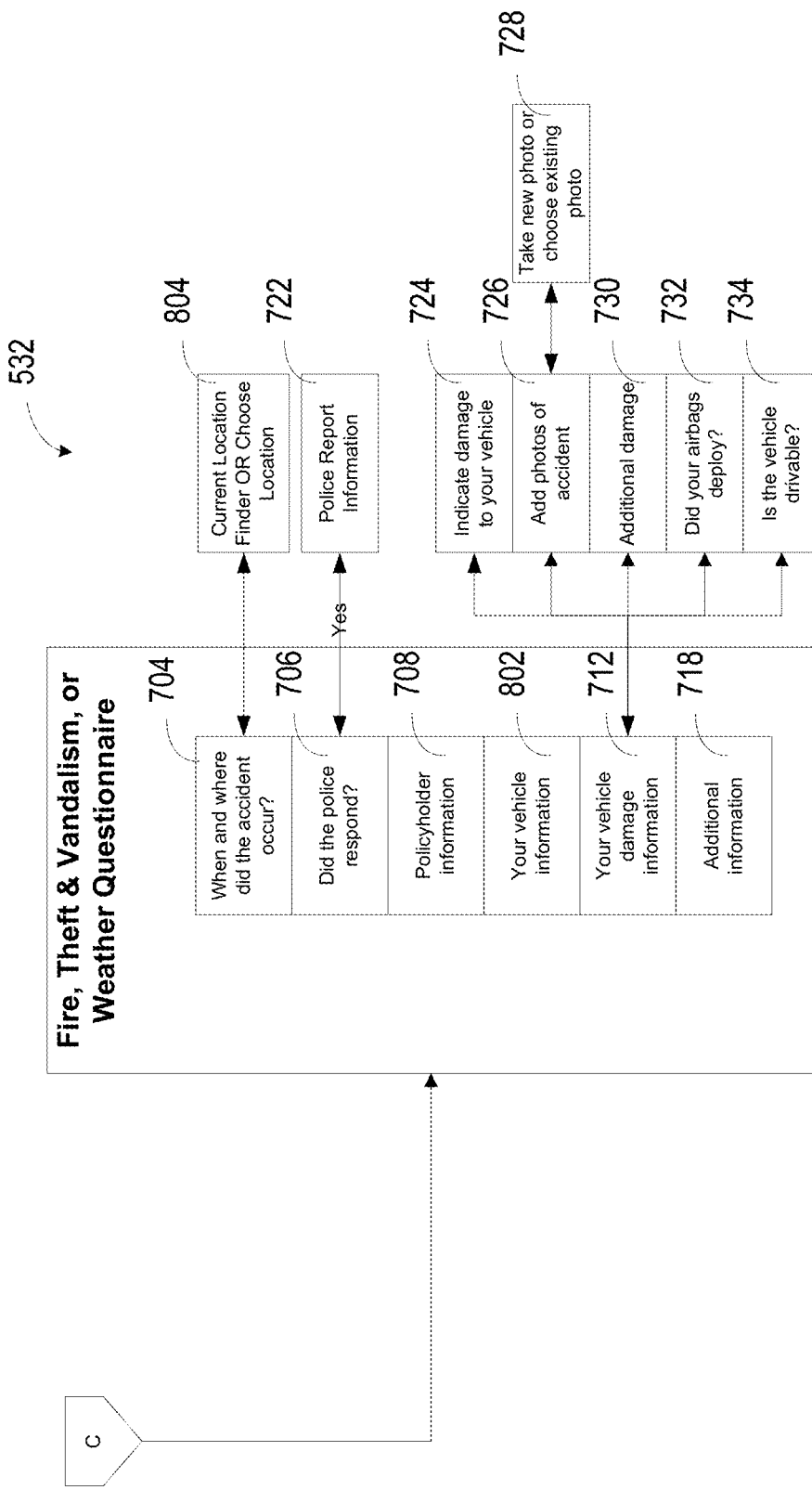
FIG. 8 is an exemplary flow diagram of a claims reporting process for fire, theft, vandalism, or weather.

Information about fire, theft, vandalism, or weather may also be solicited through menu-driven choices (or in the alternative, a command line interface) rendered on the mobile device 106 as shown in FIG. 8. The interface allows the mobile user to indicate when, and where, the accident occurred 704, indicate if the police responded to the claim 706, and allow the mobile user to enter or select policyholder information 708, vehicle information 802 and 712 and enter additional information 718. In some systems, location services in the mobile device 106 may automatically identify the location, or an intermediate menu allows a mobile user to select a location 804. Some systems access the native police application resident to or accessible to the mobile device 106 to request and submit police report information or details to the insurer's side 102 or rely on the optical camera and optional mobile OCR software resident to or interfaced to the mobile device 106 and optional geo-tagging software to capture all or a portion of the police report information 722. Other menu choices, such as those shown in FIG. 8, may solicit or receive information (e.g., in the form of text, photos, video, etc.) about the state of the claimant's vehicle, damage to the claimant's vehicle and the drivability of the vehicle 722-734.

Figure 9:
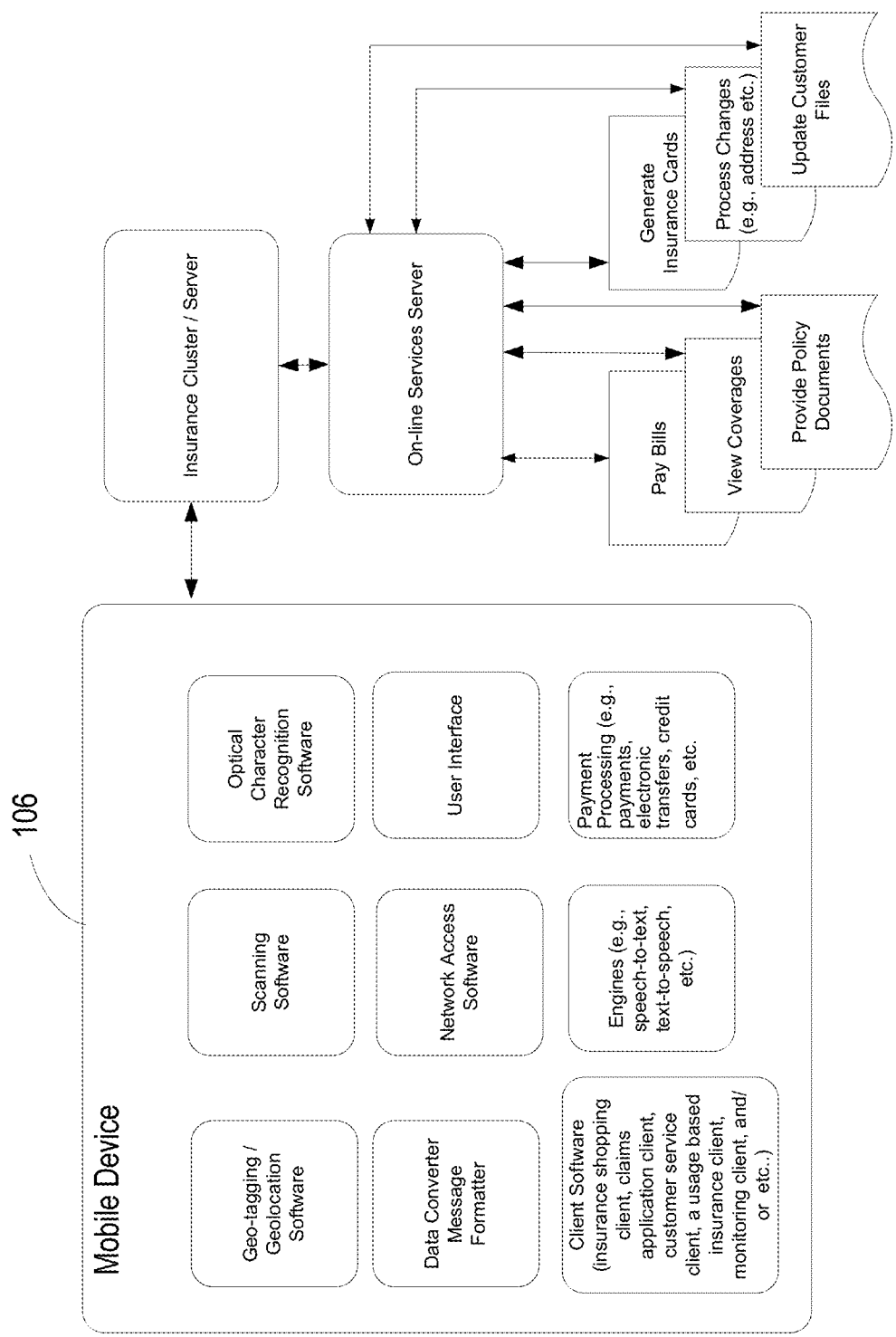
FIG. 9 is a block diagram of an exemplary mobile client device in communication with an on-line services client server(s) or server cluster.

A native customer service client shown in FIG. 9 may also be linked to the native application clients described herein, linked or hyperlinked to the native application clients described herein or other native application clients or web applications, or may comprise a separate standalone native application. Through communication with one or more of the insurance servers 116 and/or on-line services server(s) 124 shown in FIG. 1, mobile users may view and update some or all existing insurance policy information, parameters, or attributes thereof. The native customer service client may include a retrieval object that may locate and retrieve information requested by a mobile policyholder from insurance server(s) 116 and/or on-line services server(s) 124 and displays the information to the policyholder via interface 114 and mobile device's display. A mobile-friendly interface (e.g., a toolbar, dialog box, other graphical user interface, or other application) may guide the mobile user through various mobile application functions that are rendered through the execution and processing of billing objects, payment objects (e.g., enable payment and or real-time or delayed verification via a credit card, on-line check, electronic fund transfers, etc. at the mobile device 106), insurance policy objects (e.g., enables the viewing of coverages, viewing of policy documents, etc.) state specific (e.g., territories such as Ohio, Wisconsin, etc.) contract information objects, quoting an endorsement for vehicle replacement objects, address and/or other demographic change objects (e.g., process insurance policy changes, update insurance customer's electronic files, update prospect electronic files, etc.). The customer service client may display the premium amount and variance on the mobile device 106 and update the mobile user's files on the insurer's side 102 at the mobile customer's request, without need for personal handling (or any handling for that matter) by an individual representative of the insurer or an independent insurance agent. Information transmitted to the mobile customer may be specific to that customer's existing insurance policy and may be maintained and transferred/viewed via a secure interface 114, secure insurance servers 116, secure clusters, etc. to maintain exclusive personal confidentiality between the mobile user and insurer (e.g., it may exclude access to others who are not the mobile user such as a prospect/insured and the insurer). Non-confidential information may also be provided through unsecure interfaces, networks, and servers. Some native customer service clients provide on-device viewing and updating of the mobile user's existing information and facilitate real-time updating of some or all of the insured's insurance policy parameters and provide functionality that implements policy changes on-request (e.g., in real-time, after minimal delay, etc.). Like some native claims application clients, some native customer service clients also support the dynamic or real-time rendering of current up to the minute mobile insurance identification cards or mobile insurance information cards (e.g., insurance cards) that may identify the policy number, coverage period, names of the insureds, agent(s) (if applicable), and a description of the insured item (e.g., a vehicle description) on demand. Such real-time mobile insurance identification cards or mobile insurance information cards may discourage or prevent fraud by further ensuring the integrity of the rendered information.

Figure 10:
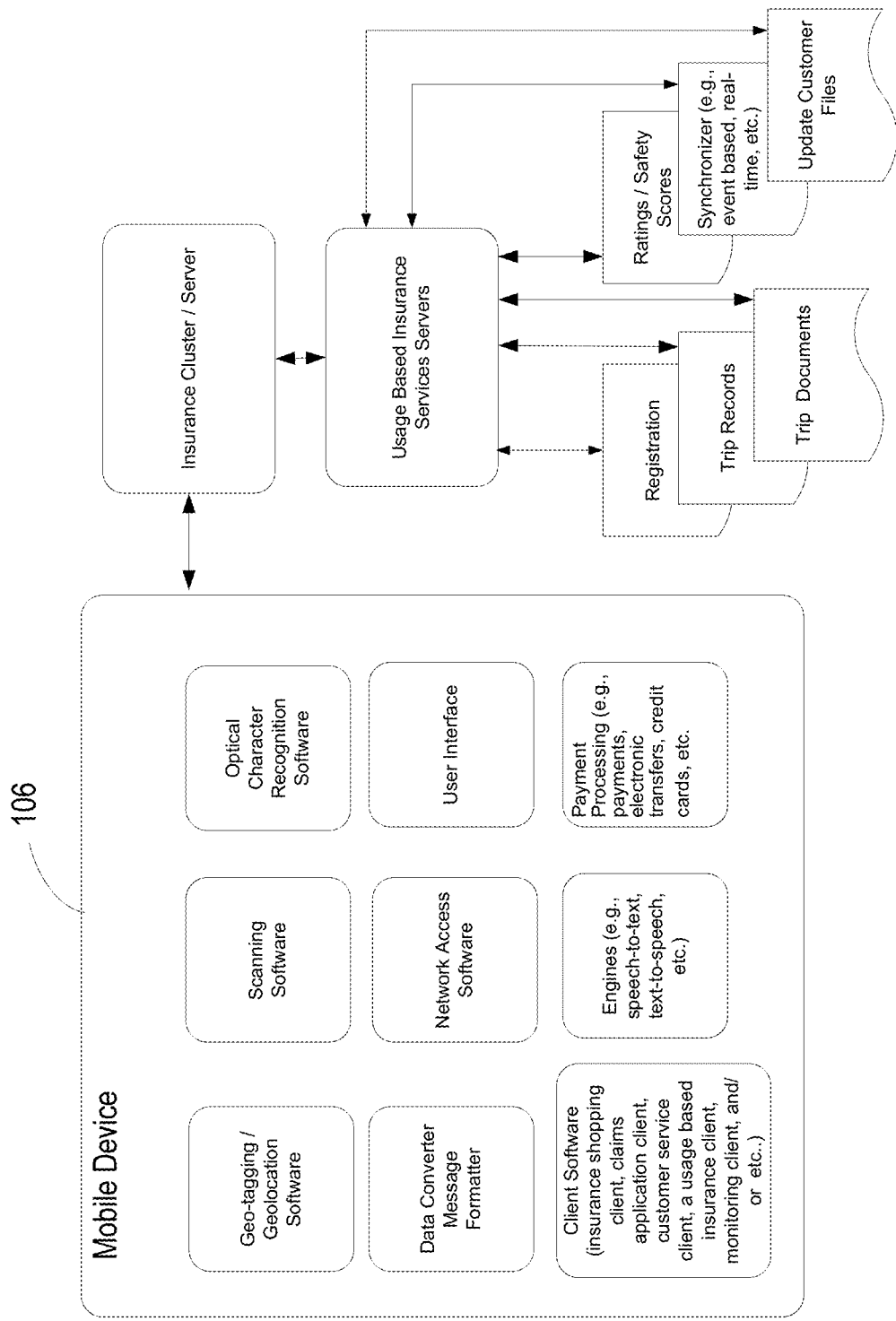
FIG. 10 is a block diagram of an exemplary mobile client device in communication with usage based insurance services server(s) or server cluster.

A usage based insurance client shown in FIG. 10 may also be linked or may be a unitary part of one or more of the native application clients described herein, linked or hyperlinked to the native application clients described herein or another native application or Web application, or may comprise a separate standalone native application. The usage based insurance client may monitor and record some or all of the outputs of sensors that are integrated within or are a unitary part of the mobile device 106 to assess a level of risk or determine a price or cost of insurance (e.g., an insurance premium, an insurance deductible, etc.), or a discount to a price or cost of insurance and/or a surcharge to a price or cost of insurance. Through a personal area network that may include a high level of security, such as a Bluetooth® network, some mobile devices 106 may also monitor, or in the alternative exclusively monitor one, two, or more in-vehicle operating sensors (e.g., physically or wirelessly linked to a physical or virtual vehicle data bus). The data may be transmitted from in-vehicle OEM (Original Equipment Manufacturer) processors that manage powertrain, safety, entertainment, comfort, or ancillary in-vehicle and out of vehicle operations, etc. Such data elements may be communicated directly to the mobile device 106 (e.g., from the in-vehicle sensors), or from the in-vehicle OEM or out-of-vehicle processor(s) through a physical or wireless network that may interface an in-vehicle data bus or one or more in-vehicle processors.

The mobile device 106 may detect and synchronously or asynchronously monitor and store (locally on the mobile device side 104, the insurer's back end 102 and/or on-line cloud storage resources 108) data or output generated by its own or interfaced sensors (such as in vehicle-sensors) that may include any one or any combination of devices that detect and/or measure something such as: miles driven; types of roads driven on via the location services in the vehicle or mobile device 106 (high risk vs. low risk) and third party databases (such as those available through Skyhook® located in Boston, Mass.); speeds driven, safety equipment used, such as seat belt and turn signals, time of day, week, month, date, driven; rate of acceleration, rate of braking (or deceleration), observation of traffic signs (signals); traffic conditions (high congestion vs. low congestion); road conditions; acceleration events; deceleration events; force/lateral acceleration or characteristics that indicate a hard turning maneuver; temporal characteristics (e.g., period of time an ignition is active or internal power bus is sustained), Revolutions Per Minute or RPM, transmission setting (Park, Drive, Gear, Neutral, etc.), throttle position, engine coolant temperature, intake air temperature, barometric pressure, manifold absolute pressure, oxygen sensor, coolant sensor; entertainment status (e.g., visual or audio systems integrated or interfaced to vehicle); brake light on, turn signal indicator, headlamps on, hazard lights on, back-up lights on, parking lights on, wipers on, doors locked, key in ignition, key in door lock, horn applied, battery voltage, Information from body sensors, airbag deployment, ABS application, level of fuel in tank, brakes applied, accelerator applied, radio station tuned in, seat belt on or off, door open, tail gate open, odometer reading, cruise control engaged, anti-theft disable, occupant in seat, occupant weight, accelerator/brake pedal depression (e.g., measured in degrees or force applied) accessories (e.g., mirror settings, dash light status, etc.,) vehicle location (e.g., navigation related information), date, time (such as, Greenwich Mean Time), vehicle direction, IVHS data sources (e.g., wide-area Intelligent Vehicle Highway Systems), pitch and/or roll, relative distance to other objects, vehicle in skid, wheels in spin, closing speed on vehicle in front, closing speed of vehicle in rear, closing speed of vehicle to side (right or left), space to side of vehicle occupied, space to rear of vehicle occupied, space to front of vehicle occupied, lateral acceleration, rotation of vehicle (e.g., sudden), loss of tire pressure (e.g., sudden); driver identification (e.g., through voice recognition, code, fingerprint, retinal, or other recognition); distance traveled; vehicle speed in excess of speed limit; observation of traffic signals and signs; relative braking or acceleration or deceleration events; road conditions; traffic conditions; vehicle position. Ignition On/Off (e.g., may measure length of time an ignition switch is activated); acceleration thresholds, velocity thresholds; elapsed time; battery voltage levels; vehicle operating conditions (e.g., system health), traction, location and geo-fencing; remote activation; vehicle motion, clutch engagement or disengagement; power bus activation (may measure the length of time power is sourced to a bus or a conductor), seat belt use, vehicle orientation, etc.

Some usage based insurance objects that may in part comprise the native usage based insurance client may store usage based data on the insurer's side 102 through the insurance servers 116 or clusters or usage based insurance services server(s) 124 or clusters synchronously or asynchronously. The insurer side 102 may also store data in memory accessible to one or more database servers 110. The insurer side 102 may process the data exclusively or with other data previously entered into or accessible to the insurer's side 102 or insurance servers 116 or clusters or usage based insurance services server(s) 124 to render one or more insurance ratings (e.g., a position assigned on an insurance scale), safety ratings, insurance scores, and/or driver scores. A safety score may comprise a value computed by one or more insurance companies or on behalf of one or more insurance companies that represent, or represents in part, the probability of an insured filing a claim during the insured's insurance coverage period. The safety score may be based on usage based driving data exclusively in some systems, and in other systems, may be based on a combination of data that includes a driver's usage based driving data and one or more quantifiable or measurable parameters of that driver. A measurable parameter may comprise an insured's or claimant's credit rating, for example.

In alternative systems, the mobile device 106 may process the monitored data elements to derive one or more insurance ratings, safety ratings, insurance scores, and/or driver scores that may be retained in the mobile device's memory or in the on-line cloud storage resources 108. The data may be uploaded through the interface 114 and a wireless and/or cellular network, and in some instances, may be rendered on the mobile device 106 display that may display or render the data locally or may transmit the data to a remote node or destination. In some systems, mobile device 106 data or vehicle provided data is stored and transmitted in response to the completion of a vehicle event or mobile device 106 event (e.g., an event may be the initiation or completion of a significant occurrence). When an event occurs, some mobile devices 106 may transmit data upon the occurrence of the event. For example, when an airbag deploys, data may be delivered to the insurance servers 116 as the airbag is deployed (e.g., in real-time) or after a minimal delay. The insurer servers 116 may communicate or attempt to communicate with the mobile device 106 when the data is received or upon the occurrence of the airbag deployment (e.g., the event). If communication between the insurance servers 116 or clusters fails, the insurance servers 116 or the mobile device 106 may contact or initiate contact with emergency medical and/or police services automatically, and in some systems, automatically transmit the location (e.g., latitude and longitude), time of day, date, and other relevant data about the event to the emergency medical and/or police services.

FIGS. 11-16 illustrate exemplary screens that the usage based insurance objects resident to the mobile device 106 may render. Some mobile interfaces (e.g., a toolbar, dialog box, other graphical user interface, or other application) may guide the mobile user through various mobile application functions that are rendered through the execution and processing of registration objects that include or support a quick-fill object that may automatically prefill or suggest data to prefill forms or dialog boxes and may list options in which mobile users can make selections, usage based monitoring objects that track actual driving behaviors, display objects, and mobile utility objects that may upload data or trips and remove data from the mobile device 106.

Figure 11:
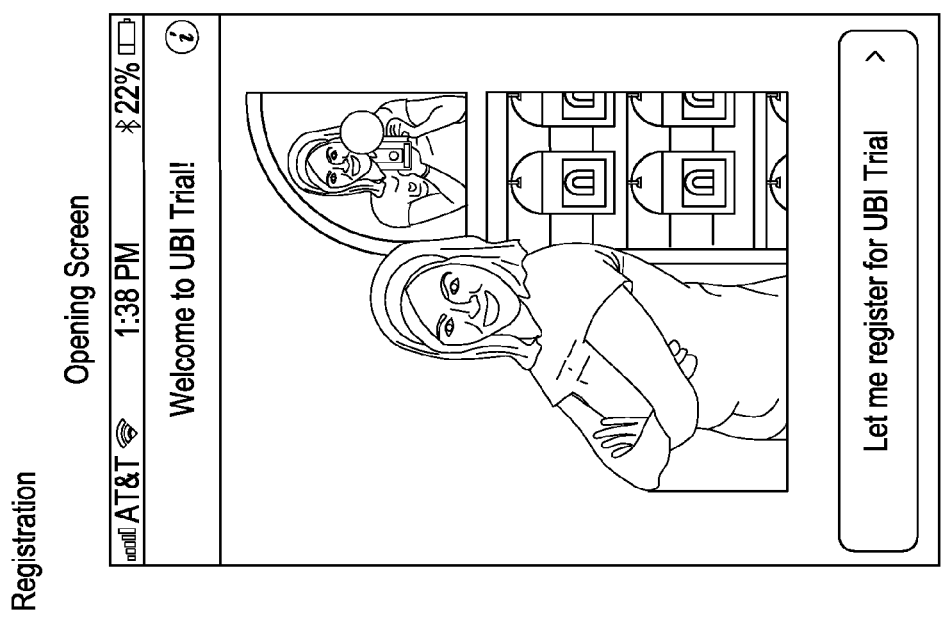
FIG. 11 are exemplary opening screen and registration screen that may be rendered on a mobile device.
Figure 11:
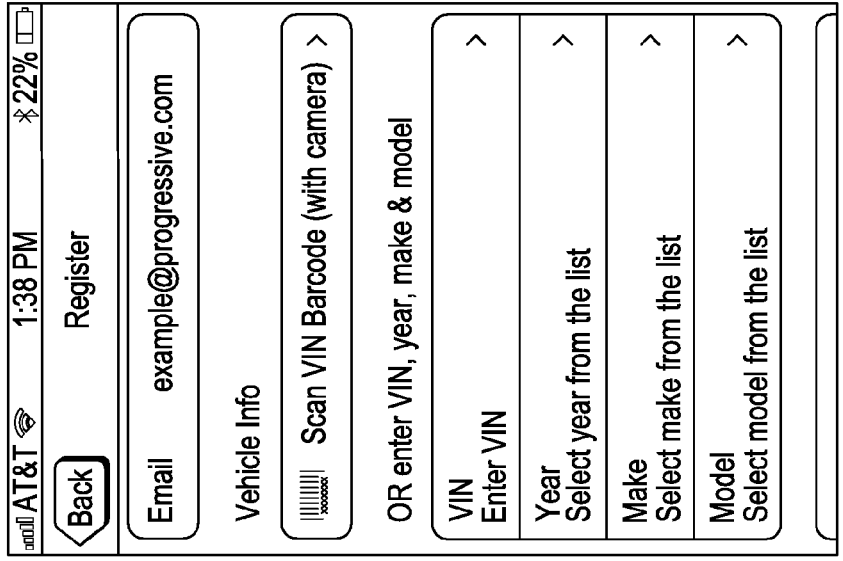
Figure 12:
FIG. 12 are exemplary screens of a vehicle identification number bar code and the rendering of a scan through the mobile device.

The registration objects that may render the exemplary screens of FIGS. 11 and 12 may gather the information needed to monitor a driver, such as vehicle data (that may include year, make, model/sub-model, vehicle identification number or VIN, for example) through mobile templates or dialog boxes resident to the mobile device 106. The information may be gathered or supplemented automatically through one, two, or more sensors built into the mobile device. Some insurance shopping client objects configure an optical camera of the mobile device 106 into an optical scanner. Mobile OCR and optional geo-tagging software associated with the usage based insurance objects resident to the mobile device 106 (or in the alternative, provided though a metered service over a network, like the Internet, through cloud computing resources 108, or resident to the insurer's side 102) may translate the identification characters (or vertical bars of differing widths if the scanning a bar code, such as a Code 39 bar code associated with a VIN, Q.R. codes, etc.), and in some systems the geographical location of the VIN, into a computer/mobile device readable text that allows a quick-fill object to prefill or suggest data to prefill one or more mobile templates or dialog boxes. In the alternative, the data may be directly transmitted to the insurer's side 102. Some registration objects may gather the information through top-level and/or intermediary menus that provide a list of options when the mobile user makes a selection.

Some registration objects may communicate directly with the vehicle that may be the focus of the monitoring. Through a personal area network that may include a high level of security, such as a Bluetooth® network (e.g., that may encompass the wireless specification defined by IEEE 802.15, 802.15.4 (TG4), 802.15.3 (TG3), or other standards), for example, the mobile device 106 may communicate directly with the vehicle to capture the vehicle's VIN, and in some systems, supplement the VIN identification with personal information and/or usage based information resident to the vehicle's powertrain control module, body control module, entertainment and comfort module, and/or other in-vehicle system and/or other data descriptive or associated with the vehicle.

Figure 13:
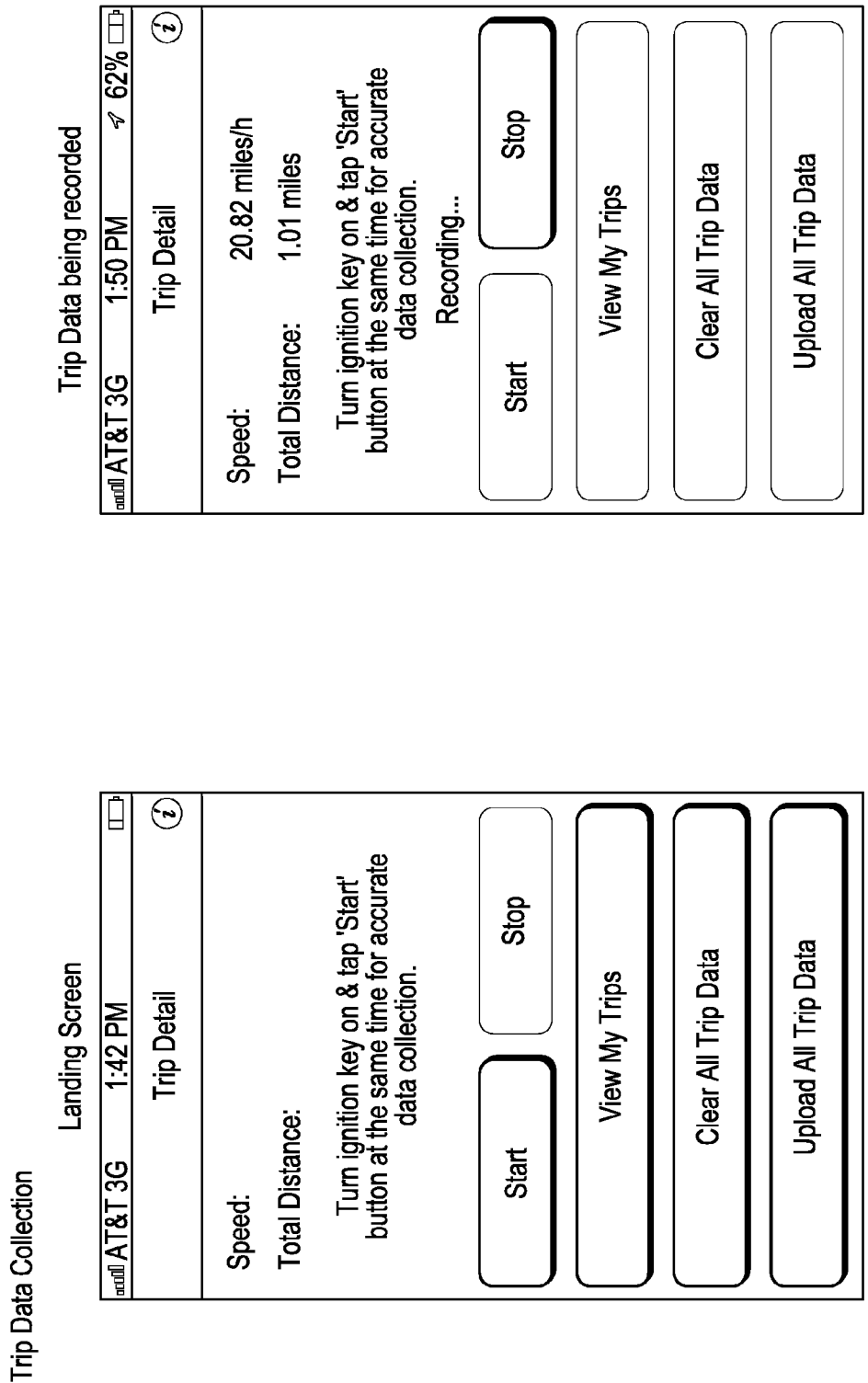
FIG. 13 are exemplary landing and trip data screens that may be recorded on the mobile device.

The landing screen and trip data recorded shown in FIG. 13 may be rendered through the usage based monitoring objects that track actual driving behaviors and display objects that generate the images or video sent to the mobile device 106 display. As shown through the exemplary screens, data may be stored or processed in relation to a predetermined time period, the occurrence of an event, or a trip. A trip may start when motion is detected (such when the mobile device 106 detects speed or acceleration above a predetermined threshold), in response to a mobile user's voice or manual command, or when a vehicle state changes. Vehicle state changes may occur when a vehicle ignition is turned on, communication occurs on one or more vehicle or in-vehicle buses, vehicle voltage exceeds or falls below a programmable threshold, etc. that may be automatically detected by the mobile device's 106 via a communication link with the vehicle. A trip may end when motion ends, vehicle state changes (e.g., when the ignition of the vehicle is turned off or when data, such as speed data, is not detected or no communication occurs on one or more vehicle or in-vehicle buses within a programmable time period, or vehicle voltage falls below a programmable threshold, or in response to an insurer's, mobile user's or other's physical, aural, or gesture command). In alternative mobile devices 106, one or more combinations of these conditions may identify trips (e.g., a beginning and/or end of a trip).

Figure 14:
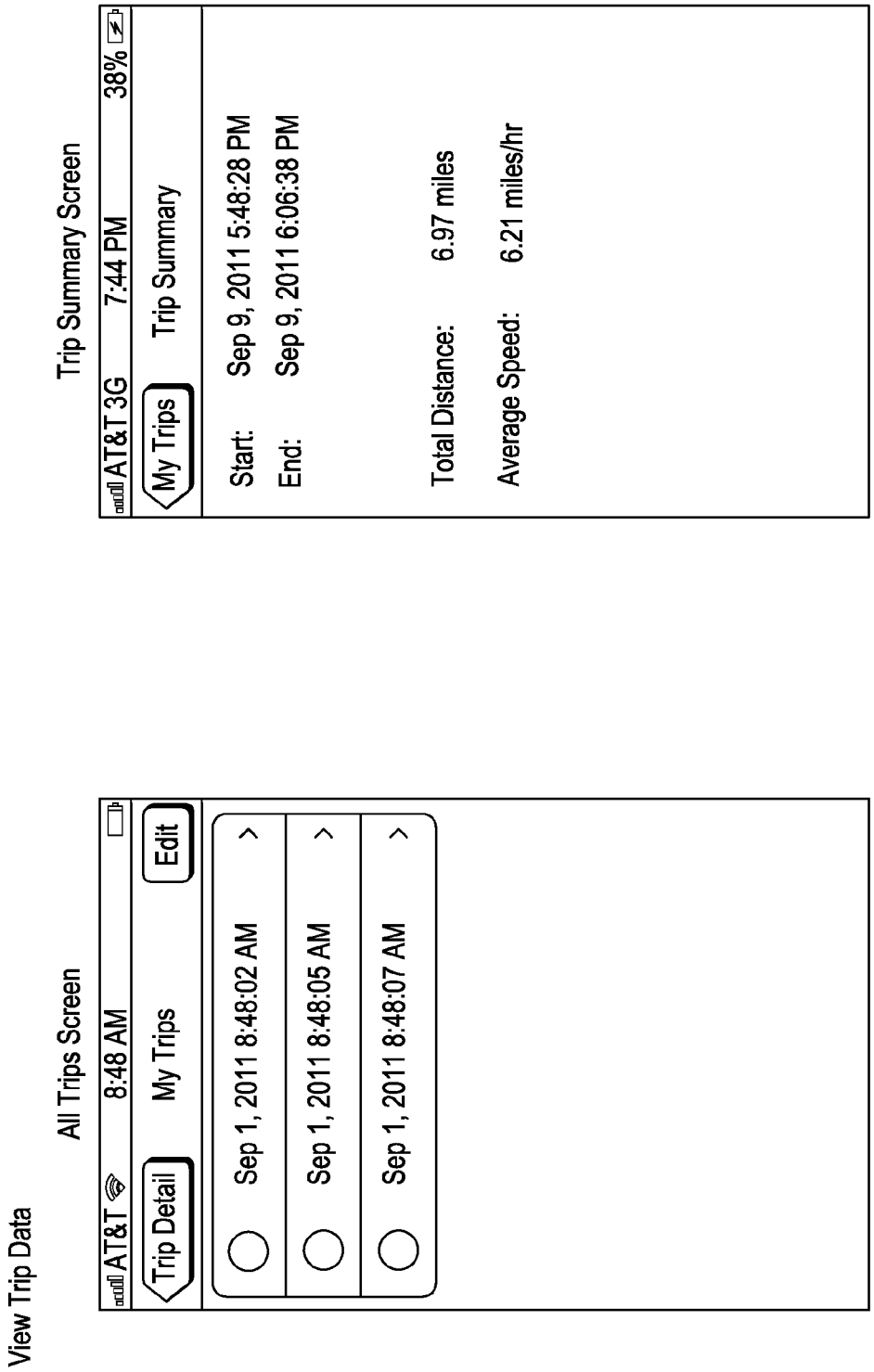
FIG. 14 are exemplary all trip screen and trip summary screen that may be rendered on the mobile device.

In some mobile devices 106, usage based monitoring objects and/or display objects may allow mobile users to review trips as shown in exemplary screens shown in FIG. 14. The content may indicate how the usage based recorded data may affect a prospective and/or retrospective cost of insurance (e.g., a surcharge and/or discount applied to an insurance \ premium for a future and/or past insurance period). For example, the usage based monitoring objects and/or display objects may display or aurally convey the mobile recorded data with a message indicating that a projected discount (e.g., a three percent discount) may be available if the data is transmitted to the insurer's side 102 or another service provider's destination. Additionally, or alternatively, the usage based monitoring objects and/or display objects may automatically highlight portions of the monitored data (e.g., alter the appearance of the display or alter the tone, pitch, and or volume of aural conveyance to call attention to them) that may qualify the mobile user for additional discounts or surcharges or highlight driving data that may be subject to a surcharge. These display highlights may be explained through a hyperlink to other screens or audio options that may not be visible or heard by the mobile user until the completion of the message.

In some mobile devices 106, usage based monitoring objects and/or display objects may allow mobile users to review recorded data about one or more aspects of vehicle operation and allow users to compare operational behavior to the operational behavior of others. For instance, a mobile user's recorded data may be compared against an average or aggregate set of data received from other mobile users. Statistical or other comparisons may be made. These comparisons may compare a mobile user's usage based data to an average or aggregate of some or all parties who have uploaded data, an average, or aggregate of data provided by operators with similar demographics or characteristics (e.g., age, sex, location, etc.), an average or aggregate of data provided by parties associated with similar machines (same model car, same model milling machine, same size heat treating furnace, same model tractor or same model combine) or a combination of other classes of data.

Figure 15:
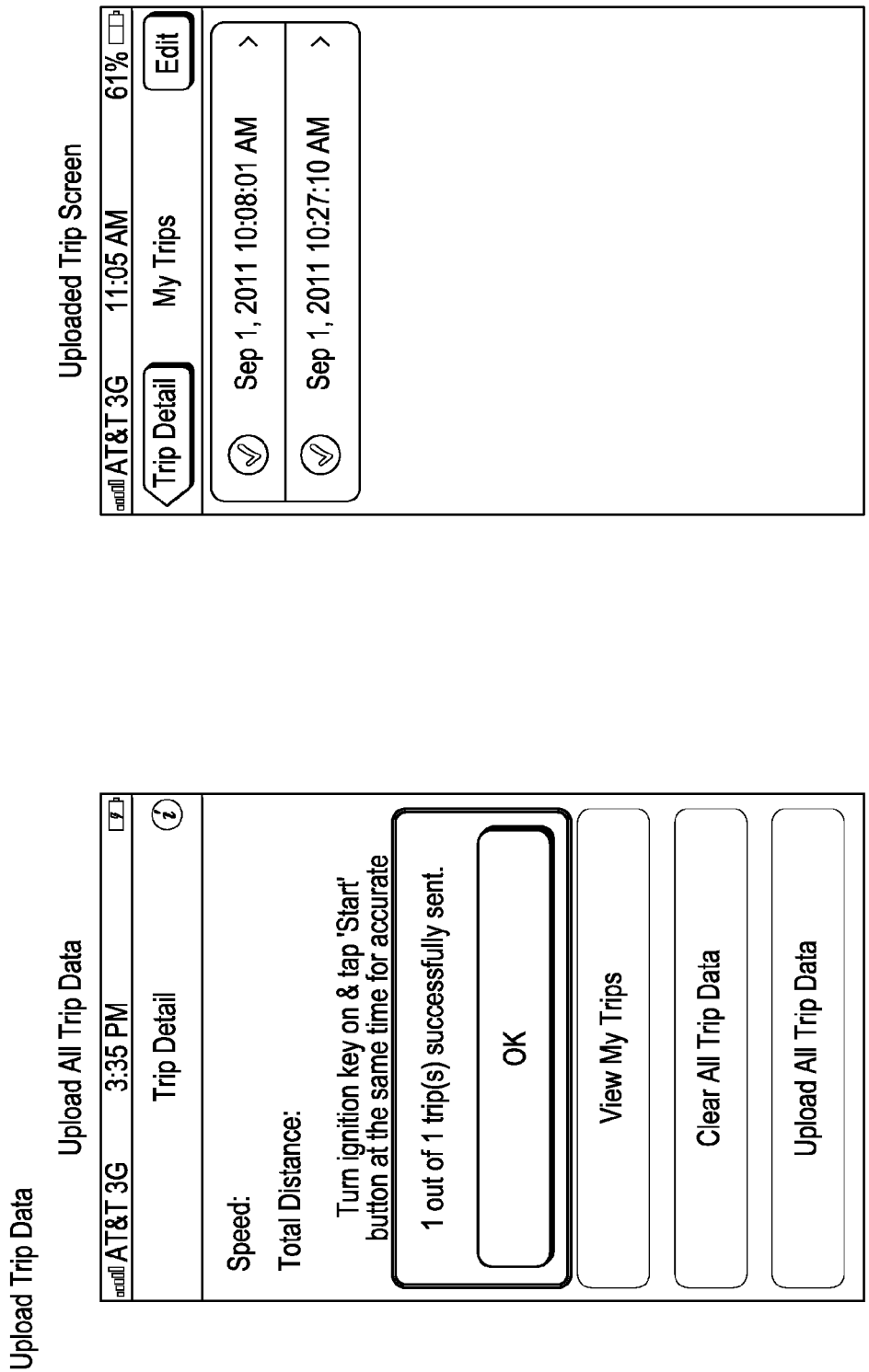
FIG. 15 are exemplary upload all trip data and the upload trip screens that may be rendered on the mobile device.
Figure 16:
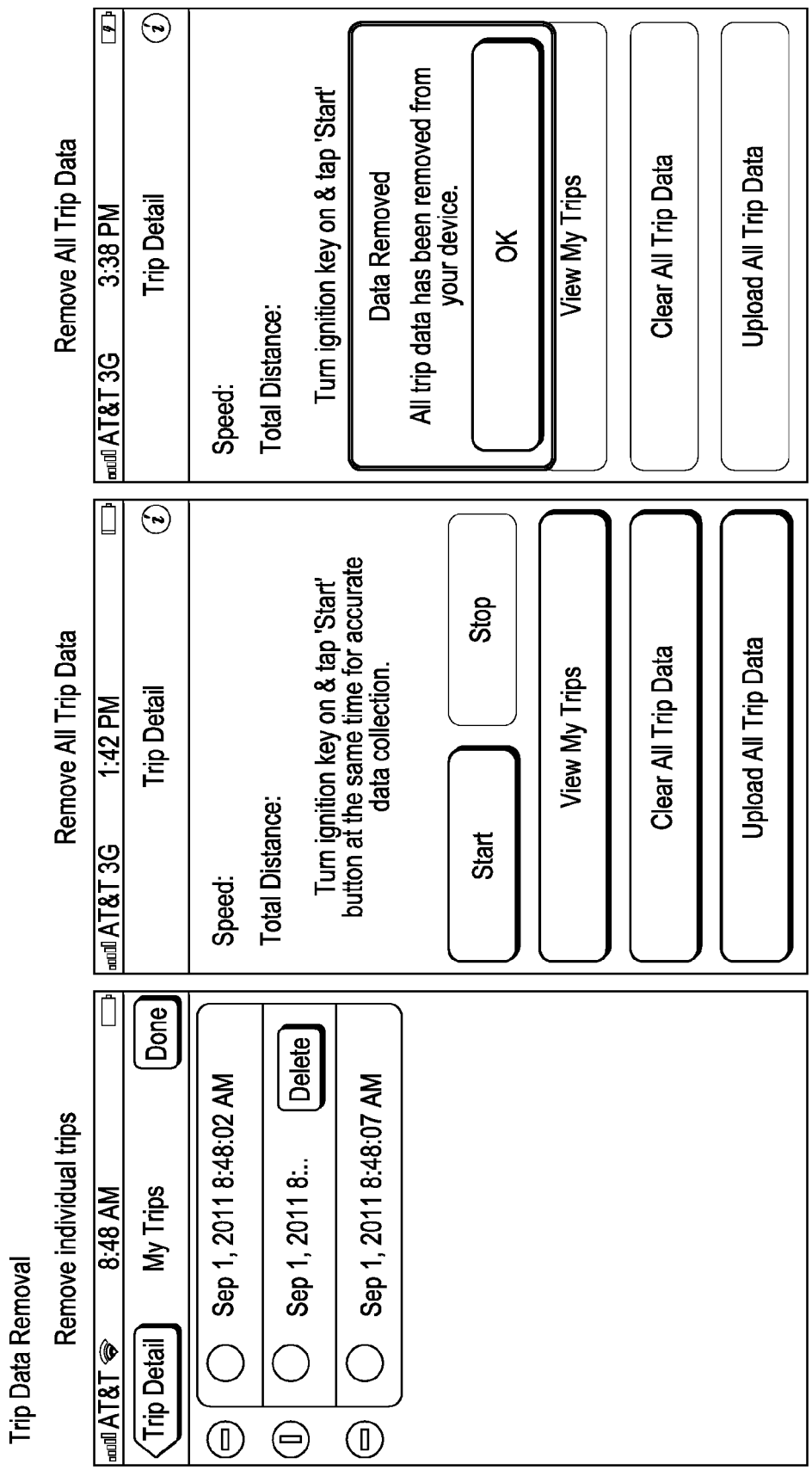
FIG. 16 are exemplary remove individual trips and remove all trip data screens that may be rendered on the mobile device.

As shown in FIGS. 15 and 16, mobile utility objects resident to the mobile device 106 may enable mobile users to upload data or trips on command or automatically, and remove data from a mobile device 106. A cellular or wireless transceiver within the mobile device 106 may transfer the recorded information, or a copy thereof, from the mobile device 106 to a device or destination, such as those shown on the insurer's side 102. Alternatively, complimentary or backup connections may be made by devices compliant with wireless mesh networks, or public networks such as Wi-Fi (e.g., 802.11b/g/n), or other wireless networking or communication technology through the synchronization objects. Data transfer may occur automatically or in response to mobile user commands. When a transfer occurs, a mobile user may be rewarded with a discount for transmitting the data to a remote destination, such as an insurer's server(s) 116 or cluster. The data may indicate that a mobile user is entitled to an additional premium or deductible discount for some monitored driving behavior and/or subject to a surcharge for other monitored driving behavior. If a mobile user is not an existing insurance customer, an insurance quote may be transmitted to the mobile user through the insurance shopping client resident to the mobile device 106 as described above.

Each of the native application clients described herein may be encompassed within or interface with an insurance agency management native application client resident to the insurance agent's mobile device 106 (with the exception of providing access to data, quotes, applications, etc. that the mobile user and/or insurer designated as confidential between the originator and receiver). Using insurance agency management native application clients, insurance agents may gain access to all of the functions and systems described herein and above and objects that allow insurance agents to access a portion of or the entire insurance agent's book of business, receive mobile insurance management tools that facilitate the management of existing clients and capture of new business, gain access to insurance reports including reports directed to the insurance agent's own clients, manage agent commissions, collaborate with other insurance agents, etc. Other functionality may allow insurance agents to download (from the insurance server(s) 116 and/or other servers) and transmit insurance carrier brochures, links to mobile insurance applications that facilitate faster turnaround and improved quoting and purchasing accuracy, automatic real-time or near real-time insurance rate updates and insurance rate comparisons that may compare insurance plans, insurance premiums, insurance deductibles, and insurance carriers side-by-side.

Some insurance agency management native application clients resident to the insurance agent's mobile device 106 include insurance agent interfaces (e.g., hardware and/or software) that may be preconfigured or allow insurance agents to customize the insurance agent interfaces. A customization may allow more data and/or items to be selected or commands executed without requiring the insurance agents to make multiple or rapid selections and/or activations of programs and/or links. The customizable insurance agent interfaces and other preconfigured user interfaces (that are not exclusive to insurance agents) may be linked to management objects that render reminders such as birthdays, anniversaries, renewal dates, etc. of the party or parties associated with a task and/or data (e.g., an insured's or prospect's data). Some interfaces may automatically connect the insurance agents to their customers, clients, prospects or insurance companies through communication media and/or interactive connections. Some communication and/or connections may include electronic mail and/or text messaging such as a short message (or messaging) service. Some communication and/or connections facilitate access to one, two, three or more social networking Web sites, social media sites, and/or social networking profiles to enhance communication or provide access to other communication channels that provide access to customers, users, and/or insurance prospects to support or facilitate some or all of the processes and systems described herein. The communication and/or connection hardware and/or software may process presence information on the mobile network and in some applications presence information on social networking Web sites, social media sites, etc. The presence information may comprise a status indicator that conveys the ability and willingness of a potential communication with a desired insurance customer, user, and/or prospect. Some communication and/or connection hardware may be programmed and/or configured to process presence information that may identify personal availability (e.g., such as processing personal availability records or presentity data) and/or may be programmed and/or configured to notify one or more insurance agents when a desired insurance customer's, user's, and/or prospect's presence state changes (e.g., a desired insurance customer, user, or prospect becomes available) that may also indicate the insurance customer, user, and/or prospect's willingness to communicate.

Each of the systems and applications described above may provide real-time alerts for mobile users and insurance agents. The alert may comprise a short message service, an email feature, tactile feedback, or other functionality that sends voice, graphics, and/or textual messages (e.g., audio, visual, vibration) to mobile insurance customers and insurance agents. Some real-time alerts are accessible through a native application client object or through a Web browser via a Web page that may display the status of the issue that is being monitored. For example, if an insurance claim is being monitored, the alert may be accompanied by claim details, and/or contact information. In some native insurance application clients, the mobile users may monitor claims through one or more screens and have the ability to change how, when, and/or where the mobile user is to be notified. The mobile screens may provide access to information on mobile user policies, policy payments, documents, policy changes (made or may be made), insurance claims, and information about the insured item.

Each of the systems and native application clients illustrated or described may linked to a native mobile user monitoring client. The native mobile monitoring client may supplement the information captured by the native application clients by gathering additional information about the mobile user. The native mobile monitoring client may enable the mobile device 106 to access or record the mobile user's activities, such as the time spent on the telephone during an insured activity (e.g., while driving), the number of messages processed through the mobile device 106 during an insured activity, Websites visited through the mobile device 106 during the insured activity, software run on the mobile device 106 during the insured activity, emails and messages sent through the mobile device 106 during an insured activity, etc.

While each of the native application clients and objects may stand alone or may be encompassed within the other systems and applications, native application clients and objects may also be linked or comprise a unitary part of one native application client on the mobile device 106. Other alternate systems may include any combinations of structure and functions described above or shown in one or more or each of the figures. These systems or methods are formed from any combination of structure and function described.

Some systems may include devices such as servers that comprise computers and/or programs stored on a non-transitory media that respond to commands, events, actions, and/or requests. When such devices are responsive to such commands events, and/or requests, the actions and/or steps of the devices, such as the operations that devices are performing, necessarily occur as a direct or indirect result of the preceding commands, events, actions, and/or requests. In other words, the operations occur as a result of the preceding operations. A device that is responsive to another requires more than an action "(i.e., the device's response) to . . . " merely follow another action.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

We claim:

1. A non-transitory machine-readable medium encoded with machine-executable instructions, wherein execution of the machine-executable instructions by a processor determines a cost of vehicle insurance comprising:
    enabling a telematics native application associated with a vehicle in a mobile device;
    receiving telematics data from a plurality of local and remote sensors through a personal area
    network generated by the mobile device and in communication with the vehicle and a local network;
    the plurality of local and remote sensors includes a first sensor that is unitary part of the mobile device;
    monitoring a mobile client data comprising an amount of time a mobile user spends on the mobile device, a number of messages processed through the mobile device, or a number of Web sites visited through the mobile device while the mobile user is engaged in an insured activity;
    generating a corrective action alert triggered by the telematics data that represents a status of the insured activity that the mobile device is monitoring;
    processing a mobile content through an adaptive transmission controller configured to optimize a mobile content to a plurality of screen sizes including a screen size and a resolution, and an operating system of a mobile device;
    adjusting an insurance policy premium or an insurance policy discount in response to the mobile client data and the telematics data to reward the mobile user engaged in the insured activity.

2. The non-transitory machine-readable medium of claim 1 further comprising:
    harvesting geographic location data from the telematics data and comparing the location data to a user provided data to validate an identity of the mobile user's identity and an address of the mobile user.

3. The non-transitory machine-readable medium of claim 1 further comprising:
    rendering of mobile insurance identification cards in real-time on the mobile device that identify an insurance policy number, insurance coverage period, names of an insured, and an identification of an insured item.

4. The non-transitory machine-readable medium of claim 1 further comprising:
    recognizing an insured object by comparing an image of the insured object captured on the mobile device with a plurality of mappings of the insured objects stored in a library accessed through a cellular network.

5. The non-transitory machine-readable medium of claim 1 further comprising:
    generating and submitting a police report automatically, which is automatically supplemented with geographical information captured by the mobile device.

6. The non-transitory machine-readable medium of claim 1 where the mobile client data comprises a number of emails transmitted through the mobile device during an insured event.

7. The non-transitory machine-readable medium of claim 1 where the mobile client data comprises number of messages sent through the mobile device during an insured event.

8. The non-transitory machine-readable medium of claim 1 where an insured event comprises a driving of the vehicle.

9. The non-transitory machine-readable medium of claim 1 further comprising:

storing the telematics data in response to a detection of motion during an insured event.

10. The non-transitory machine-readable medium of claim 1 further comprising:
storing the telematics data in response to a detection of an acceleration exceeding a predetermined threshold.

11. The non-transitory machine-readable medium of claim 1 further comprising:
storing the telematics data in response to a detection of a speed event above a predetermined threshold.

12. The non-transitory machine-readable medium of claim 1 further comprising:
storing the telematics data in response to a detection of a trip.

13. The non-transitory machine-readable medium of claim 1 further comprising:
storing the telematics data in response to a mobile user's voice command or a mobile user's manual command, or when the vehicle changes an operating state.

14. The non-transitory machine-readable medium of claim 1 further comprising:
comparing the telematics data to a second telematics data associated with a second vehicle and a second mobile user to compare a vehicle operational behavior of the mobile user to a second mobile user.

15. The non-transitory machine-readable medium of claim 1 further comprising:
rendering access to a plurality of insurance reports directed to a plurality of mobile users associated with an insurance agent.

16. The non-transitory machine-readable medium of claim 1 further comprising:
restricting access to the mobile device by comparing a plurality of unique physical characteristics of the mobile user captured by the mobile device against a stored list of authorized characteristics.

17. The non-transitory machine-readable medium of claim 1 further comprising:
supplementing the telematics data automatically with native application data harvested from a second native application resident to the mobile device.

18. The non-transitory machine-readable medium of claim 1 further comprising:
supplementing the telematics data automatically with native application data automatically harvested from a second native application resident to the mobile device.

19. The non-transitory machine-readable medium of claim 1 where the corrective action alert comprises synthesizing a speech to spoken voice output to solicit an input to the mobile device.

20. The non-transitory machine-readable medium of claim 1 where the corrective action alert comprises an audio alert, a visual alert, or a vibration alert.

21. The non-transitory machine-readable medium of claim 1 further comprising:
storing an insurance rating in a memory based on the telematics data in response to a vehicle event; the insurance rating comprises a probability an insured will file an insurance claim during an insurance period.

22. The non-transitory machine-readable medium of claim 1 where the enabling a telematics native application associated with a vehicle in a mobile device comprises a spoken input that is translated into a textual input.

23. The non-transitory machine-readable medium of claim 1 further comprising:
maintaining a continuous wireless connection when a communication connection is disrupted by generating an ad hoc network among a plurality of mobile devices to generate a peer-to-peer network and inserting a data into a payload header of a data object transmitted by the mobile device, where the data object represents an operational state of an infrastructure.

24. A method of determining a cost of vehicle insurance comprising:
enabling a telematics native application associated with a vehicle in a mobile device;
receiving telematics data from a plurality of local and remote sensors through a personal area network generated by the mobile device and in communication with the vehicle and a local network;
the plurality of local and remote sensors includes a first sensor that is unitary part of the mobile device;
monitoring a mobile client data comprising an amount of time a mobile user spends on the mobile device, a number of messages processed through the mobile device, or a number of Web sites visited through the mobile device while the mobile user is engaged in an insured activity;
generating a corrective action alert triggered by the telematics data that represents a status of the insured activity that the mobile device is monitoring;
processing a mobile content through an adaptive transmission controller configured to optimize a mobile content to a plurality of screen sizes including a screen size and a resolution, and an operating system of a mobile device;
adjusting an insurance policy premium or an insurance policy discount in response to the mobile client data and the telematics data to reward the mobile user engaged in the insured activity.

25. The method of claim 24 further comprising:
harvesting geographic location data from the telematics data and comparing the location data to a user provided data to validate an identity of the mobile user's identity and an address of the mobile user.

26. The method of claim 24 further comprising:
rendering of mobile insurance identification cards in real-time on the mobile device that identify an insurance policy number, insurance coverage period, names of an insured, and an identification of an insured item.

27. The method of claim 24 further comprising:
recognizing an insured object by comparing an image of the insured object captured on the mobile device with a plurality of mappings of the insured objects stored in a library accessed through a cellular network.

28. The method of claim 24 further comprising:
generating and submitting a police report automatically, which is automatically supplemented with geographical information captured by the mobile device.

29. The method of claim 24 where the mobile client data comprises a number of emails transmitted through the mobile device during an insured event.

30. The method of claim 24 where the mobile client data comprises number of messages sent through the mobile device during an insured event.

31. The method of claim 24 where an insured event comprises a driving of the vehicle.

32. The method of claim 24 further comprising:
storing the telematics data in response to a detection of motion during an insured event.

33. The method of claim 24 further comprising:
storing the telematics data in response to a detection of an acceleration exceeding a predetermined.

34. The method of claim 24 further comprising:
storing the telematics data in response to a detection of a speed event above a predetermined threshold.

35. The method of claim 24 further comprising:
storing the telematics data in response to a detection of a trip.

36. The method of claim 24 further comprising:
storing the telematics data in response to a mobile user's voice command or a mobile user's manual command, or when the vehicle changes an operating state.

37. The method of claim 24 further comprising:
comparing the telematics data to a second telematics data associated with a second vehicle and a second mobile user to compare a vehicle operational behavior of the mobile user to a second mobile user.

38. The method of claim 24 further comprising:
rendering access to a plurality of insurance reports directed to a plurality of mobile users associated with an insurance agent.

39. The method of claim 24 further comprising:
restricting access to the mobile device by comparing a plurality of unique physical characteristics of the mobile user captured by the mobile device against a stored list of authorized characteristics.

40. The method of claim 24 further comprising:
supplementing the telematics data automatically with native application data harvested from a second native application resident to the mobile device.

41. The method of claim 24 further comprising:
supplementing the telematics data automatically with native application data automatically harvested from a second native application resident to the mobile device.

42. The method of claim 24 where the corrective action alert comprises synthesizing a speech to spoken voice output to solicit an input to the mobile device.

43. The method of claim 24 where the corrective action alert comprises an audio alert, a visual alert, or a vibration alert.

44. The method of claim 24 further comprising:
storing an insurance rating in a memory based on the telematics data in response to a vehicle event; the insurance rating comprises a probability an insured will file an insurance claim during an insurance period.

45. The method of claim 24 where the enabling a telematics native application associated with a vehicle in a mobile device comprises a spoken input that is translated into a textual input.

46. The method of claim 24 further comprising:
maintaining a continuous wireless connection when a communication connection is disrupted by generating an ad hoc network among a plurality of mobile devices to generate a peer-to-peer network and inserting a data into a payload header of a data object transmitted by the mobile device, where the data object represents an operational state of an infrastructure.

\* \* \* \* \*